March 12, 1957 V. BERTHELSEN 2,784,754

HYDRAULIC SYSTEMS

Filed April 11, 1952 36 Sheets-Sheet 1

INVENTOR.
VIGGO BERTHELSEN

BY Rummler Rummler and Snow

ATT'YS

March 12, 1957 V. BERTHELSEN 2,784,754

HYDRAULIC SYSTEMS

Filed April 11, 1952 36 Sheets-Sheet 2

INVENTOR.
VIGGO BERTHELSEN
BY
Rummler, Rummler and Snow
ATT'YS

INVENTOR.
VIGGO BERTHELSEN
BY
Rummler Rummler and Snow
ATT'YS

INVENTOR.
VIGGO BERTHELSEN
BY Rummler Rummler and Snow
ATT'YS

March 12, 1957 V. BERTHELSEN 2,784,754

HYDRAULIC SYSTEMS

Filed April 11, 1952 36 Sheets-Sheet 5

INVENTOR.
VIGGO BERTHELSEN
BY
Rummler Rummler & Snow
ATT'YS

March 12, 1957 V. BERTHELSEN 2,784,754

HYDRAULIC SYSTEMS

Filed April 11, 1952 36 Sheets-Sheet 6

INVENTOR.
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 7

INVENTOR.
VIGGO BERTHELSEN
BY

ATT'YS

INVENTOR.
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 9

INVENTOR.
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 10

INVENTOR.
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 11

INVENTOR.
VIGGO BERTHELSEN
BY
Rummler Rummler & Snow
ATT'YS

INVENTOR.
VIGGO BERTHELSEN
BY
Rummler Rummler & Snow
ATT'YS

March 12, 1957 V. BERTHELSEN 2,784,754

HYDRAULIC SYSTEMS

Filed April 11, 1952 36 Sheets-Sheet 13

INVENTOR.
VIGGO BERTHELSEN
BY
[signature]
ATT'YS

March 12, 1957 V. BERTHELSEN 2,784,754

HYDRAULIC SYSTEMS

Filed April 11, 1952 36 Sheets-Sheet 14

INVENTOR.
VIGGO BERTHELSEN
BY
Rummler Rummler and Snow
ATT'YS

INVENTOR.
VIGGO BERTHELSEN
BY
Rummler Rummler and Snow
ATT'YS

March 12, 1957 V. BERTHELSEN 2,784,754
HYDRAULIC SYSTEMS
Filed April 11, 1952 36 Sheets-Sheet 16

INVENTOR.
VIGGO BERTHELSEN
BY
ATT'YS

March 12, 1957 V. BERTHELSEN 2,784,754
HYDRAULIC SYSTEMS
Filed April 11, 1952 36 Sheets-Sheet 17

INVENTOR.
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 18

INVENTOR.
VIGGO BERTHELSEN
BY
Ammler Ammler and Snow
ATT'YS

INVENTOR.
VIGGO BERTHELSEN
BY
Rummler, Rummler and Snow
ATT'YS

March 12, 1957 V. BERTHELSEN 2,784,754

HYDRAULIC SYSTEMS

Filed April 11, 1952 36 Sheets-Sheet 20

INVENTOR.
VIGGO BERTHELSEN
BY
[signature]
ATT'YS

March 12, 1957 V. BERTHELSEN 2,784,754

HYDRAULIC SYSTEMS

Filed April 11, 1952 36 Sheets-Sheet 21

INVENTOR.
VIGGO BERTHELSEN
BY
[signature] and Snow
ATT'YS

INVENTOR.
VIGGO BERTHELSEN
BY
Kimmel, Kimmel and Snow
ATT'YS

INVENTOR.
VIGGO BERTHELSEN
BY
Rummler Rummler & Snow
ATT'YS

March 12, 1957 V. BERTHELSEN 2,784,754

HYDRAULIC SYSTEMS

Filed April 11, 1952 36 Sheets-Sheet 24

INVENTOR.
VIGGO BERTHELSEN
BY
[signature] ATT'YS

March 12, 1957 V. BERTHELSEN 2,784,754

HYDRAULIC SYSTEMS

Filed April 11, 1952 36 Sheets-Sheet 25

INVENTOR.
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 26

INVENTOR.
VIGGO BERTHELSEN
BY
ATT'YS

March 12, 1957 V. BERTHELSEN 2,784,754

HYDRAULIC SYSTEMS

Filed April 11, 1952 36 Sheets-Sheet 27

INVENTOR.
VIGGO BERTHELSEN
BY
Rummler Rummler and Snow
ATT'YS

INVENTOR.
VIGGO BERTHELSEN
BY Brumbaugh Kimmel and Snow
ATT'YS

INVENTOR.
VIGGO BERTHELSEN
BY
[signature]
ATT'YS

March 12, 1957 V. BERTHELSEN 2,784,754

HYDRAULIC SYSTEMS

Filed April 11, 1952 36 Sheets-Sheet 30

INVENTOR.
VIGGO BERTHELSEN
BY
Kemmler Kemmler and Snow
ATT'YS

March 12, 1957 V. BERTHELSEN 2,784,754

HYDRAULIC SYSTEMS

Filed April 11, 1952 36 Sheets-Sheet 31

INVENTOR.
VIGGO BERTHELSEN
BY
[signature]
ATT'YS

March 12, 1957 V. BERTHELSEN 2,784,754

HYDRAULIC SYSTEMS

Filed April 11, 1952 36 Sheets-Sheet 32

INVENTOR.
VIGGO BERTHELSEN
BY
ATT'YS

INVENTOR.
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 34

INVENTOR
VIGGO BERTHELSEN
BY
Rummler Rummler and Snow
ATT'YS

March 12, 1957 V. BERTHELSEN 2,784,754

HYDRAULIC SYSTEMS

Filed April 11, 1952 36 Sheets-Sheet 35

INVENTOR.
VIGGO BERTHELSEN
BY Rummler Rummler and Snow
ATT'YS

March 12, 1957 V. BERTHELSEN 2,784,754

HYDRAULIC SYSTEMS

Filed April 11, 1952 36 Sheets-Sheet 36

INVENTOR.
VIGGO BERTHELSEN
BY
Rummler Rummler and Snow
ATT'YS

United States Patent Office 2,784,754
Patented Mar. 12, 1957

2,784,754

HYDRAULIC SYSTEMS

Viggo Berthelsen, Copenhagen, Denmark, assignor to V. Berthelsen Engineering Works, Inc., Joliet, Ill., a corporation of Illinois Application April 11, 1952, Serial No. 281,877

15 Claims. (Cl. 144—281)

Figure 1:
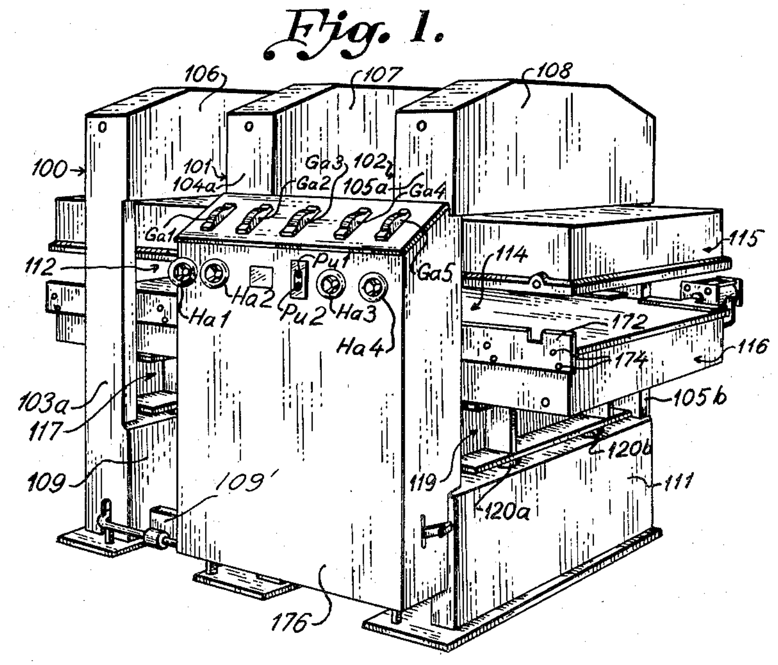

This invention relates to hydraulic wood-working presses.

More specifically the invention relates to hydraulic presses of the hot press type systems to be used in connection therewith.

It is a main purpose of the invention to provide a press comprising a hydraulic system in which a fully automatic operation is possible.

A further object of my invention resides in providing a comparatively light press which is fast in operation and provided with all refinements necessary so far as f. inst. to enable a mass production of plywood or panel plates of the hot press type and of high quality.

Still a further object of my invention resides in providing a press having the merits here specified which is suitable not only for large factories but also for relatively small shops and can be provided at comparatively low costs.

Still a further object of my invention is to provide a press in which the substantial part of all refinements including hydraulic system and hydraulic accessories form a unit with the press so that hereby a self contained hot press is available to be easily and quickly installed and put in operation.

The improved press, according to my invention, enables automatic operation so that, for example, in order to make a panel plate it is only necessary to place the parts thereof comprising face, cross band, loose core stock and cross band on the movable press platen or platens whereafter the press having been started automatically presses the panel with a predetermined pressure in a predetermined time and then returns the movable press platen and/or platens to the initial position.

In connection with this advantage it is still a further object of my invention to provide a press, in which the maximum pressure can be preset to a certain value in accordance with the object or work piece to be pressed and/or in which the curing time can be preset for work pieces requiring a sustained pressure for a predetermined period.

Still another purpose of my invention is to provide a press in which there is improved means for applying pressure in at least two mutually perpendicular directions. Thus, for instance it is one object of my invention to provide a hydraulic press in which besides the main pressure applied between the press platens there is added a supplementary hydraulically operated pressure perpendicular to the direction of the main pressure pressing in sidewardly direction, for instance against the loose core stock of a panel plate of the type hereabove referred to.

Thus another advantage of my invention resides in the omitting of pregluing lumber core strips so as to enable all glue joints edge and surface to be secured simultaneously under heat. This means a considerable advantage in saving time and labour.

Still another purpose of my invention resides in providing the hydraulic system so as to reach the side or edge pressure at its maximum automatically just ahead of the face pressure so that tight core joints are assured in a panel of the type hereabove referred to.

Still a further purpose of my invention resides in providing detachable and/or adjustable side or edge pressure means operating perpendicular to the direction of the main or face pressure.

My invention also aims to provide such side or end pressure means at a location, which will provide the least possible obstruction to the loading of the press.

A specific object in connection with the provision of end pressure means is therefore also to provide a mounting of such end pressure means which will have as small an extension as possible in the opening to the space or daylight between the press platens so as to avoid the necessity of increasing said space or daylight in order to effect the loading.

Figure 2:
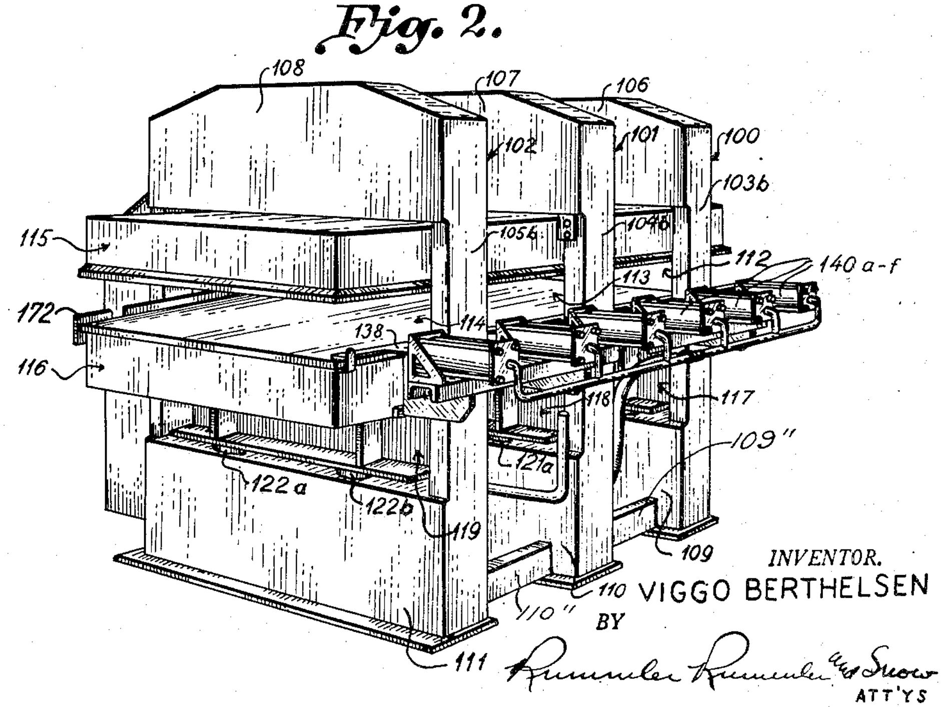
Figure 3:
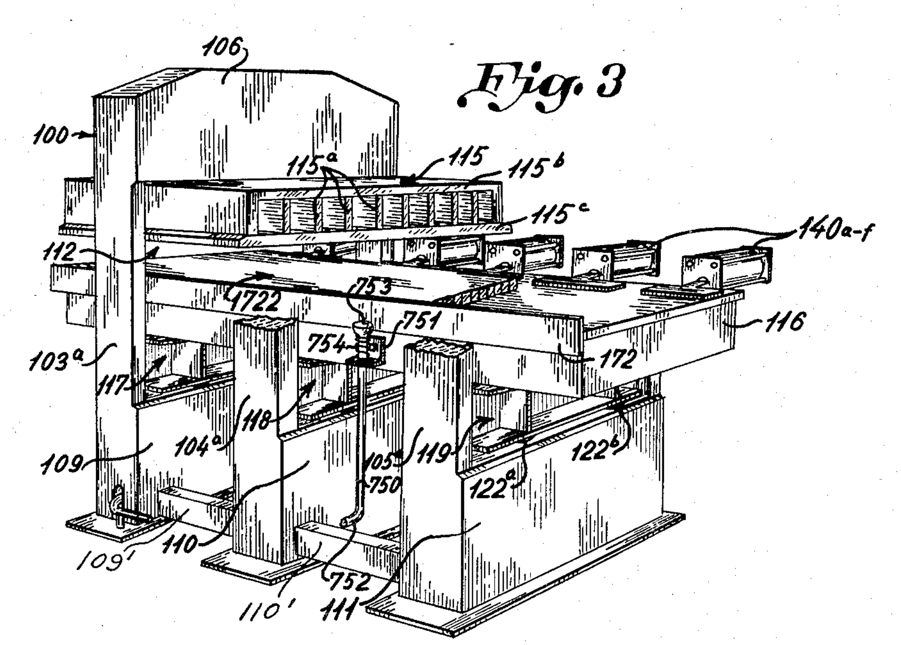
Figure 4:
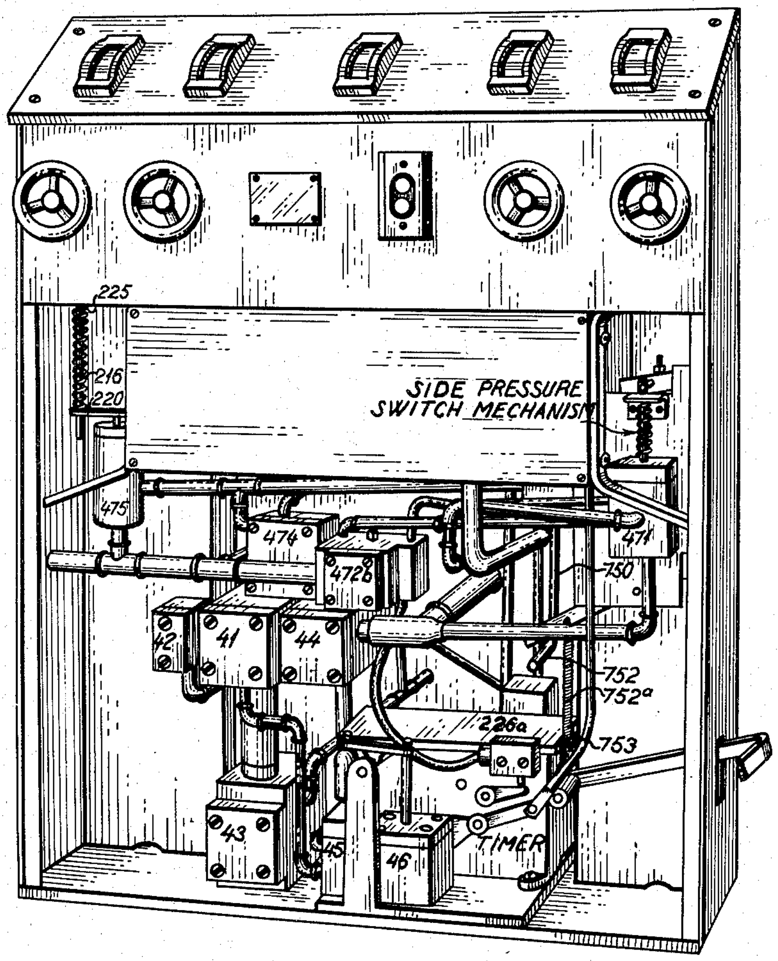
Figure 5:
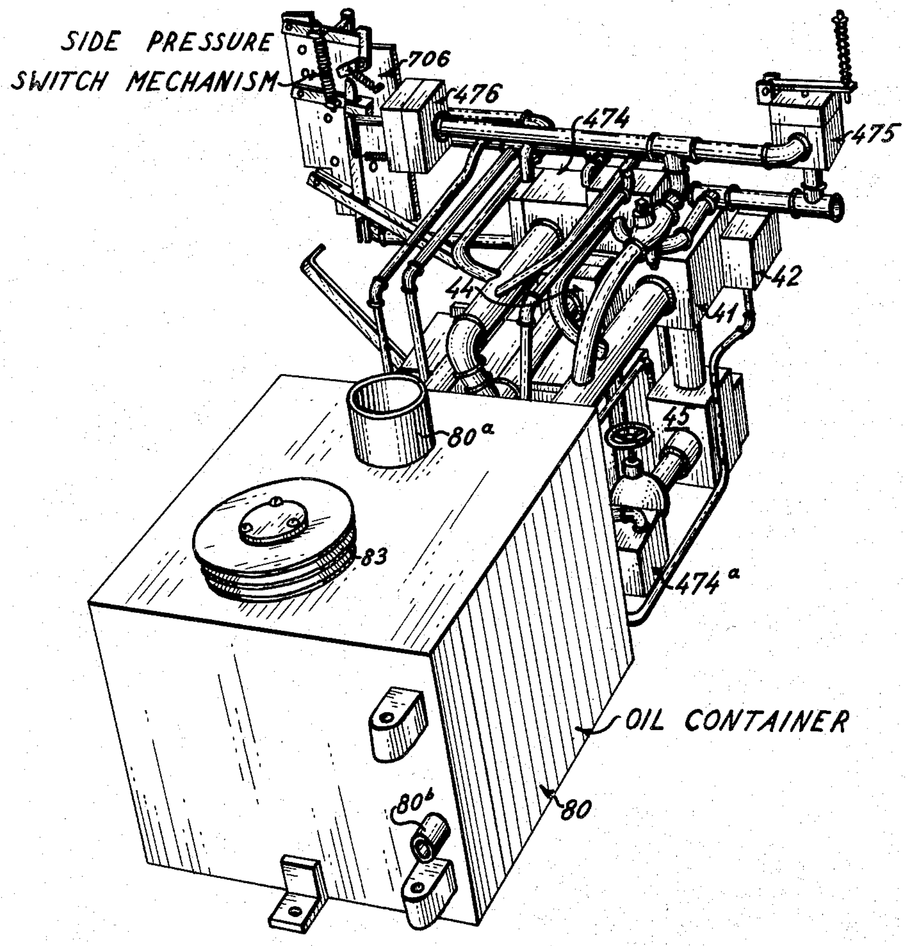

With these and other objects in mind which will appear from the following specification as it proceeds, my invention will now be nearer described with reference to the drawing in which:

Figure 1 is a perspective view of a press according to the invention seen from the front side including the control panel, Figure 2 is a perspective view of the press seen from the rear side, Figure 3 is a further perspective view of the press seen from the front side partly in section and with the front control panel removed in order to show certain details, Figure 4 is a perspective view of the valve arrangement and the panel in the press shown in Figure 1, seen from the front side, Figure 5 is a perspective view of the valve arrangement including the oil tank seen from the rear side.

Figure 8:
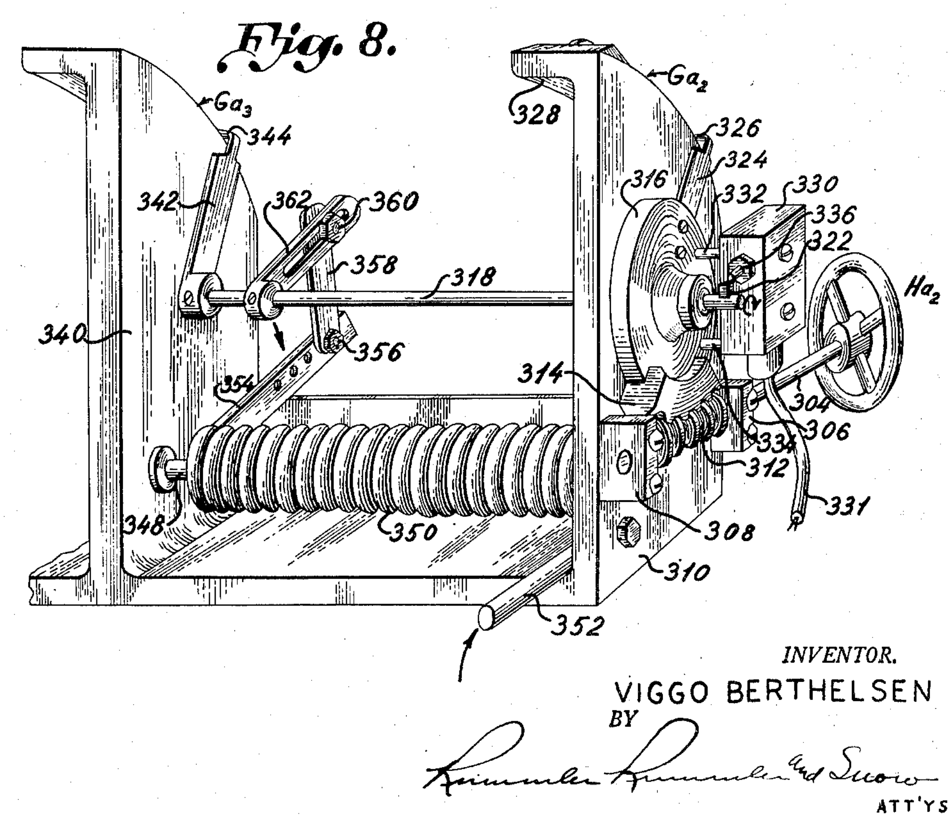
Figure 6:
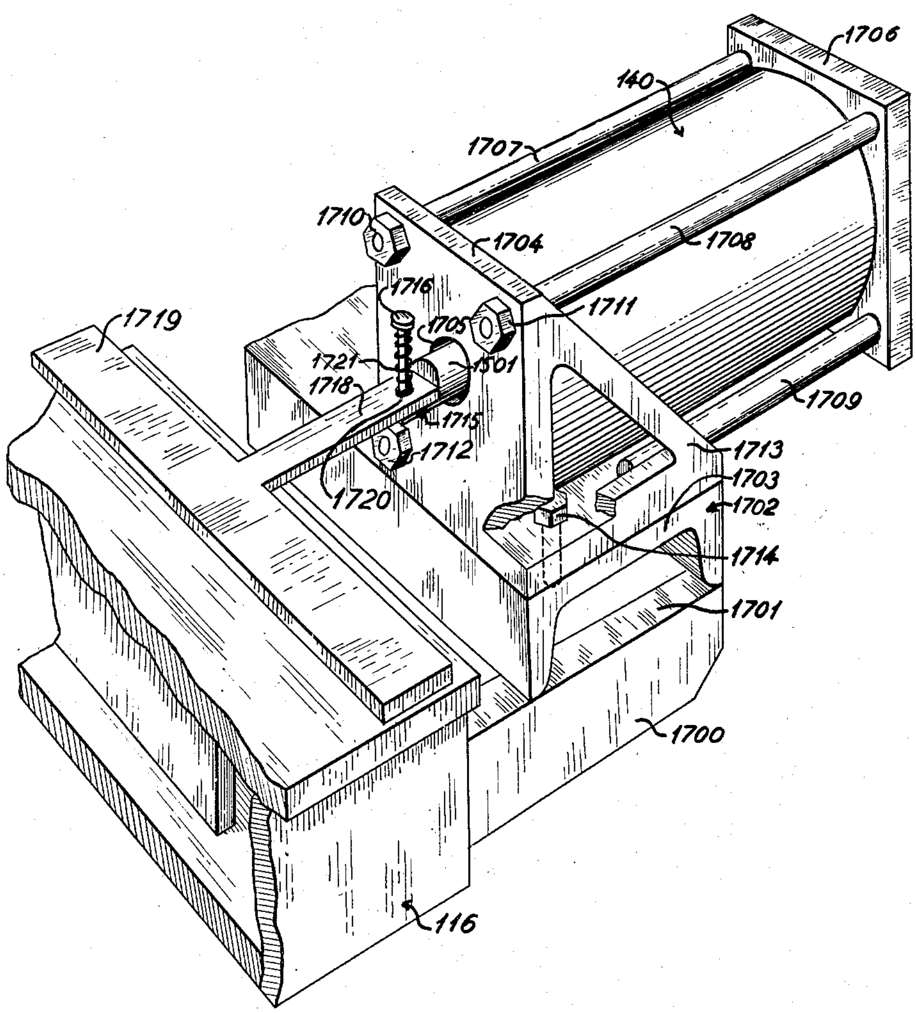
Figure 7:
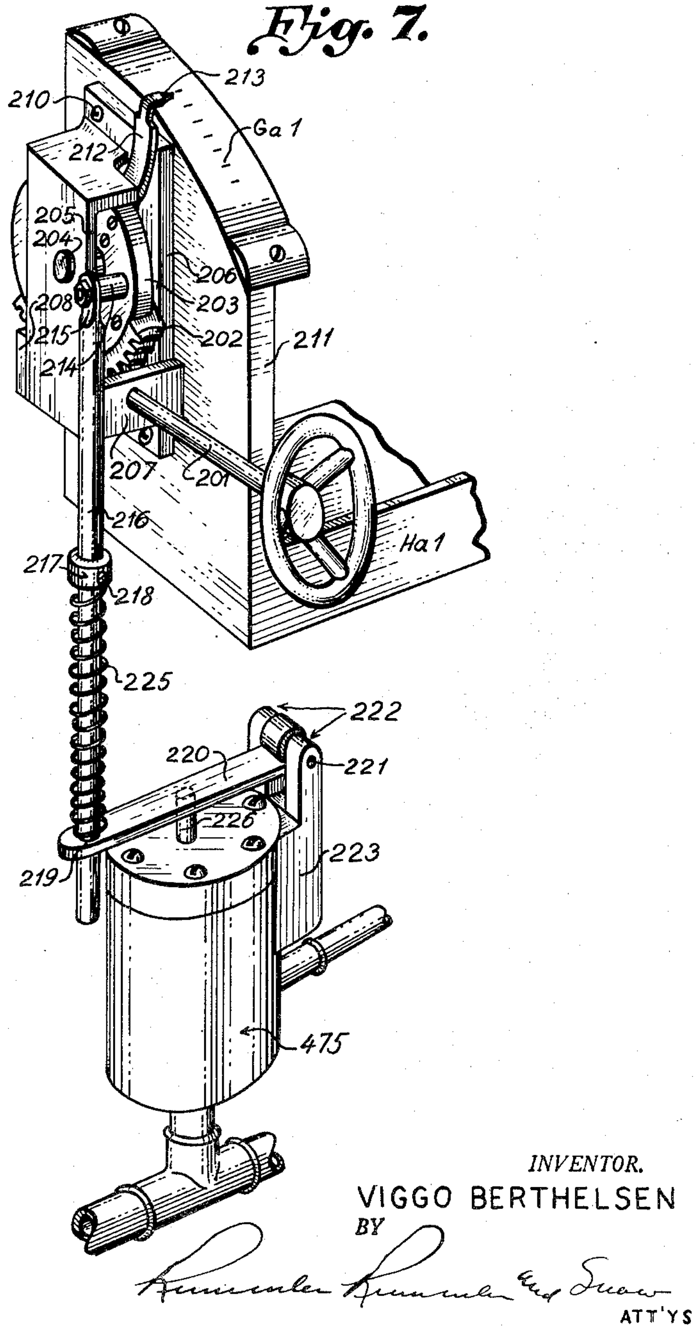
Figure 9:
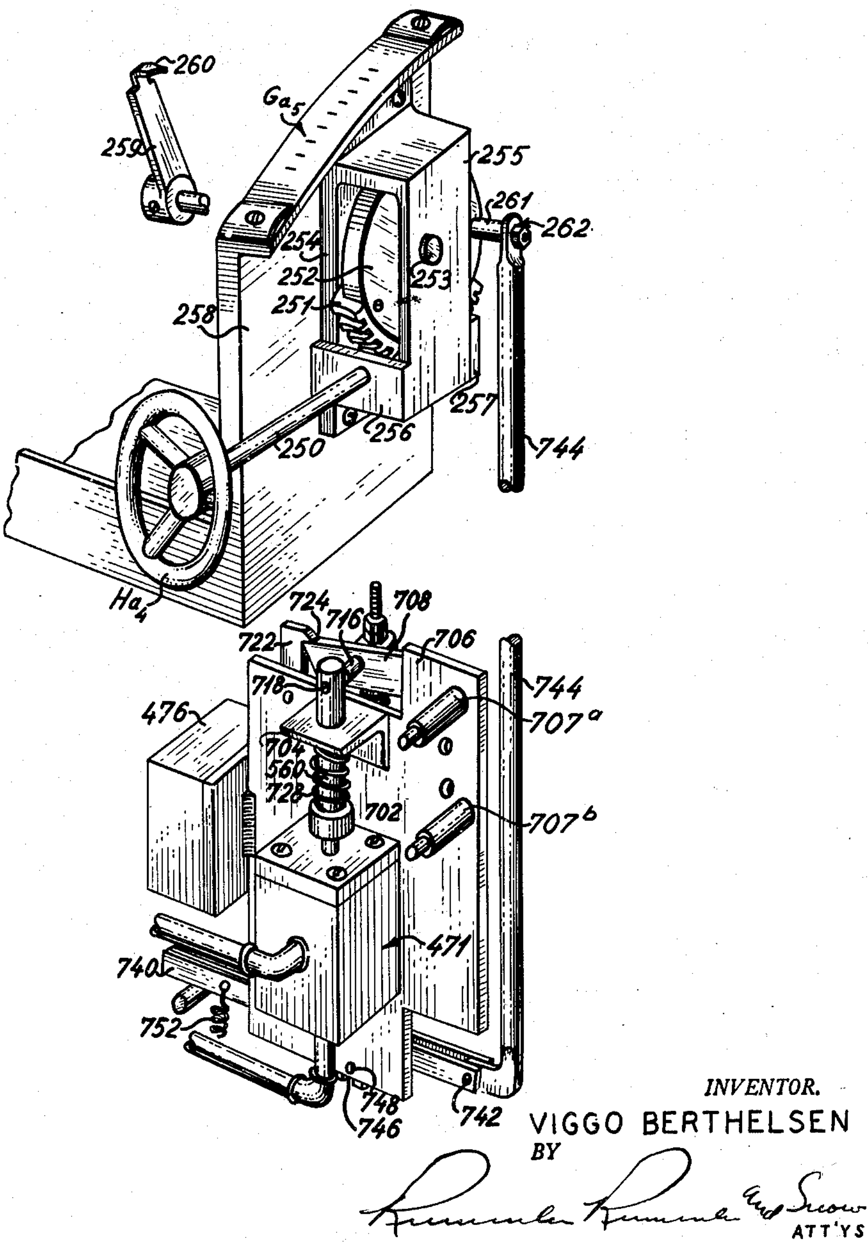
Figure 10:
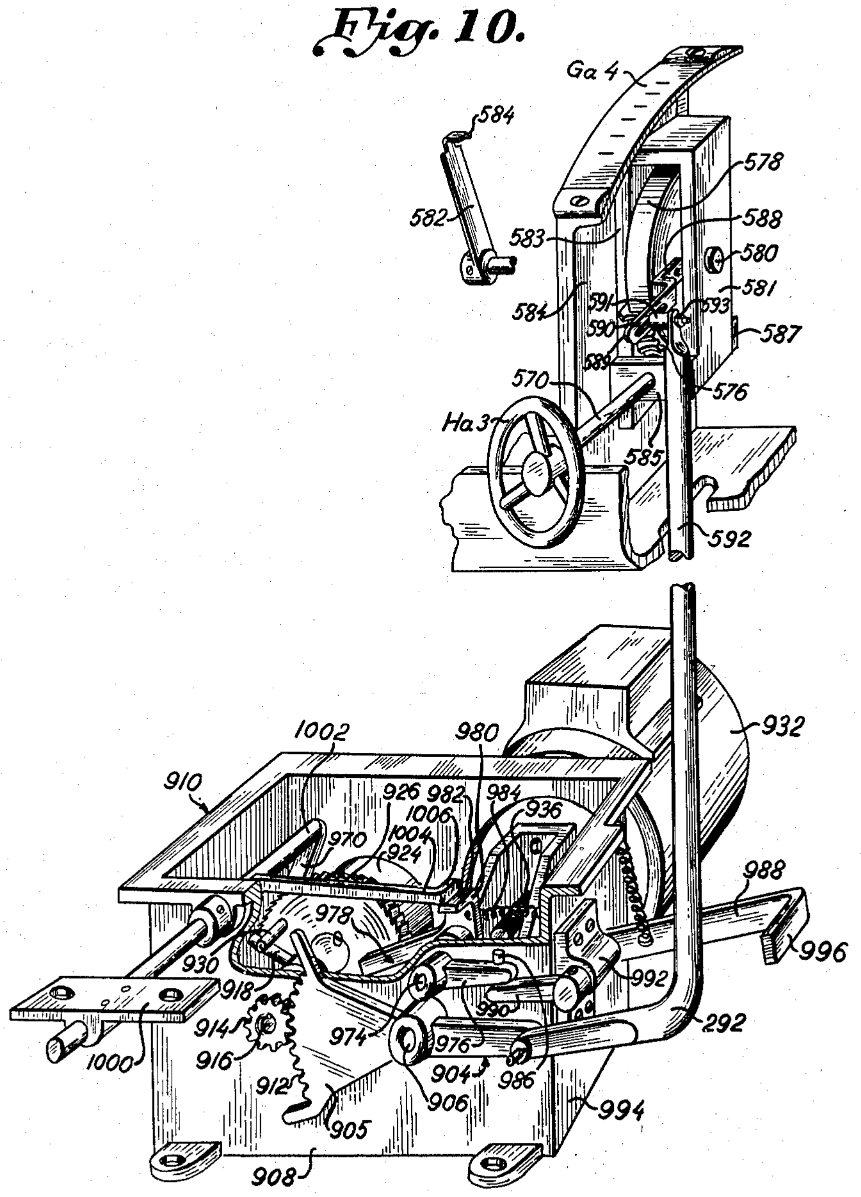
Figure 11:
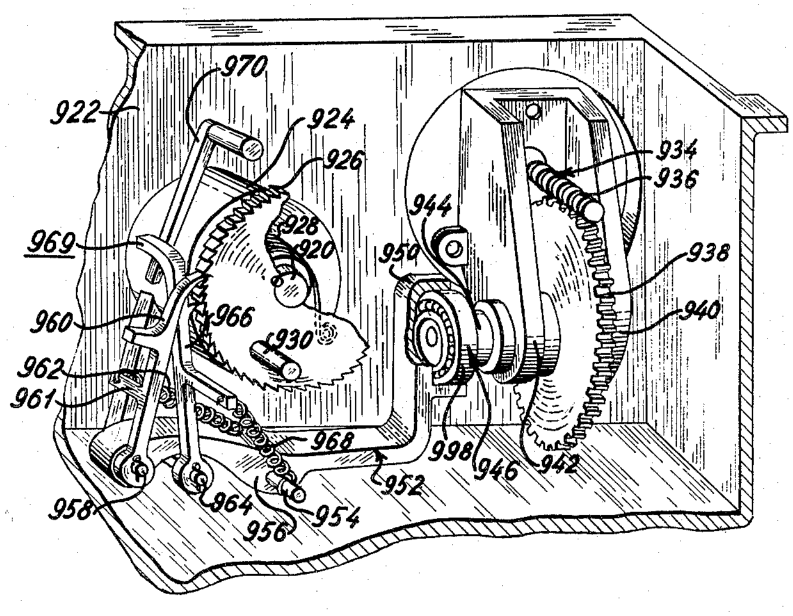
Figure 12:
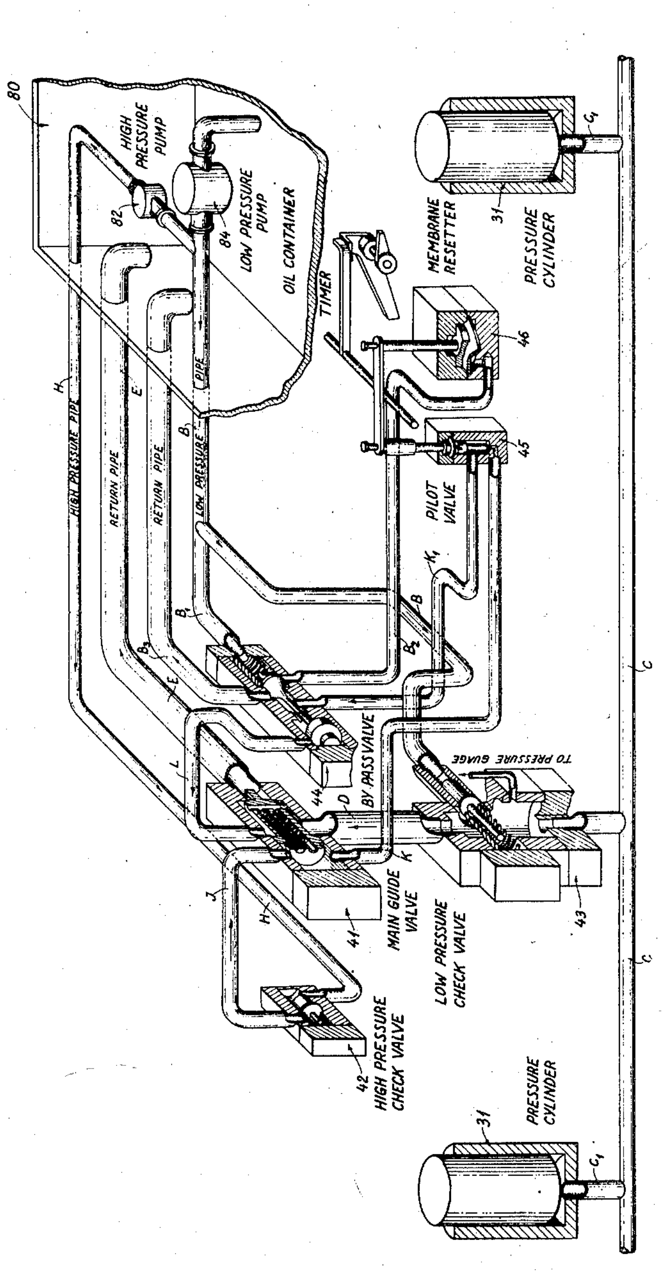
Figure 13:
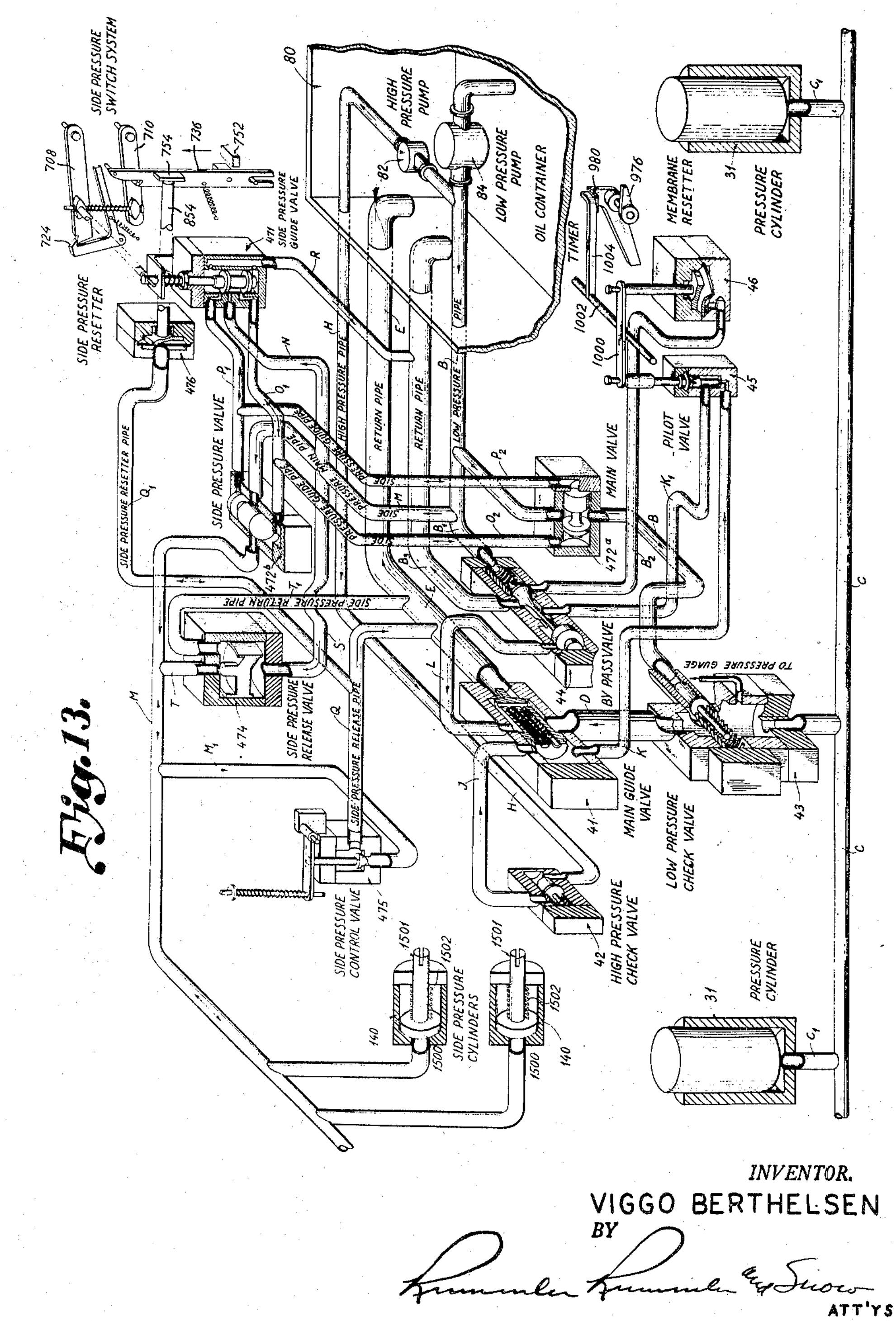

Figure 6 is a perspective view of a detail showing the mounting of a side pressure cylinder, Figure 7 is a perspective view of a detail showing the mechanism for adjustment of the side pressure, Figure 8 is a perspective view of a detail showing the mechanism for presetting the vertical hydraulic pressure according to the size of the panel to be pressed, together with the pressure gauge showing the vertical pressure between the press tables, Figure 9 is a perspective view of a detail showing the mechanism for adjustment and gauge for operating the trigger stopping the vertical movements of the movable press platen to allow the side pressure to be applied to the panel to be pressed, Figure 10 is a perspective view of a detail showing the timer arrangement controlling the time during which the pressure is applied, Figure 11 is a further detail of the timer arrangement, Figure 12 is a diagrammatic illustration of the main valve system for operating the press, Figure 13 is a diagrammatic illustration of the main valve system and including the valve system for operating the side pressure cylinders.

Figure 18:
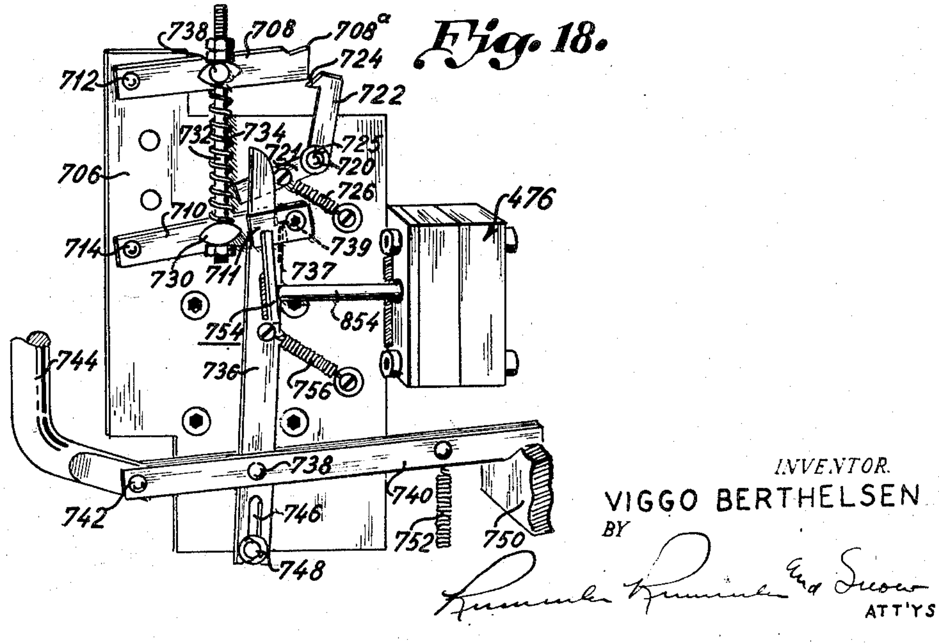
Figure 14:
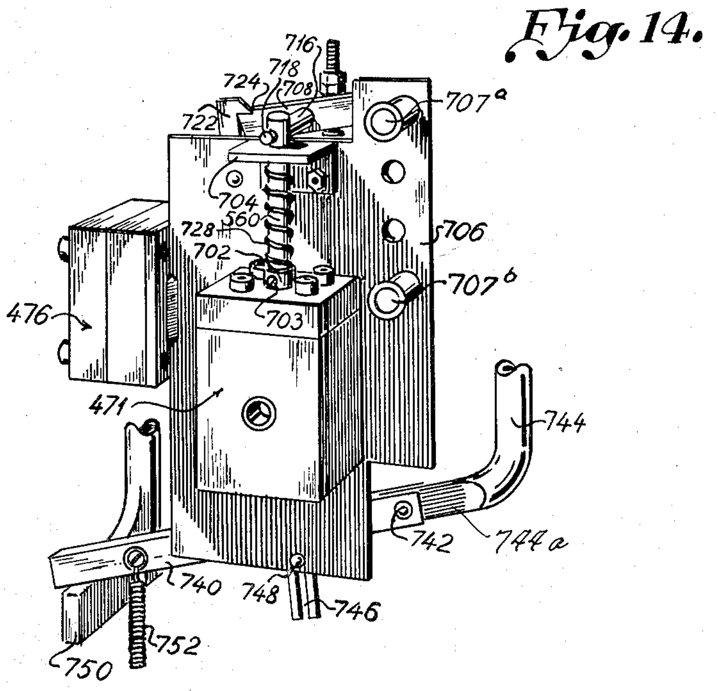
Figure 15:
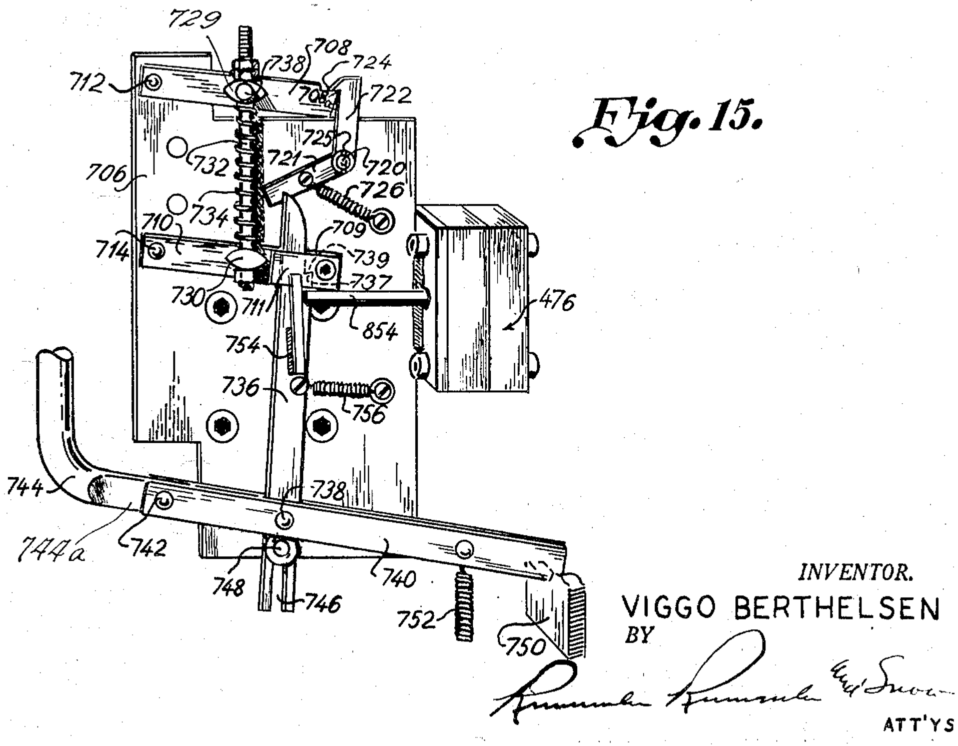
Figure 16:
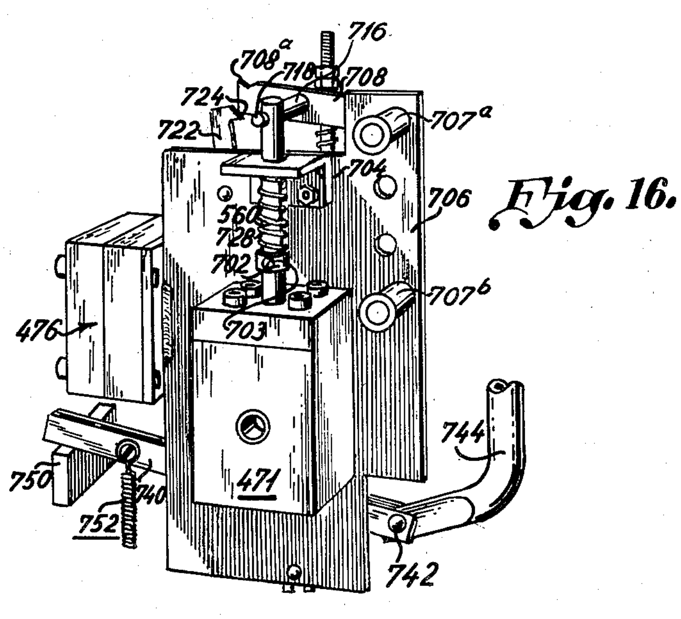
Figure 17:
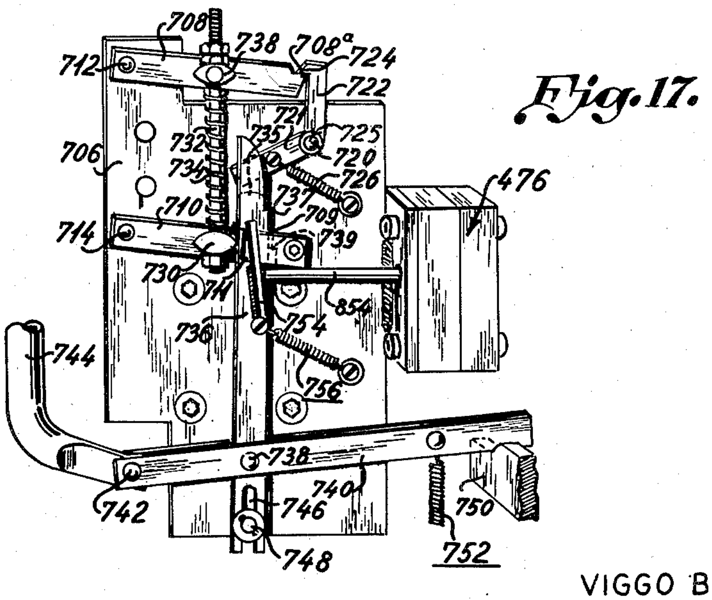
Figure 19:
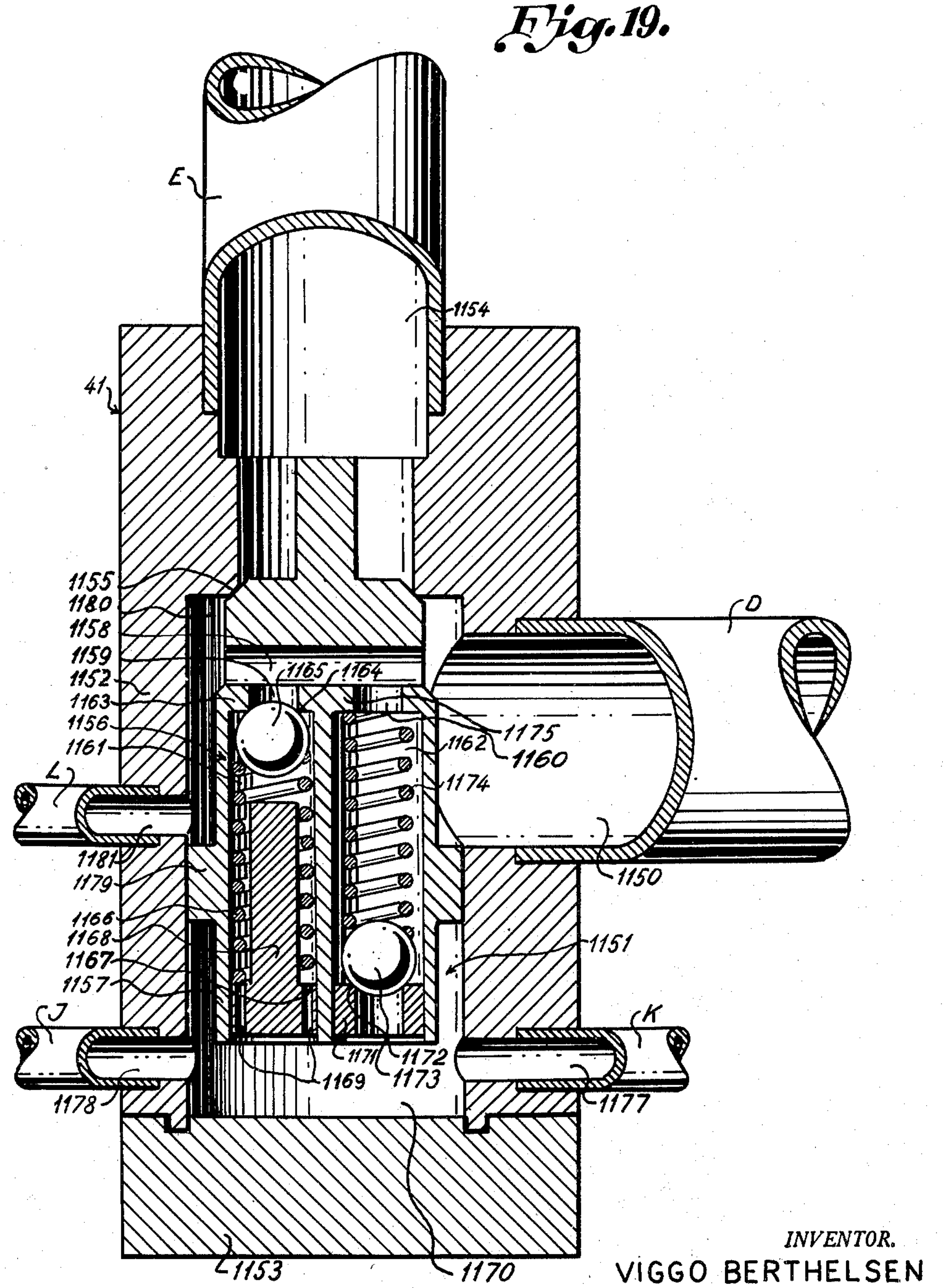
Figures 20, 21:
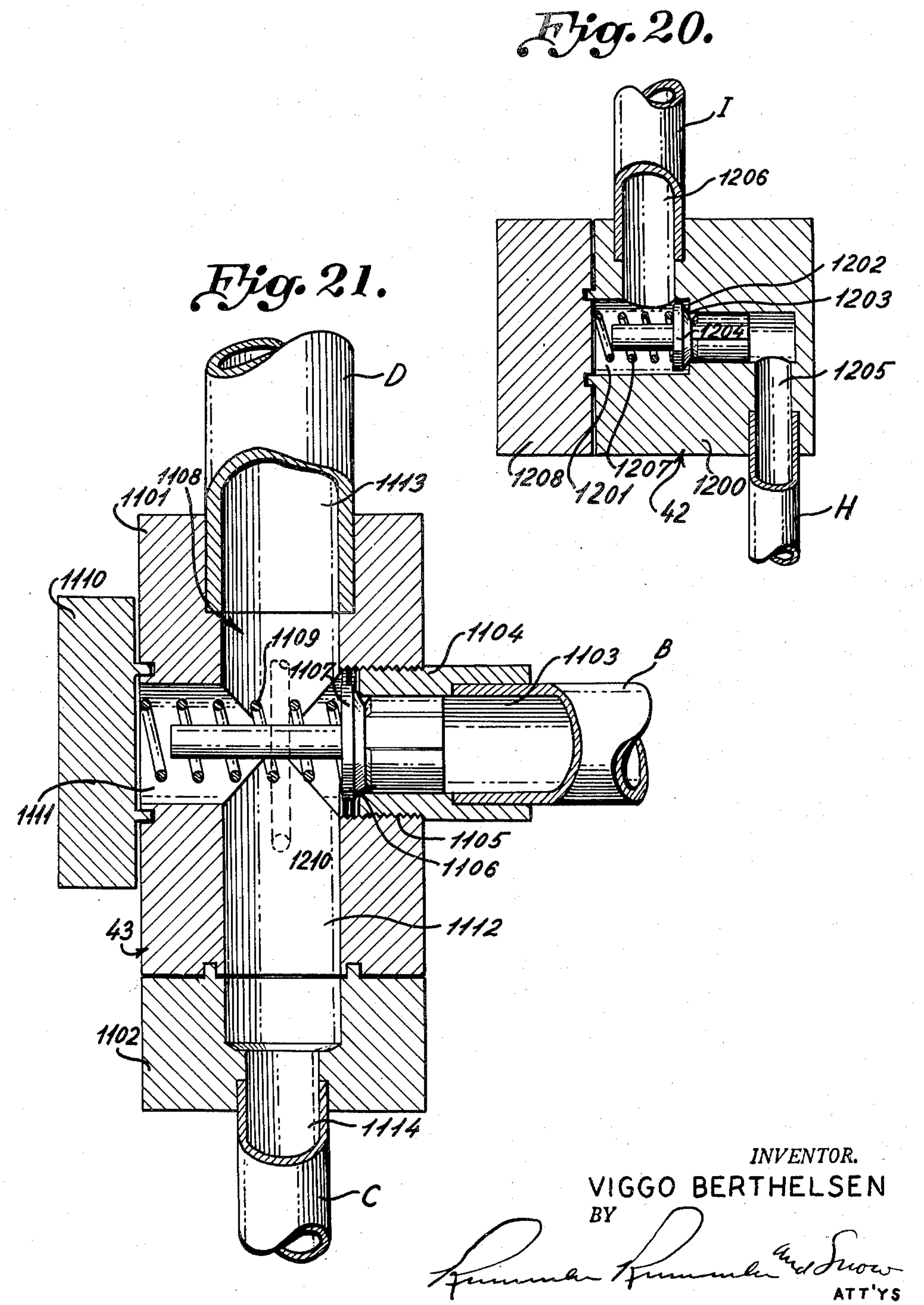
Figures 22, 23:
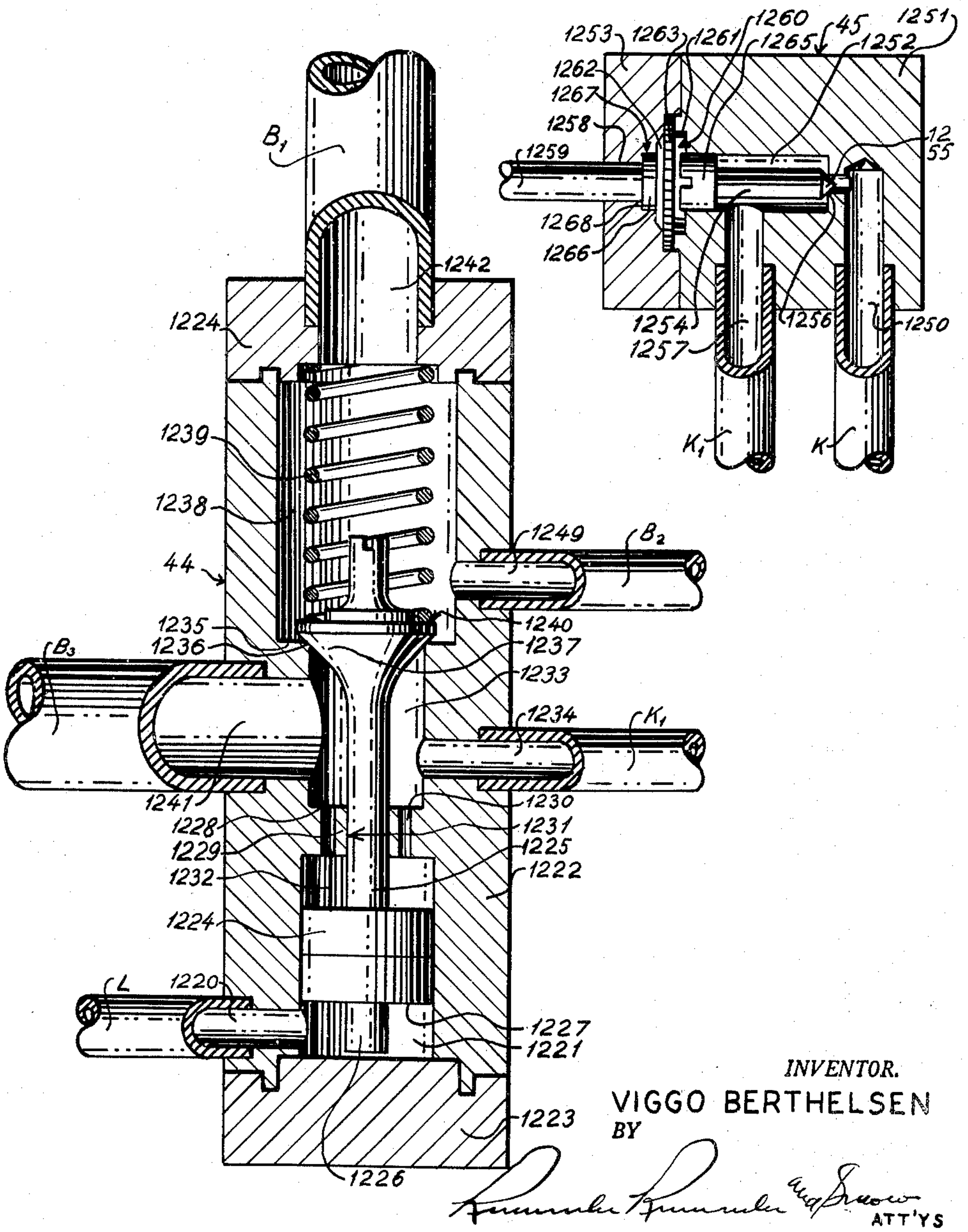
Figure 24:
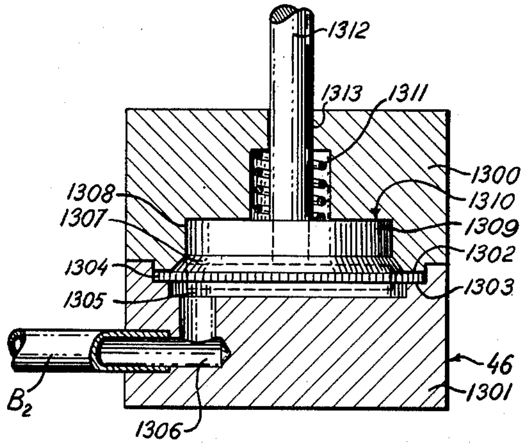
Figure 25:
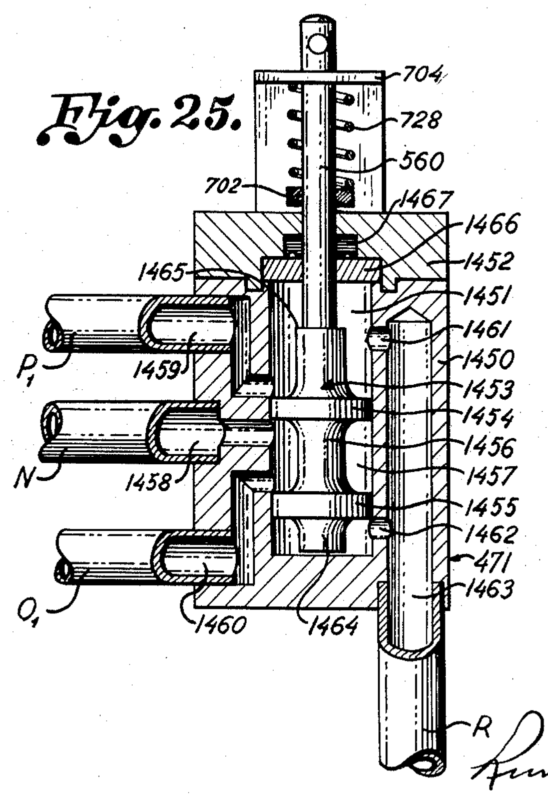
Figure 26:
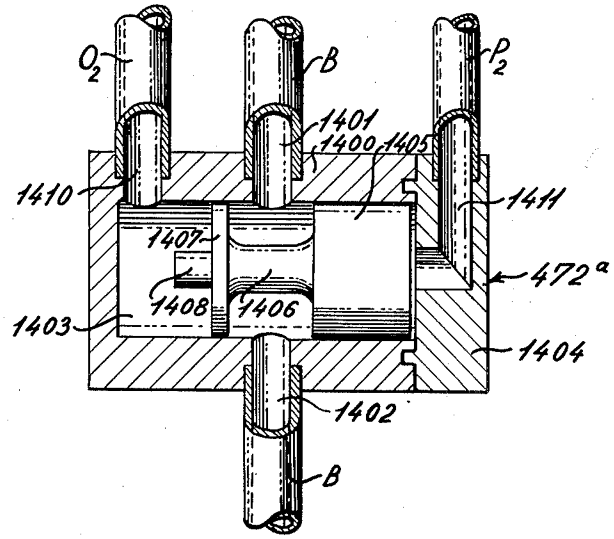
Figure 27:
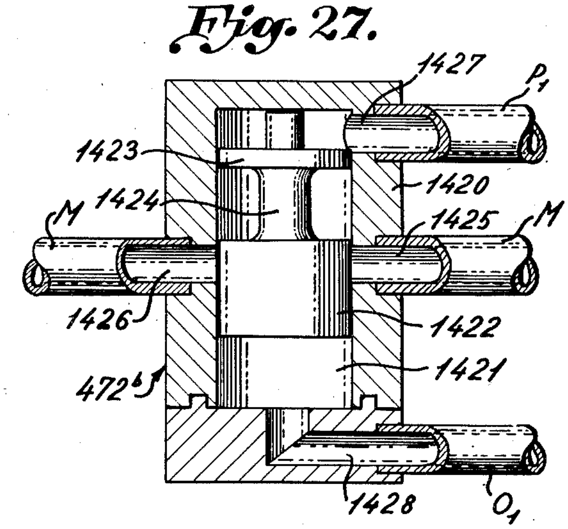
Figure 28:
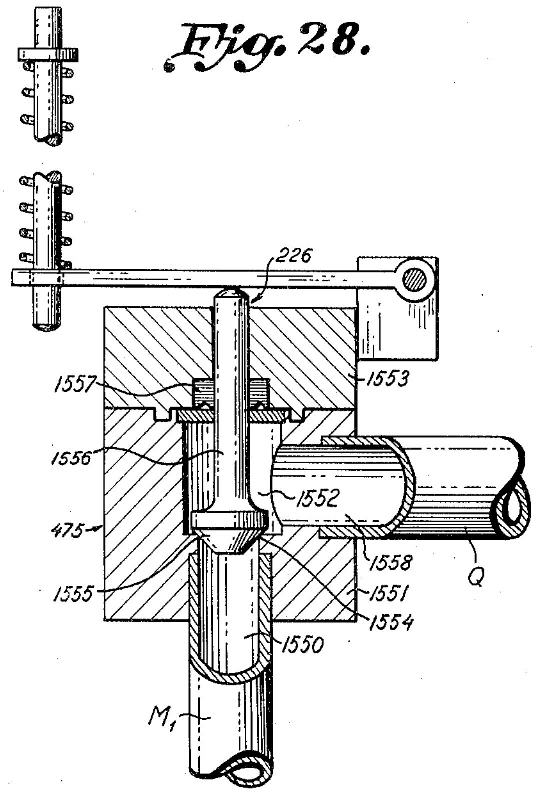
Figure 29:
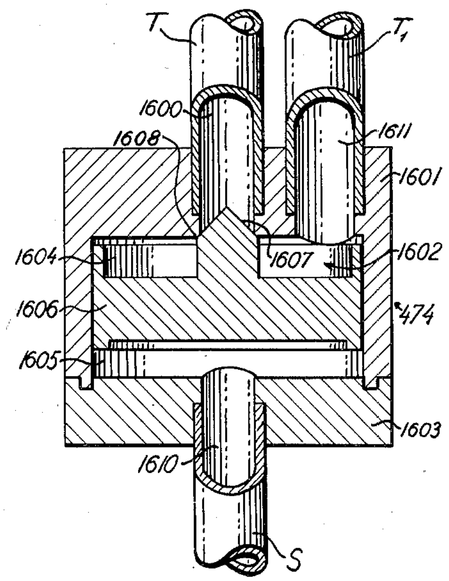
Figure 30:
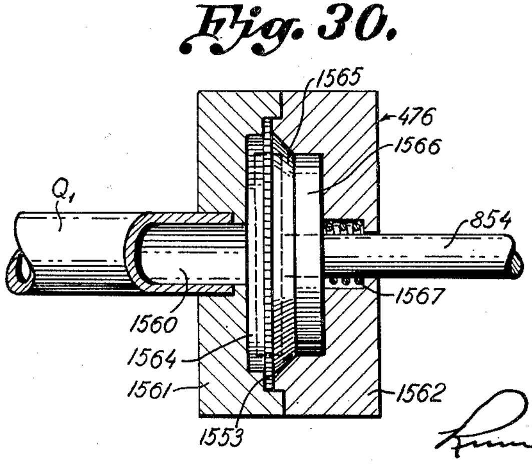
Figure 31:
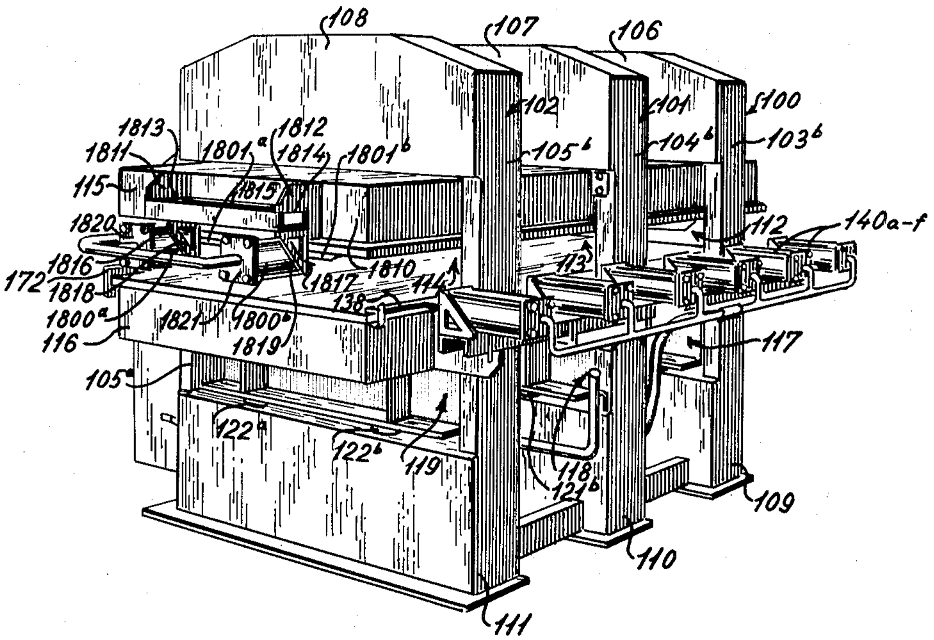
Figure 32:
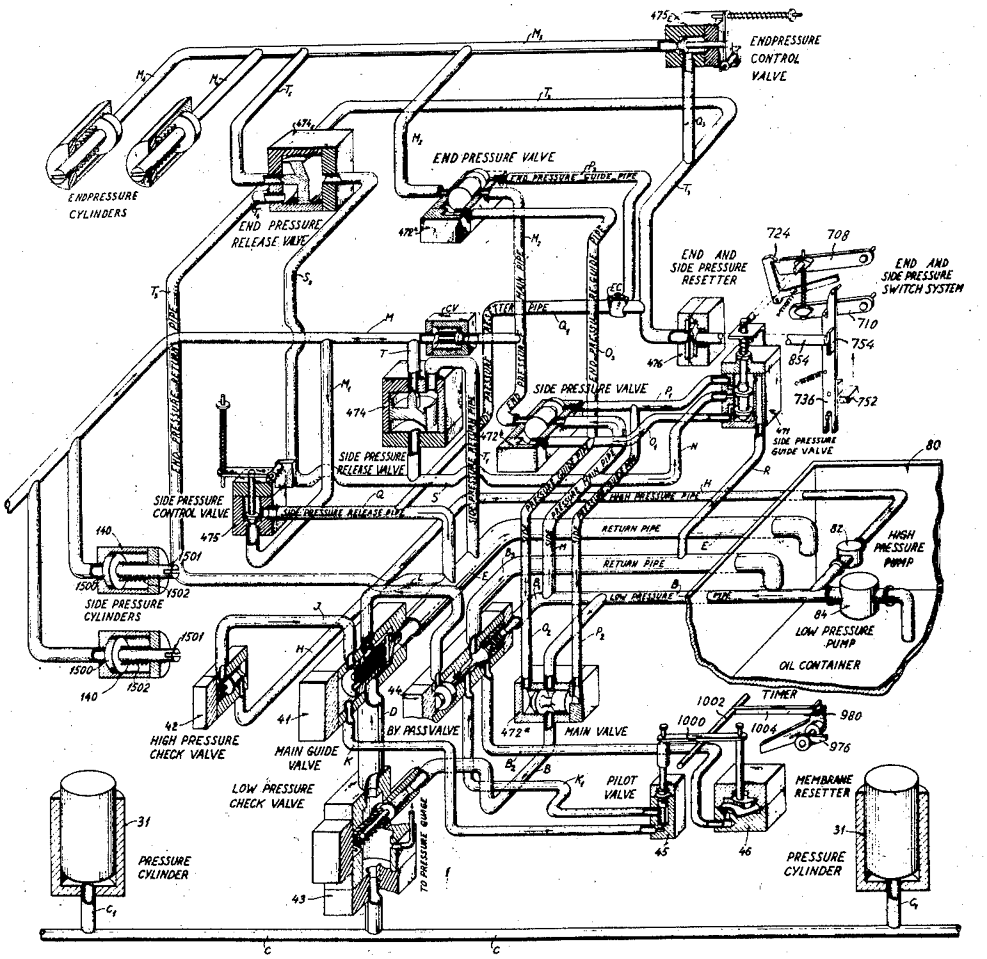
Figure 33:
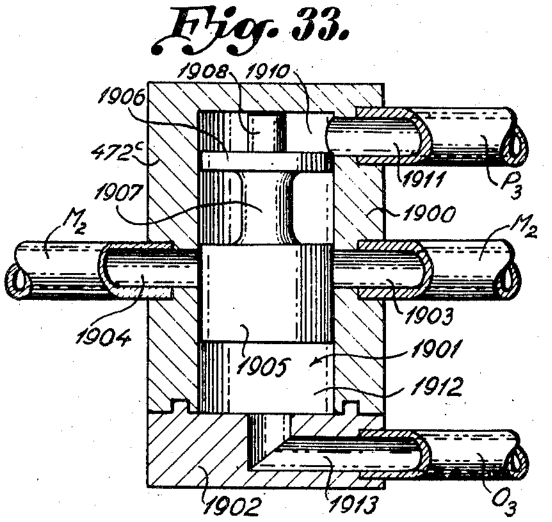
Figure 35:
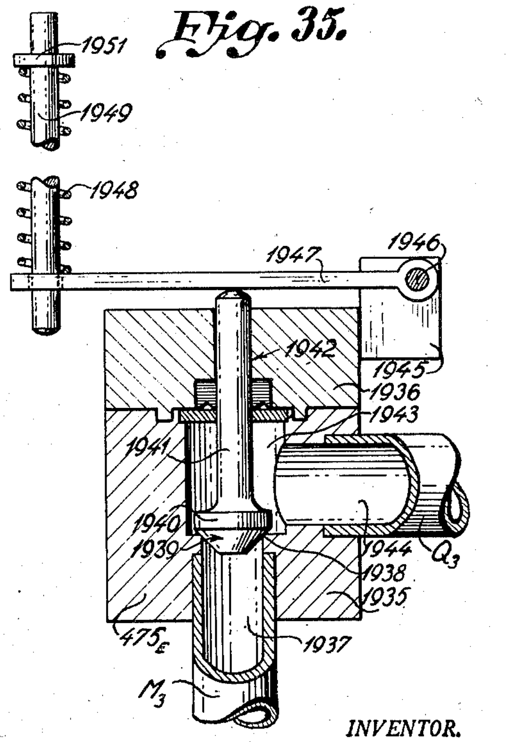
Figure 34:
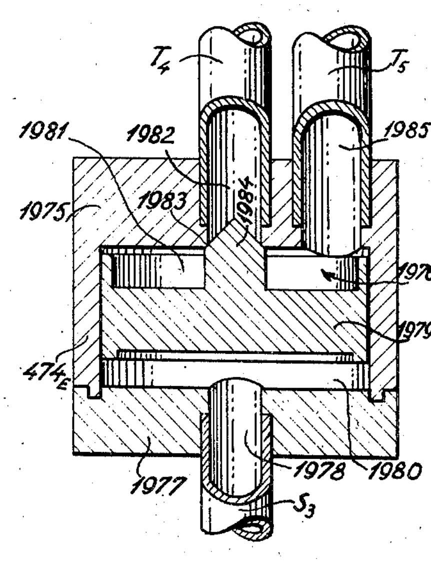
Figure 36:
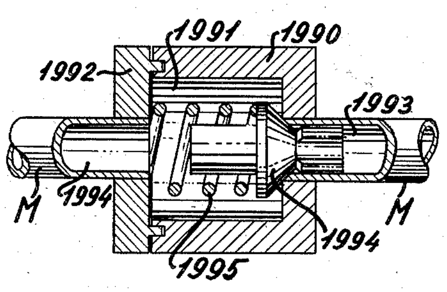
Figure 38:
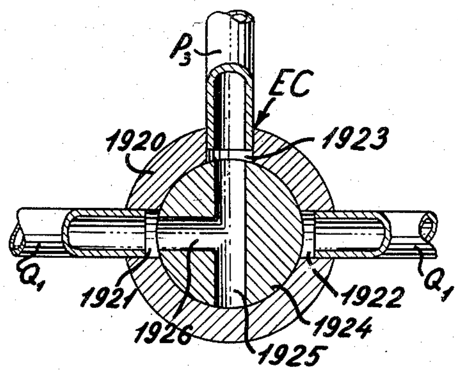
Figure 37:
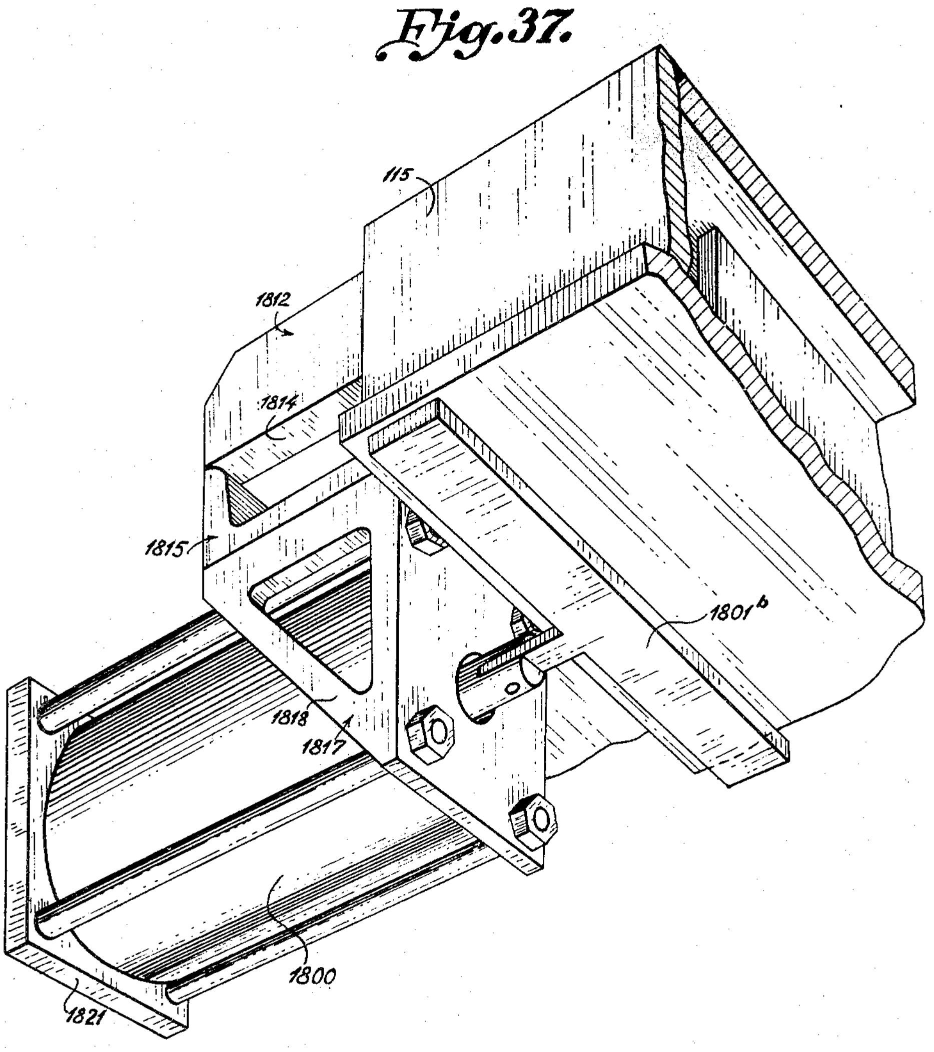
Figure 39:
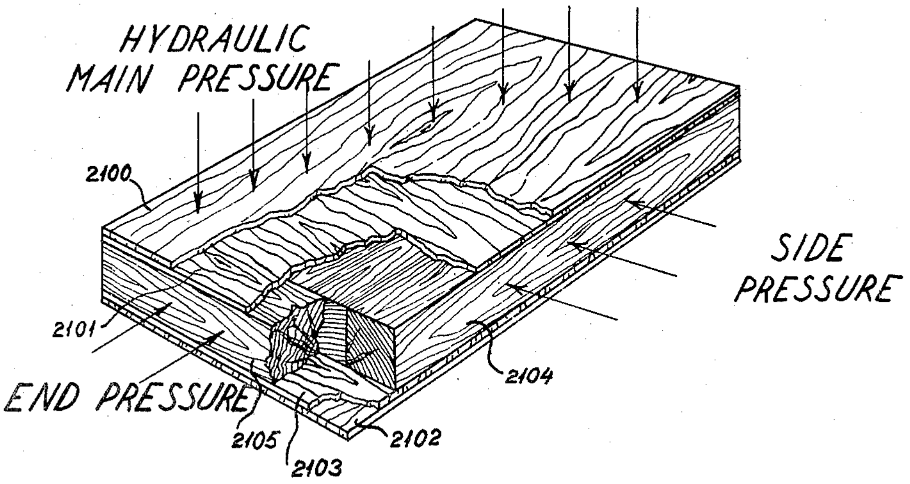
Figure 46:
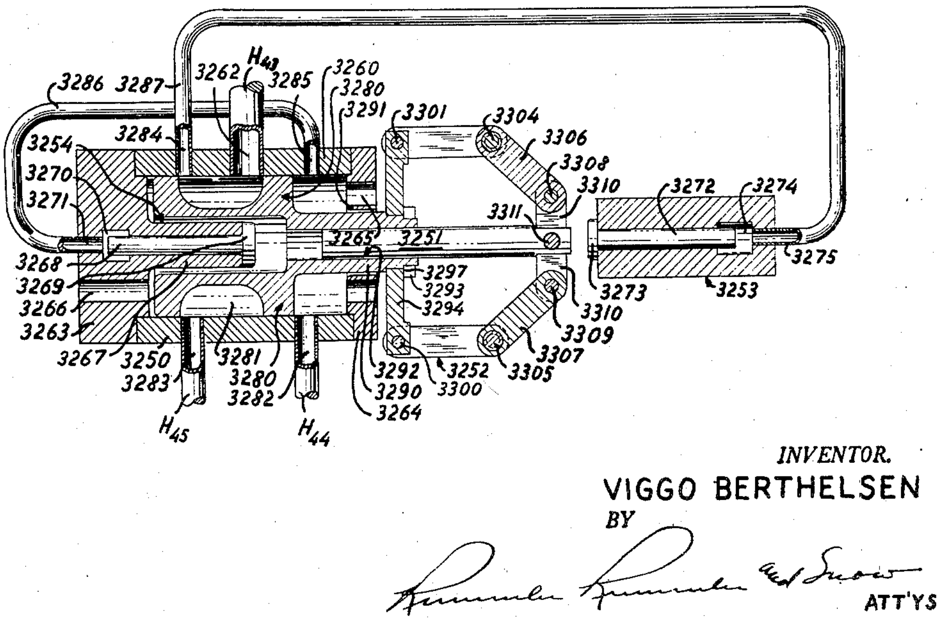
Figure 40:
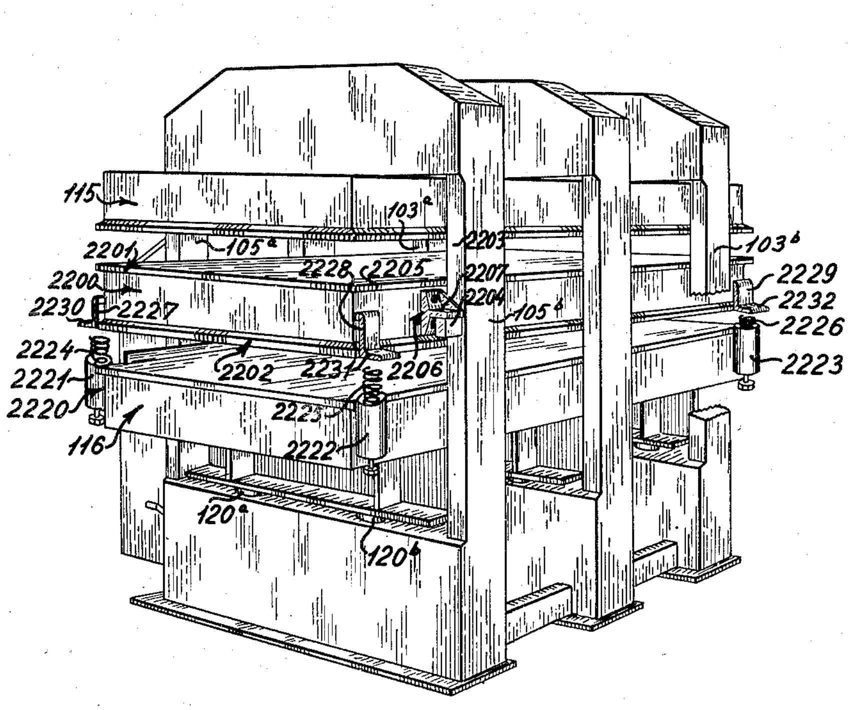
Figure 41:
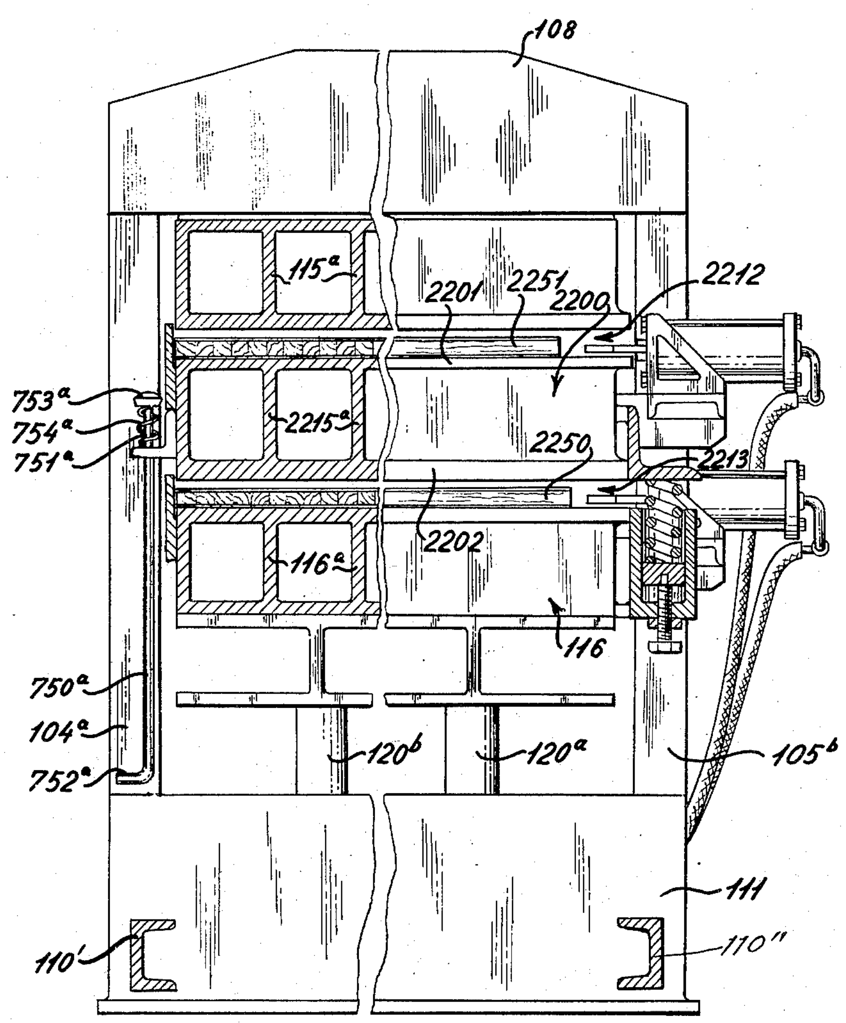
Figure 42:
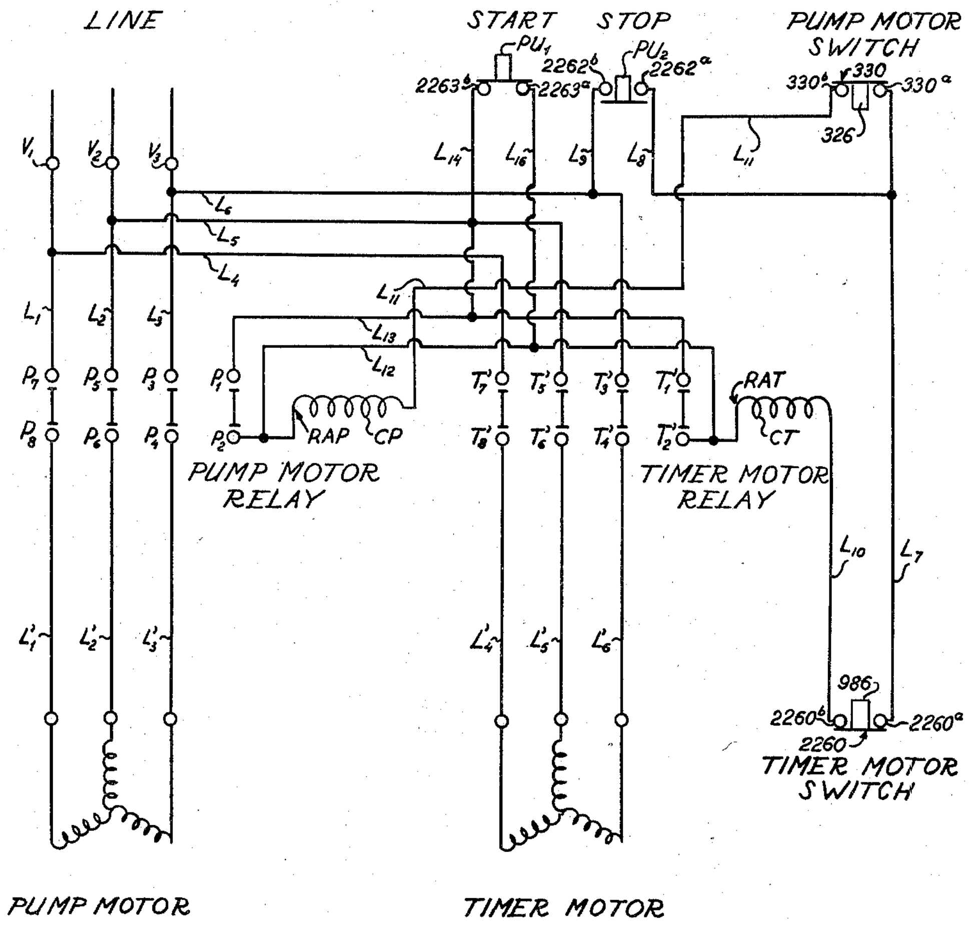
Figure 43:
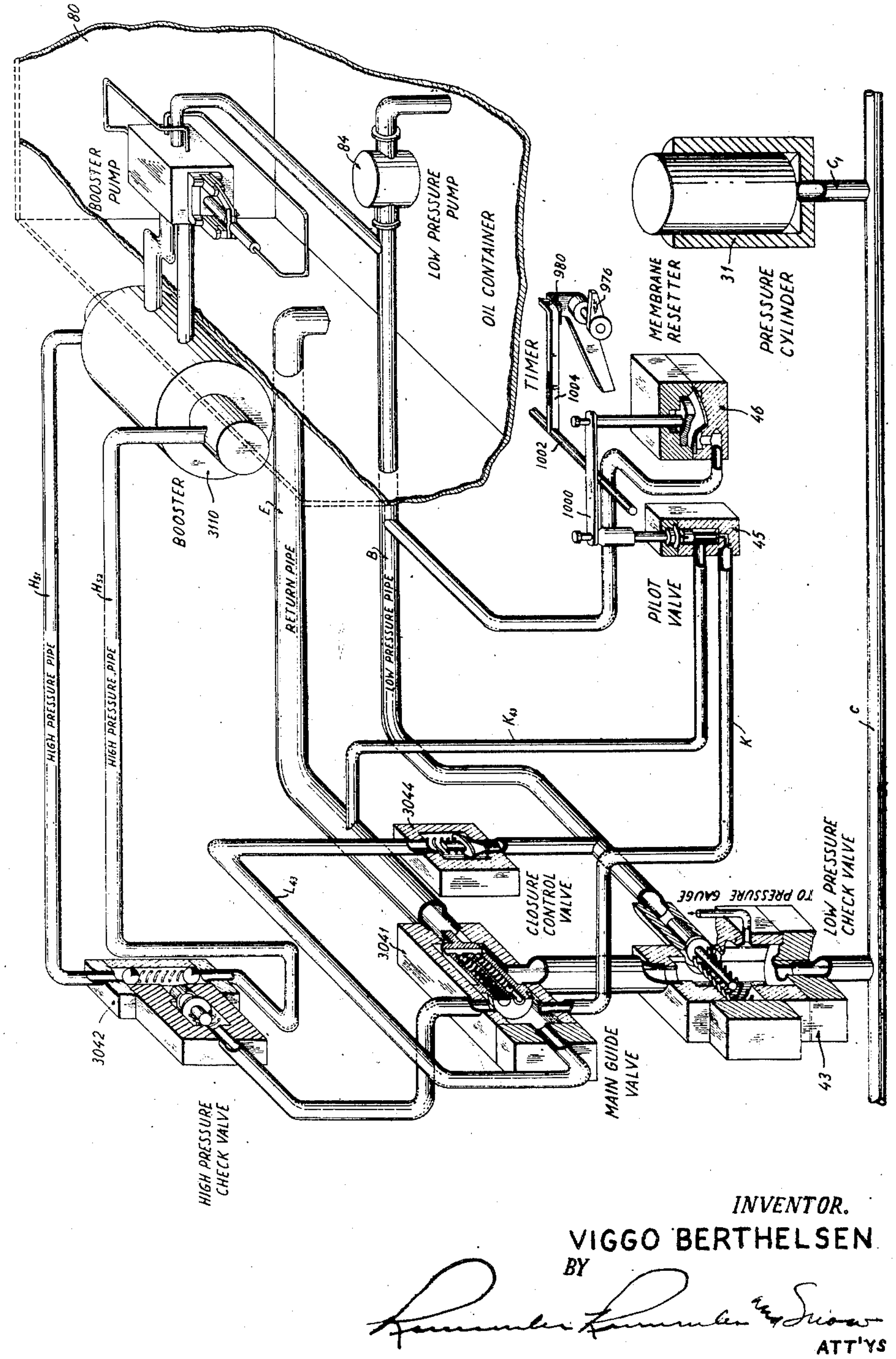
Figure 44:
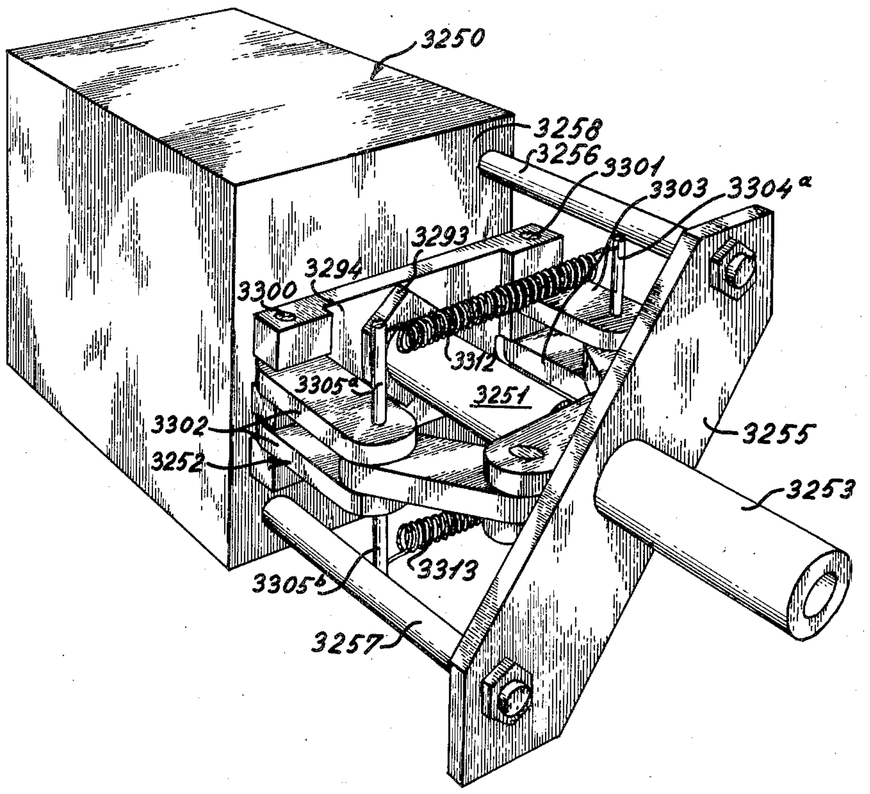
Figure 45:
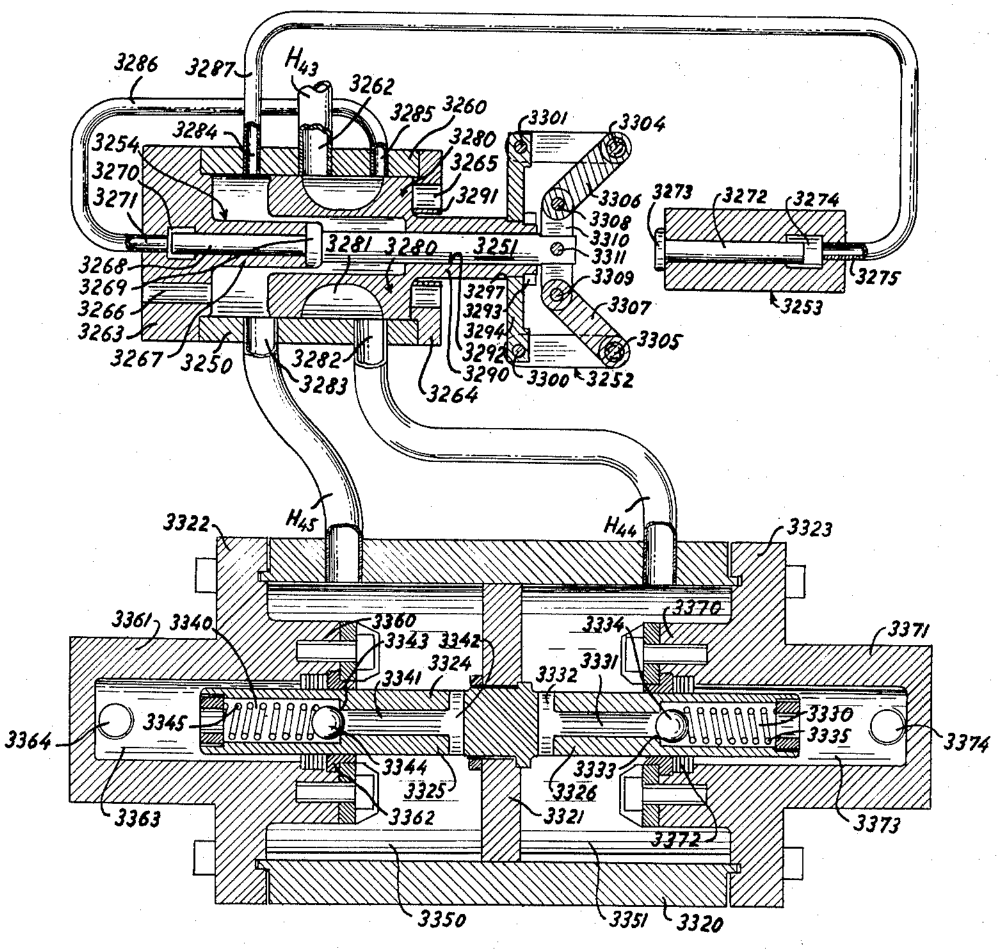
Figure 47:
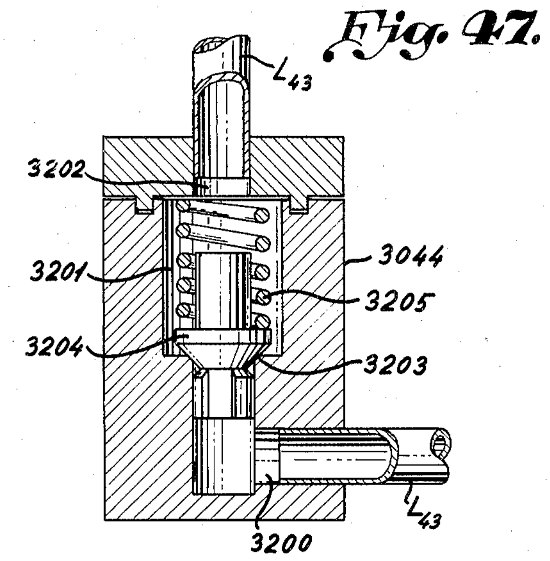
Figure 48:
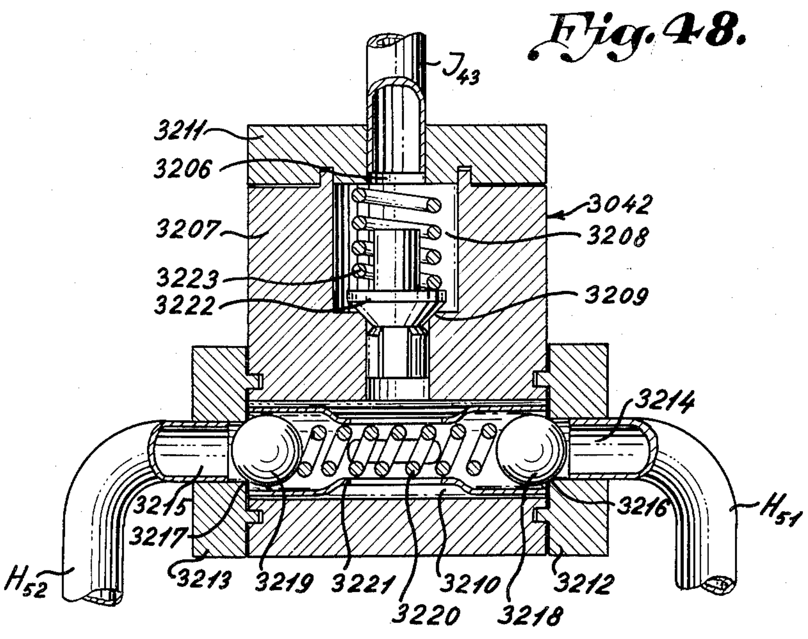
Figure 49:
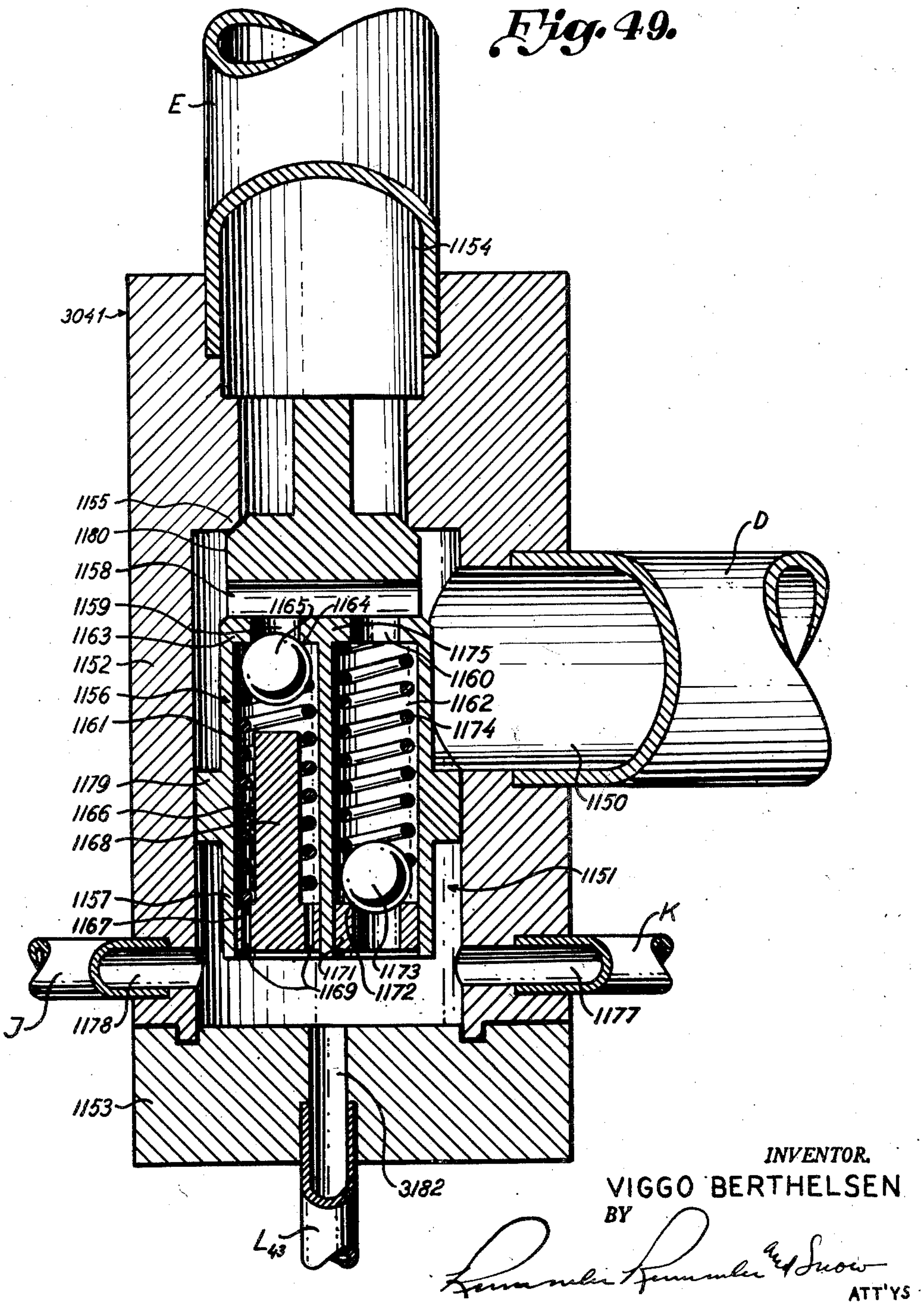
Figure 50:
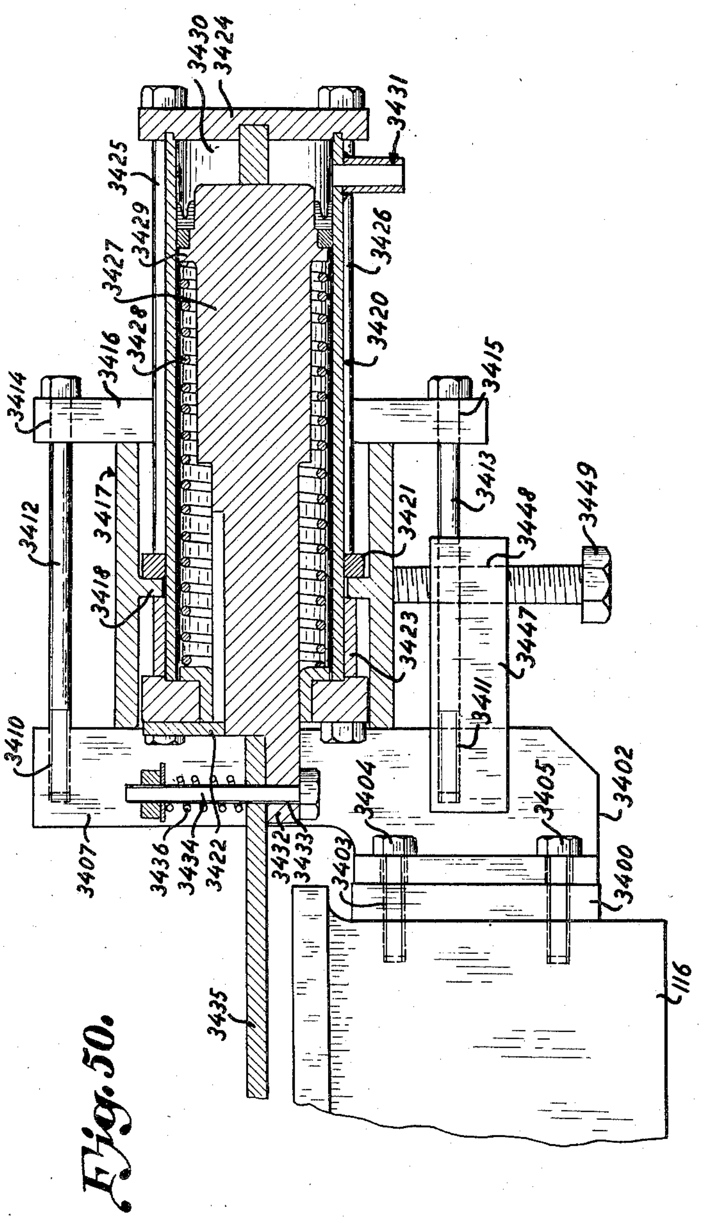
Figure 51:
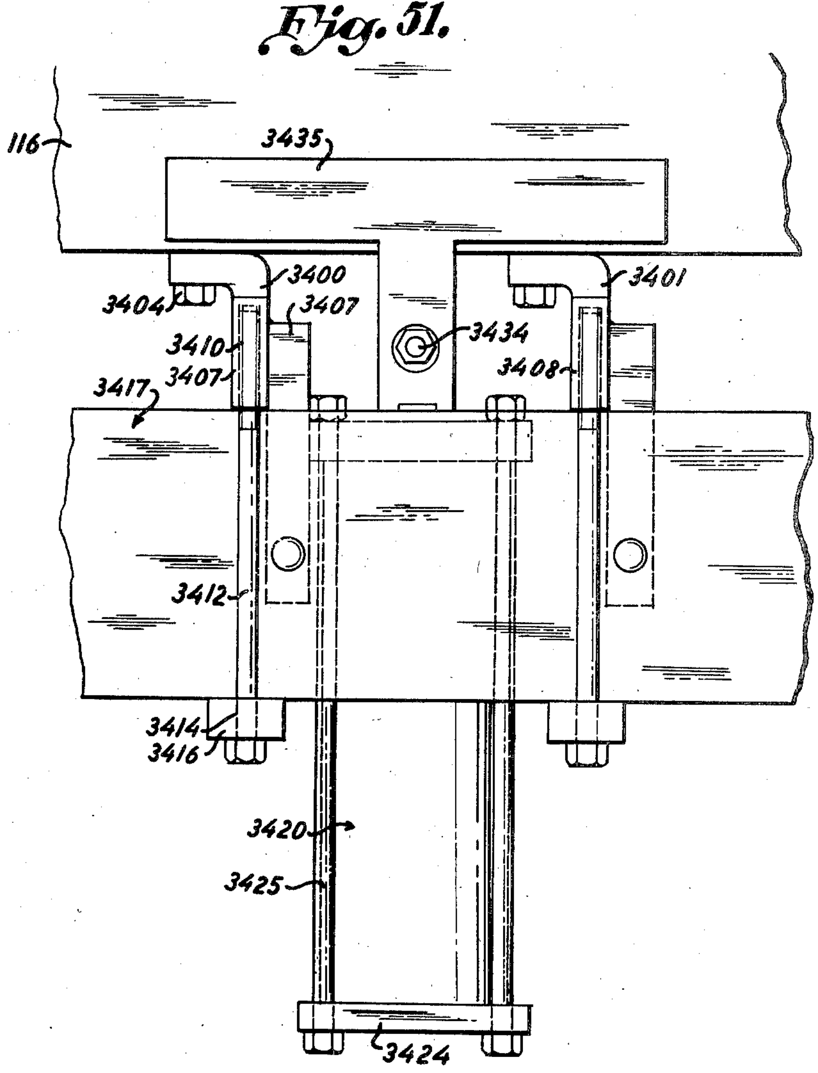
Figure 52:
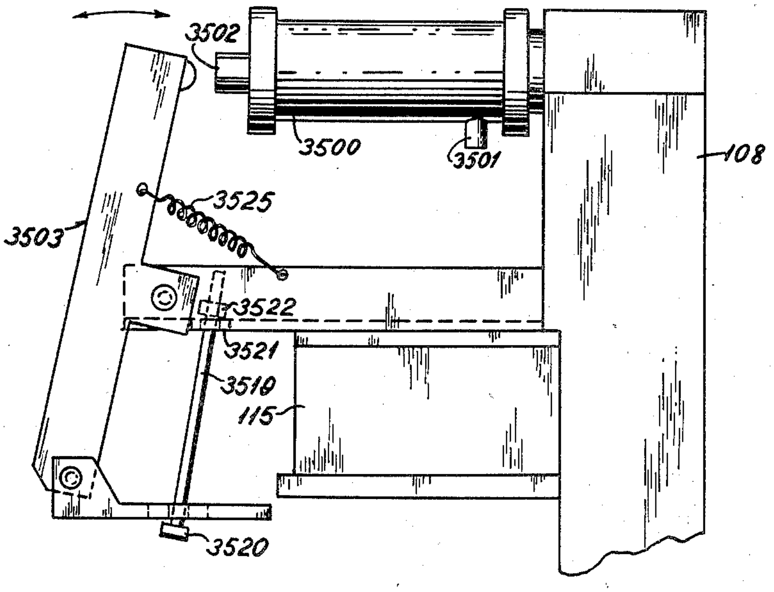
Figure 53:
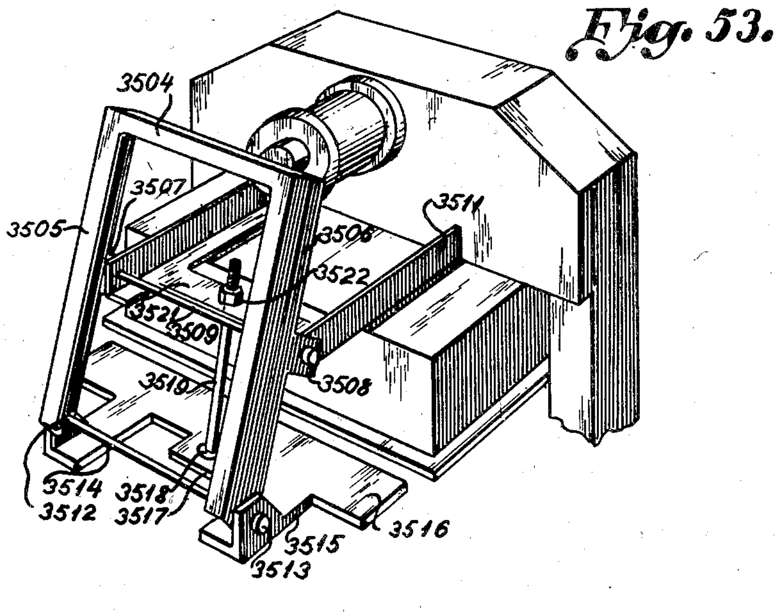

Figure 14 is a perspective view of the mechanical connection between the side pressure guide valve and the side pressure resetter, seen from one side with the parts in the initial position, Figure 15 is a perspective view of the same parts seen from the opposite side, Figure 16 is a view corresponding to that shown in Figure 14 with the parts in another position, Figure 17 is a view as that shown in Figure 15 with the parts in the position corresponding to that shown in Figure 16, Figure 18 is a view as that shown in Figures 14 and 16 with the parts in a third position, Figure 19 is a section showing the arrangement and construction of the main guide valve for the main hydraulic system, Figure 20 is a section through the arrangement showing the construction of the high pressure check valve, Figure 21 is a section showing the construction of the low pressure check valve, Figure 22 is a section showing the construction of the by-pass valve, Figure 23 is a section showing the construction of the pilot valve, Figure 24 is a section showing the construction of the membrane resetter, Figure 25 is a section showing the construction of the side pressure guide valve, Figure 26 is a section through the main valve to be used in the hydraulic system when the latter comprises side pressure means, Figure 27 is a section through the side pressure valve, Figure 28 is a section through the side pressure control valve, Figure 29 is a section showing the construction of the side pressure release valve, Figure 30 is a section through the side pressure resetter, Figure 31 is a perspective view of the press according to the invention which is provided as well with side pressure means as with end pressure means, Figure 32 is a diagrammatic illustration of the main valve system also including the valve systems to operate both the side pressure means as well as the end pressure means, Figure 33 is a section through the end pressure main valve, Figure 34 is a section through the end pressure release valve, Figure 35 is a section through the end pressure control valve, Figure 36 is a section through the end pressure counter valve, Figure 37 is a perspective view of the end pressure cylinder mounting, Figure 38 is a detail of the end pressure control two-way cock, Figure 39 is a perspective view partly in section of a panel plate, Figure 40 is a perspective view of a two-opening press not showing the end pressure or side pressure cylinders, Figure 41 is in part an end view and in part a section through the press shown in Figure 40 showing a detail of the construction of the two-opening press including the mounting of the side pressure cylinders, Figure 42 is an electric wiring diagram of the press shown in the foregoing figures, Figure 43 is the main hydraulic system of a modified embodiment of the press according to the invention, Figure 44 is a perspective view of the booster guide valve used in the press shown in Figure 43, Figure 45 is a section through the booster pump and booster of the embodiment shown in Figure 43 with the booster pump in one extreme position, Figure 46 is a section through the booster pump in the opposite extreme position of that shown in Figure 45, Figure 47 is a section through the closure valve of the system shown in Figure 43, Figure 48 is a section through the high pressure check valve of the system shown in Figure 43, Figure 49 is a section through the main guide valve to be used in the hydraulic system of Figure 43, Figure 50 is a side view partly in section through an alternative embodiment of the side pressure cylinder mounting, Figure 51 is a plane view of the arrangement shown in Figure 50, Figure 52 is a side view of a modified end pressure cylinder mounting, and Figure 53 is a perspective view of the modification shown in Figure 52.

In the embodiment of the invention there is provided hydraulic means for moving a movable press platen in a direction to engage a fixed press platen. The work piece, which is arranged between said press platens supported on the movable press platen will be pressed by means of a main or face pressure when the two press platens are brought together on the work piece. In connection with the hydraulic system there is provided means for discontinuing the movement of the movable press platen when the two press platens have reached a position with a predetermined space. This means that when the two press platens nearby are brought together on the work piece the movement of the movable press platen will be temporarily stopped.

The hydraulic system furthermore comprises hydraulically operated means, also referred to as side pressure means.

These are in one embodiment in the form of side presure cylinders with pistons and pressure shoes mounted adjacent one edge of the movable press platen and/or platens. The platens are at their opposite edges provided with an abutment member such as a rail or the like extending along said edge.

Said side pressure means are hydraulically activated when the movement of the movable press platen is temporarily stopped.

In the hydraulic system in which pressure fluid is supplied to the various pressure cylinders there is in one embodiment provided valve means adapted to stop the flow of pressure fluid to the main pressure cylinders operating the movable press platen or platens when the latter have been moved to a predetermined distance from the fixed press platen. Simultaneously means is provided to open the system for supplying fluid to the side pressure cylinders.

Thus the side pressure means will be activated. When the side pressure has reached a predetermined value, means will be operated for continuing or restarting the movement of the movable press platen.

In one embodiment the side pressure will be retained for some time. To provide such retaining of the side pressure the side pressure hydraulic system comprises means for closing the pipe lines of the side pressure system.

The hydraulic press thus generally comprises cylinders for closing the main press platens together and cylinders for exerting lateral pressure on the work piece between the main platens. The press has a power driven pump. This pump may be electrically driven or operated in any other manner. Said pump is operative unless and until a predetermined pressure or a predetermined spacing or daylight obtains between the press platens. Furthermore a pre-set timing device is provided. When set, this timing device prevents the escape of high pressure fluid and causes a build-up of pressure. After the preset time the timing device releases the hydraulic fluid and thereby opens an escape valve for the fluid.

In another embodiment of my invention comprising a press having more than one press opening or daylight there is provided a fixed press platen and two or more movable press platens. Hydraulic pistons are arranged to shift the lowermost of said movable press platens to engage the next lowermost press platen. The next lowermost press platen is responsive to such engagement and shifted to engage a further movable press platen etc. The uppermost of the movable press platens will then, when shifted, engage the surface of the fixed press platen.

In one embodiment I provide side pressure means connected with either of said movable press platens. Furthermore I provide the control means for the side pressure means to be actuated in response to a predetermined daylight between the uppermost of the movable press platens and the fixed press platen. When this daylight, however, controls the activation of the side pressure means associated with all movable press platens it is a problem to prevent the movable press platens from closing on the work piece until after the side pressure means has been activated.

Therefore according to one embodiment of my invention I provide in such duplex or triplex opening presses supporting means so as to support the next lowermost movable press platen spaced from the lowermost press platen a distance substantially corresponding to that daylight between the uppermost movable press platen and the fixed press platen responsive to which the side pressure means is activated. In a triplex opening press corresponding supporting means is provided between the next lowermost movable press platen and the uppermost movable press platen. Said supporting means is resilient and so dimensioned as to carry the weight of the next lowermost movable press platen and the work piece resting thereon with said predetermined daylight between its bottom and the top surface of the lowermost movable press platen. Said resilient supporting means is so dimensioned as not to form any considerable obstruction against closing of all press platens on the work pieces interposed therebetween after the side pressure has been applied.

In one embodiment the press is driven by an electric motor. This motor is activating the pump supplying pressure fluid to the hydraulic system. Manually operable means is provided for presetting the final pressure to be applied between the press platens. Further manually operable means is provided to preset the curing time. A starter is provided in an electric circuit for the main power motor. The circuit further comprises a switch operable responsive to the pressure obtained in the hydraulic system so as to stop the pump motor when the pressure has been obtained. The curing time control already referred to is provided with switch means in the pump motor circuit. At the expiration of the aforesaid curing time the pump motor circuit will be de-energized. Further switches are, however, provided in the electric circuit to allow restarting of the motor pump during the curing time interval if the pressure in the hydraulic system decreases.

More specifically my invention will now be described in full detail as follows:

*General description of the press*

The press which is shown in general in perspective view in Figures 1, 2 and 3 comprises two or more frames, in the example shown three frames 100, 101 and 102 each having vertical columns 103*a*, 104*a*, 105*a* and 103*b*, 104*b*, 105*b* respectively, upper horizontally disposed transverse beams 106, 107 and 108 and lower transverse beams 109, 110 and 111. Two pairs of spacing beams 109′—109″, and 110′—110″ are located adjacent the sides and lower end of the press to space the elements 103*a* and *b*, 105*a* and *b*. The three frames have their frame openings 112, 113 and 114 in axial alignment.

A stationary hollow press platen 115 is rigidly secured to the upper transverse beams 106, 107 and 108. A movable press platen 116 is arranged within said frame openings. The press platen 116 is supported on or secured to beams 117, 118 and 119. The press platen 116 is adapted to be hydraulic operated by pistons, of which the top ends 120*a*, 120*b* and 122*a*, 122*b* are visible at the end frames while only one piston top 121*a* is visible at the middle frame. The pistons are in the manner known by those skilled in the art, operable by hydraulic fluid in hydraulic cylinders (not shown in these figures) disposed between the vertical frame columns in the lower space of the frame openings embedded in the lower transverse beams 109, 110 and 111.

In a preferred embodiment the stationary hollow press platen is secured to the upper transverse beams as stiffening element to provide rigidness perpendicular to the frame openings. To this purpose the press platen 115 is as more specifically shown in Figure 3, provided with a plurality of longitudinal interior partitions 115*a* vertical in the direction of the transverse beams and connected at the upper and lower edges with the top- and bottom walls 115*b* and 115*c* respectively of said hollow press platen.

The mechanical construction comprising these features is more specifically disclosed in my copending Patent No. 2,627,290, to which reference is made. With respect to the mechanical construction reference is also made to my copending Patent No. 2,627,289.

In general the press comprises a frame construction preferably comprising two or more frames having vertical frame columns, upper transversal frame parts and lower transversal frame parts. In this frame construction is fixed an upper platen and under this movable platen, which can be operated from a plurality of hydraulic cylinders so as to engage the under surface of the top platen when the press is operated. The hydraulic cylinders are firmly connected with the frame construction and arranged on or within the lower transversal bars.

The upper press platen as well as the lower press platen are designed for being heated by means of steam. Preferably the press platens are as disclosed in the abovenamed Patents Nos. 2,627,290 and 2,627,289 in form of a hollow box having an interior zigzag formed steam channel.

As more specifically indicated in Figure 3, the upper platen and preferably also the lower platen is in form of a flat welded box. In this box the partitions are provided to form a zigzag heating channel in the platen. These partitions, which are arranged perpendicular to the plane of the frames will simultaneously give the platen the necessary rigidness so as to thereby also contribute to the static rigidness of this press construction.

As shown in Figures 1, 2 and 3, one feature of the press is the mounting of a plurality of side pressure cylinders 140*a*—140*f* on one edge of the movable press platen 116.

These side pressure cylinders are mounted on brackets in a manner more specifically shown in Figure 6, so that they can easily be demounted, if the press is to be operated without side pressure.

As abutment for the load in case of side pressure a longitudinal rail 172 is arranged, extending vertically upwardly from the edge of the movable press platen opposite the side pressure cylinders. The abutment rail may be detachably mounted for instance to the press platen by bolts 174.

The longitudinal rail extends preferably above the top surface of the movable press platen 116 slightly more than the maximum thickness of a panel plate to be pressed in the press. The rail 172 is therefore disposed laterally of the press platen 116 and simultaneously the corresponding edge of the fixed press platen 115 is spaced from the interior edges of the vertical columns a distance to enable passage of the top portion of said abutment rail 172.

On the front side of the press, see Figure 1, there is provided a control panel 176 comprising four handles designated $Ha_1$, $Ha_2$, $Ha_3$ and $Ha_4$. On the top of the panel there is shown five gauges $Ga_1$, $Ga_2$, $Ga_3$, $Ga_4$ and $Ga_5$. In the middle of the panel there are two push-buttons $Pu_1$ and $Pu_2$ for start and stop respectively.

The left handle $Ha_1$ corresponds to the left gauge $Ga_1$. The connection between the parts is more specifically shown in Figure 7. This handle serves the purpose of presetting the horizontal hydraulic side pressure. The gauge is calibrated to show the preset pressure. The valve of the side pressure system which is designated by numeral 475 will automatically adjust the side pressure to the valve pre-set by the handle $Ha_1$.

The handle $Ha_2$ belongs to the gauge $Ga_2$. By this handle the vertical hydraulic pressure is preset. The other operating parts are more specifically shown and described with reference to Figure 8. The gauge $Ga_3$ is the pressure gauge, which by means of the gauge system also shown in Figure 8 indicates the total vertical pressure between the two press platens.

The handle $Ha_3$ belongs to the gauge $Ga_4$. By means of this handle the curing time is preset to be controlled by the timer system more specifically shown in Figure 10.

The right handle $Ha_4$ and the corresponding gauge $Ga_5$ are controls for panel thickness. The gauge is calibrated according to the thickness of the panel to be pressed and controls the vertical movement of the movable press platen together with the start of the side pressure, if this is to be applied by means of the mechanism to be specifically shown in Figures 14 through 18.

In the lower part of the control panel the different valves and pipe connections between these are arranged, see Figure 4. The hydraulic system here basicly comprises a low pressure check valve 43, a main guide valve 41, a high pressure check valve 42, a bypass valve 44, a pilot valve 45 and a membrane resetter 46. These valves belong to the main hydraulic system together with the timer which is shown and described with reference to Figure 12. Details of these valves will appear from the Figures 19 through 24.

Furthermore the control panel encloses valves and operating mechanism for the side pressure system which, as will be more fully described in the following in connection with Figure 13, comprises a main valve 474*a*, which is also included in the main hydraulic system, a side pressure valve 472*b*, a side pressure control valve 475, a side pressure release valve 474, a side pressure resetter 476 and a side pressure switch system which includes a valve 471 together with a mechanical switch system. Details of these valves will appear from Figures 25 through 30. Details of the side pressure switch system will appear from Figures 14 through 18.

This mechanical switch system is operated by means of a rod or lever 750 shown in Figure 3, which is supported on the front longitudinal edge of the movable press platen. On this platen there is provided a bracket 751 having a hole or aperture through which is extending the rod 750, the lower end of which is bent at 752. The top end of the rod 750 is provided with an abutment 753. Between this abutment and the bracket there is inserted a spring 754. The bent end 752 of the rod 750 extends into the control panel casing and serves to operate the side pressure switch system in a manner to be more fully described in the following in connection with Figures 14 through 18.

The oil tank or container 80 is arranged between two of the press frames in the lower space between the cross beams.

Figure 5 is a perspective view of the whole system including the oil tank 80 seen from the rear side with the whole control panel removed.

In Figure 4 as well as in Figure 5 only the different valves are identified by numbers. The pipe line connections between the different valves are more clearly shown in the diagrams of Figures 12 and 13.

In the following will now be described the mechanical arrangement in connection with the four control handles and the appertaining gauges.

*Side pressure control handle*

As briefly described hereinbefore the left hand handle $Ha_1$ and appertaining gauge $Ga_1$ is adapted to control the side pressure.

Now with reference to Figure 7, the handle $Ha_1$ is arranged on a rotatable spindle 201 carrying a worm (not shown) meshing with a worm wheel section 202 on a rotatable disc 203. This disc is carried by a short spindle 204 supported in parallel bracket portions 205 and 206 respectively. The bracket has transverse portions 207 and 208 also forming bearings for the handle spindle. The bracket is by screws, rivets or the like 210 secured to a vertical wall or partition 211 having an arcuate top surface carrying the gauge $Ga_1$. To the rotatable disc 203 there is secured an arm 212 ending in a pointer 213 pointing on the gauge $Ga_1$. The disc 203 has furthermore an eccentric arm 214 extending substantially parallel with the axis of the disc spindle 204. At the end of this arm there is provided a link or the like 215 connecting the arm 214 with a vertical rod 216. This rod is provided with an abutment 217, for instance in the form of a bushing or the like secured on the rod by means of a set screw 218. The lower end of rod 216 extends through an aperture 219 in the distal end of the lever 220. The lever 220 is pivotally secured to the bracket 223 and between the bifurcated portions 222 by the spindle 221. Therefore, it should be noted that the lever 222 extends above the top end of the side pressure control valve 475.

The rod 216 is provided with a spring 225 which extends between the distal end of the lever 220 and the abutment collar 217 which is secured on the rod 216. The spring 225 acts on the lever 220 to retain the same in the position shown in Figure 7, while upward movement of the lever 220 against the action of spring 225 is effected by upward movement of the valve operating member 226 which extends through the top cover of the valve 475 and abuts against the under side of the lever 220.

It will be understood that by adjusting the tension of the spring by rotating the handle, the pressure for which the side pressure control valve 475 will open can be pre-set in advance.

The position of the arm with the pointer is so adapted to the spring pressure as to point out on the gauge the preset pressure for which the side pressure control valve will open.

*Panel thickness control handle*

The right handle $Ha_4$ belongs as explained hereinbefore to the side pressure switch system and the side pressure guide valve 471.

With reference to Figure 9, the handle $Ha_4$ is secured on a rotating spindle 250 having a worm (not shown) meshing with a worm wheel section 251 on a rotatable disc 252. The arrangement is very similar to that shown in connection with Figure 7. The rotatable disc 252 is arranged on a short spindle 253 supported in a bracket 254, 255 which has transverse portions 256 and 257 forming bearings for the spindle and the worm. The bracket 254, 255 and 256, 257 is mounted on a partition or wall 258 inside the control panel. The top portion of this wall is supporting the gauge scale $Ga_5$. The disc spindle 253 has a radially extending arm 259 the end of which is bent to form a pointer 260 pointing on the scale. To the rotatable disc 252 there is secured eccentrically an axially extending short arm 261. At the end of this arm 261 there is provided a link 262 connecting the arm 261 with a longitudinally movable adjustment or control rod 744 for the side pressure switch mechanism, which will be more fully described with reference to Figures 14 through 18.

*Side pressure switch control system*

The slidable member of the side pressure guide valve 471 (see Figure 25) has a spindle 560, Figures 14–18, that extends outside the valve housing and is influenced by a spring 728 interposed between a collar or the like 702 fixed on the spindle, for instance by means of a set screw 703 and a bracket 704 secured to a plate 706, which carries the valve 471 and its operating mechanism. This system, which hereinafter will be referred to as the side pressure switch control, and controls the shifting of supply between the main hydraulic system and the side pressure system, is more specifically shown in Figures 14 through 18.

The carrier plate 706, which is also seen in the view of Figure 4, is in any convenient manner, for instance by means of bolts 707*a* or 707*b* secured to one of the control panel casing walls, where it is located in the right hand top corner.

On the carrier plate 706 there are pivoted two arms 708 and 709, Figure 15, supported by pivot pins 712 and 714. The arm 708 is by means of a transverse pin 716 connected with the valve spindle 560 adjacent the top of the valve spindle.

In order to hold the slidable member of the guide valve 471 in its lower position a pawl member 722 pivoted at 725 on a pin 720 has adjacent its free end a hook 724 engaging the free end of the arm 708. A spring 726 acting on an arm 721 urges this pawl member 724 to its operative position, holding the various parts in the position shown in Figures 14 and 15.

On the arms 708 and 710 are provided brackets 729 and 730 respectively, through which is slidable a spindle 732 surrounded by a spring 734 which at its end abuts against the brackets 729 and 730.

The free end of the arm 710 is slotted and has two branches 709 and 711 guiding therebetween a rod 736 which by means of a pin 738 is secured to a tiltable lever 740 articulated by a pin 742 to the flattened end 744*a* of the control rod 744. The lever 740 is further influenced by a spring 752 secured to a convenient fixed point, such as a hook 753 secured inside the control panel, see Figure 4. The lower end of the rod 736 has a slot 746, which is in sliding engagement with a short guiding pin 748 extending from the base plate 706.

The control rod 744 is, as previously described, at its top end connected with the hand wheel H*a*4 and the mechanism shown in Figure 9. It will be understood that hereby the vertical position of the pin 742 can be adjusted so that the position of the lever 740 can be preset.

The rod 736 has a hook 737 which influenced by the pull of a spring 756 engages a hook-like projection 739 between the fork branches 709 and 711 of lever 710. Furthermore, the top of the arm 736 has a projection indicated by the dotted line 735 adapted to engage the arm 721 of the pawl 722 to release the hook 724 from the nose 707 of the arm 708. To engage the spring loaded end of the lever 740 there is associated with the movable press platen 64 the projection or the like 752, already shown in Figure 3.

*Pressure gauge*

The next handle to the left H*a*2 belongs as outlined to the pressure gauge G*a*2 and G*a*3, the construction of which is as follows, see Figure 8:

The hand wheel H*a*2, extending from the operation panel, is arranged on a rotatable shaft 304 journaled in bearings 306 and 308 on a supporting plate or partition 310 in the control panel and carrying between said bearings a worm 312 meshing with a toothed segment 314 on a disc 316 rotatably arranged on a spindle 318 having an end 320 extending through the disc 316 and carrying on this end an abutment or a projection 322. The disc 316 is further provided with a radially extending arm 324 having adjacent its end a pointer 326 movable over the scale G*a*2. On the disc 316 there is further arranged an electric switch 330 supported on arms 332 and 334. The switch 330 has a push rod 336 lying in the path of the abutment 322, so as to be pressed thereby when the spindle 318 is rotated in the direction of the arrow shown.

Spaced from the wall or plate 310 there is arranged a further wall 340, in which is provided a bearing (not shown) for the other end of the spindle 318. There is secured to the spindle 318, near said other end, an arm 342 carrying adjacent its end a pointer 344 movable over the scale G*a*3.

Between the two walls 310 and 340 there is arranged a rod 348 surrounded by a helically wound tube 350, the right hand end of which projects as an open tube 353 and through a pipe line (not shown) is connected with an outlet of the low pressure check valve, see Figures 12 and 13. The left hand end of tube 350 is closed and carries a radially extending arm 354. This arm is by means of a pin 356 connected with a link 358, which in its turn by a pin 360 is adjustably connected with a slotted arm 362 secured to the spindle 318.

The tube end 352 is connected, as will be described, with a hydraulic system adapted to operate the press tables so that pressure fluid from this system is enabled to enter the helical tube 350. When the pressure in this tube is increased the tube tends to uncoil with the result that the arm 354 moves in clockwise direction as indicated by the arrow adjacent said arm. This by means of the link and lever system 356—362 results in turning of the spindle 318 showing of the total pressure in the hydraulic system on the scale G*a*3 and approaching of the abutment projection 322 to the control knob 336 of the switch 330.

It will be understood that by rotating the handle H*a*2, the disc 316 is rotated and thereby the position of the switch 330 relative to the abutment 322 can be varied.

The arrangement of the parts is such that the push rod 336 is pressed when the pressure shown by the pointer 344 reaches the value of the pressure preset by the pointer 326 on the scale G*a*2. The switch 330 is by means of a cable 331 connected in the pump driving motor circuit, so as to switch off the motor, when the push button is pressed, viz. when the pressure has arrived at the preset value.

If the pressure should decrease for any reason during the curing time, the abutment moves away from the push rod and the motor is started again, so that the pressure is maintained during the whole operating time.

*Curing time control*

As previously explained the handle H*a*3 nearest to the right hand controls the curing timer mechanism, which is more fully shown in Figures 10 and 11.

This handle H*a*4 is secured to a rotatable spindle 570 having as in the case of Figures 7 and 8 a worm (not shown) meshing with the worm wheel section 576 on a rotatable disc 578. The rotatable disc 578 is arranged on a spindle 580 supported in a bracket 581, 583 having transverse portions 585, 587 forming bearings for the spindle 570 and the worm. The bracket 581, 583, 585, 587 is mounted in a partition or wall 584 inside the control panel. The top portion of this wall is supporting the gauge scale G*a*4. The disc spindle 580 is provided with a radially extending arm 582, the end of which is bent to form a pointer 584 pointing on the scale G*a*4.

To the rotatable disc 578 there is secured an arm 588 having an extension provided with a slot 590. In this slot there is adjustably secured a short arm 591 on the end of which there is provided a link 593 connecting the arm 591 with a longitudinally movable adjustment or control rod 592 for the time control mechanism, which will now be more fully described.

The end of the timer control rod 582 is by means of a pin 902 connected with a two armed lever 904 pivotally arranged on a pin 906 on the front 908 of a box, generally indicated by 910, in which the timer mechanism is mounted. The other arm of the lever 904 is in the form of a sector 905 provided with peripheral gear teeth 912 in mesh with a pinion 914 on a short spindle 916 extending through the front wall 908 and therebehind bearing a radial arm 918.

In axial alignment with the spindle 916 there is arranged a spindle 920 mounted in the rear wall 922 of the timer box. Concentrically round the spindle 920 there is provided a cylinder 924 carrying a ratchet wheel 926. In the interior of the cylinder 924 is housed a heavy spring 928 (Figure 11) connected so as to tend to rotate the wheel in anti-clockwise direction (in Figures 10 and 11). Such movement is possible when the ratchet wheel is free until an axially extending arm 930 on said wheel abuts the radial arm 918 on the spindle 916.

Behind the timer box there is arranged an electric timing motor 932 the spindle 934 of which is provided with a worm 936 meshing with a worm wheel 938 mounted in brackets 940 and 942. The spindle 944 of the worm wheel 938 carries at one end an eccentrically mounted ball bearing 946. This ball bearing which is preferably of the self-aligning type, has its outer race 998 engaged in a shell-like portion 950 at one end of a two armed lever 952 pivoted about a fixed shaft 954 secured between the front and rear walls of the timer box. The left hand arm 956 of the lever 952 carries by means of a pin 958 an actuating pawl 960, which under influence of a spring 962 engages the teeth of the ratchet wheel 926, so as to move the latter in clockwise direction under influence of the rocking movement imparted to the lever 952 by the eccentric ball bearing 946. On a fixed spindle 964 there is provided a holding pawl 966, which by means of a spring 968 is also held in engagement with the ratchet wheel 926. The pawl 966 is at its top end provided with a laterally extending projection 969 which lies in the path of a radial downward extension 970 from a spindle 1002 mounted in the front wall 908 of the timer box and carrying externally a two armed lever 1000.

In the front wall (Figure 10) there is also mounted a short spindle 974 carrying on the exterior of the box an arm 976 and on the interior a two armed lever 978, the arms of which are arranged substantially at right angles to each other. The upright arm 980 of the lever 978 is provided with a lateral projection 982 arranged for engagement with a laterally projecting detent 1006 on an arm 1004 extending horizontally from the shaft 1002 within the box. A spring 984 tends to move the lever 978 in clockwise direction to the limit position shown in Figure 10, in which a stop (not shown) that extends inside the box for instance secured to the front wall thereof will prevent further clockwise turning of the lever 978.

The arm 976 is adapted to operate a push rod 986 of the timer motor switch 987 shown in Figure 4. The same can be operated for emergency purposes by means of a two armed lever 988, 990 pivotally arranged in a bracket 992 on the right hand wall 994 of the timer box. The lever arm 988 is provided with a foot-operable extension 996 extending outside the control panel.

The timer motor switch is adapted to start the motor 932 when the push button 986 is raised and to stop the motor when the push button is pushed down as by a spring when the lever 976 turns clockwise.

*Side pressure cylinder mounting*

As shown in Figs. 2 and 3 one feature of the press is mounting of a plurality of side pressure cylinders, which are included in the hydraulic system so as to effect operation of the side pressure pistons by means of a specific part of the hydraulic system and in a manner to be more fully described in the following.

Briefly the side pressure cylinders are mounted on brackets secured to and extending from a longitudinal edge of the movable press platen so as to allow the side pressure cylinders to follow the movement of the movable press platen. The side pressure members or pressure shoes are adjusted to operate in a predetermined level above the top surface of the movable press platen.

The mounting of a side pressure cylinder in one embodiment is more specifically shown in the perspective view of Fig. 6.

On the lateral longitudinal wall of the press platen 116 there is secured a plurality of extending brackets 1700 of which only one is seen in Fig. 6. These brackets may be adjustably bolted to the press platen in any convenient manner.

On the top surface 1701 of these brackets there is secured a longitudinal rail 1702, for instance a U-rail having its body portion 1703 extending upwardly to form a supporting surface for the side pressure cylinders.

The side pressure cylinder which is not shown in detail except in the diagrammatic illustration of Fig. 13 is simply a cylinder having an interior spring loaded piston from which a piston spindle 1501 is extending through the one end of the cylinder.

The cylinder is fixed to a bracket 1704 having a central aperture 1705 for the passage of the spindle 1501. An end plate 1706 is arranged at the bottom end of the cylinder 140 and between the bracket 1704 and the end plate 1706 there is at each corner arranged a longitudinal bolt of which three, 1707, 1708 and 1709 are seen in Figure 6. These bolts are provided with tightening nuts 1710, 1711 and 1712, so as to hold the cylinder firmly in position clamped between the bracket 1704 and the bottom plate 1706.

The bracket 1704 is provided with triangular end walls of which only the front end wall 1713 is seen. Between the lower edges of these end walls there is provided a bottom plate having holes for fastening bolts of which the front bolt is seen in Fig. 6 and designated by 1714 and extends into a screw threaded hole in the body portion 1703 of the U-rail.

The extending end of the spindle 1501 is flattened at 1715 and provided with a hole for passage of a screw or bolt 1716 extends into said hole. The hole may be screw-threaded to receive and hold a screw-threaded end of the bolt 1716 or the latter may have a nut at the lower extending end. On the flat top surface of the extension 1715 there is secured a pressure shoe in form of a T-shaped member having a relatively short body portion 1718 and an elongated pressure portion 1719 arranged in parallel relationship with the longitudinal edge of the press platen 116.

In the body portion 1718 there is provided a hole 1720 for the passage of the screw or bolt 1716. Between the head of said screw or bolt and the top surface of the body portion 1718 there is interposed a spring 1721 so as to allow a limited vertical movement of the pressure shoe when the latter engages the work piece generally referred to as 1722 in Figure 3.

It will be understood that the pressure shoes are arranged at suitable intervals so as to enable a uniform pressure of the pressure shoes against the edge of the work piece. Preferably the pressure portions of the pressure shoes are of longitudinal extension so as to form a substantially continuous side pressure member formed by all pressure shoe sections in alignment.

It will further be understood that the pressure shoes are spaced a distance above the top surface of the press platen in order to enable the pressure shoes to engage the work piece edge substantially at a middle point between the top and the bottom surface of the work piece.

It will further be understood that an adjustment of the level of the pressure shoes above the top surface of the press platen can be made by interposing between the brackets 1704 and the top surface of the rail 1702 suitable distance pieces (not shown), for instance simply in form of plane surfaced plates of a thickness corresponding to such distance above the press platen surface at which the pressure shoes had to be raised. The distance pieces or plates will have to be provided with holes for passage of the fastening bolts 1714.

*Valve system*

The hydraulic system of the press shown in the flow diagram of Figures 12 and 13 comprises a plurality of pipes and valves some of which form a main system adapted to operate the pressure cylinders 31 and others of which are adapted to operate the side pressure cylinders 140.

A.—*Main system*

In the main hydraulic system which will be described below with reference to the diagram of Figure 12, a high pressure pump 82 and a low pressure pump 84 are arranged inside the oil container 80.

These pumps are connected with a drive (not shown) comprising for instance a gearing mechanism and a driving spindle extending through the wall of the oil container and carrying a pulley 83 (see Figure 5) by means of which the two pumps are driven simultaneously from a main drive motor (not shown) arranged behind the oil tank in the lower space between two of the press frames. The tube 80a seen in Fig. 5 which extends on the top of the tank is a venting tube. The tube 80b extending from the rear wall of the tank is an oil filler tube normally closed by a closure cap (not shown) and adapted to be connected with an oil supply pipe when the tank is to be filled.

The two pumps are driven continuously until the motor is stopped, either by the pressure gauge system described (Figure 8) or by the timer mechanism (Figures 10 and 11).

The low pressure pump 84 is inserted in a main low pressure pipe line B from which inside the oil container there is branched a main high pressure pipe line H, in which the high pressure pump 82 is inserted.

The main low pressure pipe B extends to the inlet of a low pressure check valve 43, which in section is shown in Figure 21.

This valve comprises an exterior casing, in the example shown assembled from two parts 1101 and 1102, which may be bolted together or assembled in any other convenient manner, not shown. The pipe B extends into a valve inlet 1103 formed in a stud 1104 screwed by means of screw threads 1105 into the valve portion 1101. At the interior end of this stud there is formed a valve seat 1106 only closed by means of a valve closing member 1107. In the interior valve chamber 1108 there is arranged a spring 1109 abutting at one end against the valve closing member 1107 and at the other end against a cover 1110 bolted or in any other convenient manner secured to the valve housing and closing the opening of a bore 1111 in axial alignment with the inlet 1103.

Perpendicular to this bore 1111 there is arranged another bore 1112 forming the interior valve chamber having an upward outlet 1113 communicating with a pipe D and a downward outlet 1114 communicating with the pressure cylinder pipes C from which branched pipes $C^1$ extend into the several press cylinders 31. The construction of these cylinders is not shown in detail being known to those skilled in the art. Each of the press cylinders is provided with a piston adapted to cooperate with the movable platen 116 as described hereinbefore.

The pipe D communicates with an inlet in a release or main guide valve 41, which in section is shown in Figure 19.

This valve comprises an exterior housing 1152 having a main inlet 1150 for the pipe D and an interior chamber 1151. The valve chamber 1151 includes a central bore and is closed by means of an end cover 1153 secured to the valve housing by bolts or in any other convenient manner, not shown. On the end of the valve chamber remote from the cover 1153 there is provided an outlet 1154, at the entrance of which there is provided a valve seat 1155 adapted to be engaged by a main valve closure member 1156 for closing the outlet 1154 communicating with a return pipe E extending into the oil tank 80.

The valve closure member is formed as a cylinder 1157 having near its closure end a cross channel 1158 from which branched channels 1159 and 1160 communicate with parallel longitudinal interior bores or channels 1161 and 1162 respectively, in the cylinder. At the right hand end of the channel 1161 there is provided an inwardly extending flange 1163 forming at its edge a seat 1164 for a ball 1165 or a similar valve closure member adapted to close the channel 1161 under influence of a spring 1166 the one end of which abuts against the valve closure member 1165 and at the other end of which abuts against a shoulder 1167 on a member 1168 that extends in the interior of the channel 1161. Through this channel there is provided bores or like channel 1169, so that the rear end of the auxiliary valve formed in the channel 1161 communicates with the rear end 1170 of the main valve chamber.

In the other channel 1162 there is provided a similar but oppositely directed auxiliary valve. A flange 1171 forms at its edge a seat 1172 for a ball 1173 or another convenient valve closure member influenced by a spring 1174, one end of which abuts against the valve closure member 1173 and the other end of which abuts against an inwardly extending flange 1175 that surrounds the inlet 1160.

The spring 1174 is relatively weak, so that the valve 1173 will open relatively easy, whereas the spring 1166 is relatively strong, so that the valve 1165 will only open for a pressure, which is higher than the pressure for which the valve 1173 will open.

From the rear end 1170 of the main valve chamber an outlet 1177 communicates with a pipe K and an inlet 1178 communicates with a pipe J.

The valve closure member 1156 is adjacent its middle portion provided with an annular piston flange 1179 which is a sliding fit in the interior of the valve chamber 1151. The remaining part of the valve closure member 1156 is of reduced cross section to allow the pressure medium in said valve chamber to act on either end surface of said flange 1179. These end surfaces are so dimensioned as to enable a pressure applied in the right hand chamber portion 1180 to move the valve closure member to the opening position disengaging the valve seat 1155 or to enable a pressure applied to the left hand portion 1170 of the valve chamber to move the valve closure member to its closing position as shown in Figure 19.

A further inlet 1181 affords communication between a pipe L and the valve chamber portion 1180.

A high pressure check valve generally referred to as 42 and shown in section in Figure 20 has an inlet from the high pressure supply pipe H and an outlet to the pipe J.

This valve has an exterior housing 1200 having a central bore 1201 forming the valve chamber. By means of a shoulder 1202 there is provided in the bore a seat 1203 for a valve closure member 1204. The inlet communicating with the high pressure supply pipe H is designed by 1205 and the outlet to the pipe J by 1206. The valve closure member is loaded by a spring 1207 abutting at one end against the valve closure member 1204 and at the other end against a cover 1208, which is bolted to or in any other convenient manner (not shown) secured on the valve housing 1200. The valve closure member 1204 loaded by the spring 1207 will open under the high pressure applied through the pipe H.

The low pressure check valve shown in Figure 21 is further provided with an outlet 1210 directly from the valve chamber 1211 through a pipe line to the end 352 of the pressure gauge tube 350, see Figure 8.

The pipe L from the main guide valve 41 extends into an inlet 1220 of a bypass valve generally referred to as 44 and shown in more detail in Figure 22.

This inlet 1220 communicates with a high pressure chamber 1221 in the valve 44. This valve comprises an exterior housing 1222 having a longitudinal bore of different diameter along its longitudinal extension. The high pressure chamber end is closed by a cover 1223 and the other end is closed by a cover 1224, both said covers are by bolts or in any other convenient manner (not shown) secured to the main valve housing. In the high pressure chamber 1221 there is slidably arranged a piston 1224. This piston is secured to a spindle 1225 having an extension 1226 beyond the high pressure end surface 1227 of the piston. In the longitudinal bore there is provided a flange or partition 1228 having channels 1229 and 1230. In the flange or partition 1228 there is further provided a central bore 1231 for guiding the spindle 1225. The chamber formed on the right hand side of the piston 1224 is referred to as 1232. The central bore of the valve 44 forms on the right hand side of the partition 1228 a low pressure chamber 1233.

From this chamber an inlet 1234 is arranged communicating with a pipe $K^1$.

At the right hand end of the low pressure chamber there is provided a shoulder 1235 forming at its edge a valve seat 1236 adapted to be closed by a valve closure member 1237 in form of a conical head at the end of the spindle 1225. The right hand end of the valve is provided with an interior chamber 1238 of larger diameter than the low pressure chamber 1233. A valve closure spring 1239 serves to keep the valve closure member 1237 in engagement with the valve seat 1236 by abutting at one end against the end cover 1224 and at the other end against a shoulder 1240 on the valve closure member. Furthermore the low pressure chamber has an outlet 1241 to a return pipe $B^3$ leading to the interior of the oil tank 80. Furthermore, the chamber 1238 on the spring loaded side of the valve closure member is provided with an inlet 1242 communicating with a pipe $B^1$, which is branched into the pipe B.

Finally, still a further outlet 1249 from the spring loaded chamber 1238 communicates with a pipe $B^2$.

The pipe K from the outlet 1177 of the main giude valve 41 communicates with an inlet of a pilot valve, generally referred to by numeral 45 and shown in more detail in Figure 23. The inlet is referred to by numeral 1250. This valve comprises an exterior valve housing 1251 having a bore that forms a valve chamber 1252. This bore is closed by a cover 1253 secured by bolts or in any other convenient manner (not shown) to the valve housing. This valve is provided with an elongated valve closure member 1254 having a conical head 1255 adapted to cooperate with a valve seat 1256 to close the inlet 1250 to the valve chamber. The valve chamber has an outlet 1257 to the pipe $K^1$ which extends to the inlet 1234 of the bypass valve 44.

In the closure member 1253 there is provided a bore 1258 for a spindle 1259 the end of which extends outside the valve housing. Between the valve housing 1251 and the closure member 1253 there is provided a chamber 1260 which is divided into two portions 1261 and 1262 by means of a membrane 1263. The elongated valve closure member 1254 is provided with a head 1265 which is sliding fit in the bore and extends into the chamber portion 1261. The spindle 1259 is provided with a cylindrical head 1266 slidable in a cylindrical portion 1267 of the chamber 1262 and adapted to abut against an interior shoulder 1268 so as to limit the upward movement of the spindle 1259.

The embodiment here shown and described is only a exemplification of the construction of this valve. It will be understood that a raising of the valve closure member will deform the membrane 1263 so as to thereby raise the spindle, which in its position of rest is pressed downwardly to deform the membrane so that the head 1266 of the spindle 1259 rests on the top of the valve closure member head 1265 with the membrane interposed between these two parts.

It will be understood, however, that instead of forming the valve closure member 1254 and the spindle 1259 in two separated parts as here described, one single elongated spindle may be used. In such event packing will, however, be necessary to keep the spindle bore fluid tight. The necessity of such packing is avoided by the construction shown because the membrane forms the tightening member for the valve chamber.

The spindle 1259 is normally during the operation of the press kept in its down position by the pivoting timer lever 1000, see Figure 10, to close the pilot valve as will be described.

Furthermore, the pipe $B^2$ from the bypass valve outlet 1249 extends into an inlet of a membrane re-setter generally referred to as 46 and shown in detail in Fig. 24.

This membrane re-setter comprises an exterior housing assembled of two parts 1300 and 1301, bolted or in any other convenient manner (not shown) held together and clamping between them by means of interior shoulders 1302 and 1303 an elastic membrane 1304. The interior valve chamber is by the elastic membrane divided into two portions of which one 1305 communicates with the inlet 1306 from the pipe $B^2$. The other chamber portion 1307 is provided with a cylindrical portion 1308 in which a piston 1309 is movable and in its top position abuts against a shoulder 1310. The piston is loaded by a spring 1311 and is thus normally held in down position in which it deforms the membrane. The piston is raised when pressure is applied to the chamber 1305 through the pipe $B^2$. The piston has a spindle 1312 extending through a bore 1313 and adapted to cooperate with the other end of the timer lever 1000, see Figure 10.

The mode of operation is as follows:

*A.—Main hydraulic system*

In the position of rest the movable press platen 116 is lowered to assume the position shown in Figure 1 and 2. The side pressure shoes 138 of the side pressure cylinders 140 are retracted.

Now assuming in connection with the description of the main hydraulic system that no side pressure is applied, only the control handles $Ha_2$ and $Ha_3$ are adjusted. The handle $Ha_2$ is turned until the pointer 344 on the scale $Ga_3$ indicates that pressure which is to be applied in vertical direction when the movable press platen closes on the work piece.

The control handle $Ha_3$ is turned so as to adjust the rod 592 and thereby the timer mechanism to release the pressure after expiration of the desired curing time. The adjustment of the handle $Ha_3$ is made until the pointer 584 on the scale $Ga_4$ shows the desired time.

The work piece is arranged on the movable press platen. As to the work piece reference is made to the latter description thereof with reference to Figure 39.

Hereafter the starter push button $Pu_1$ is pressed. This starts the pump motor which is inserted in the electric circuit to be more fully described with reference to Figure 42.

Upon starting of the pump motor as well as the low pressure pump as the high pressure pump will be activated and the following hydraulic operations are hereafter taking place.

The high pressure pump and the lower pressure pump pumps pressure fluid into the system through the check valve 42 and 43 respectively.

From the high pressure check valve 42 the high pressure fluid is pumped through the pipe J into the rear chamber 146 of the reslease valve 41 so as to close the return outlet 1154 to the pipe E from this valve.

The low pressure fluid applied through the main pipe B will act directly upon the valve closure member in the low pressure check valve 43 to lift the same from its seat and thereby allow passage of the fluid through the pipe C to the cylinders. Hereby the raising of the movably arranged press table is initiated. Simultaneously the low pressure fluid is applied through the pipe D to the release valve 41.

When the main guide valve 41 is closed by the high pressure there is no return path for the low pressure fluid through the low pressure return pipe E, and this fluid will therefore continuously be pumped into the cylinders for raising the movable press table.

Furthermore the low pressure is through the branch pipe B applied to the chamber 1238 of the bypass valve 44 and from this chamber through the outlet 1249 and the pipe $B_2$ to the membrane re-setter 46, whereby the spindle of the membrane re-setter is raised. This tilts the timer lever 1000 and this movement then causes a down pressing of the spindle of the pilot valve 45 to close the latter. Thus in the high pressure system the passage through the pipes K and $K^1$ for the high pressure liquid is closed. This is necessary to allow the high pressure to close the release valve 41, notwithstanding the controlled leak through the auxiliary valve 1173. The ratio between the amounts of pressure fluid delivered by the high and low pressure pumps is about 1:15. Accordingly the pressure fluid delivered by the high pressure pump contributes very little to raise the movable press platen. When the press platens are brought together upon the work piece there is an increase of resistance. The high pressure is then applied through the valve 1173 in the interior of the main guide valve 41, the pipe D and the check valve 43 to the pipe C. The high pressure also acts through the pipe L in the chamber 1221 on the rear end of the piston 1224 in the bypass valve 44, which thereby opens to afford a release for the pressure fluid delivered by the low pressure pump to the pipe $B_3$.

The valve 44 can thus be opened by high pressure only, because the low pressure applied through the pipe $B_1$ normally keeps this valve closed. Openings of the valve 44 puts the pipe $B_1$ and $B_2$ in communication with the outlet 1241 of the valve 44 to the return pipe $B_3$ so that the low pressure check valve 43 closes and the surplus of pressure fluid delivered from the low pressure pump is returned to the oil container.

The high pressure fluid, however, cannot pass the valve 44, and therefore the pressure is further raised in the cylinders until it attains a value to which it has been pre-set by means of the handle $Ha_2$ in the manner described in connection with Figure 8. Then the pressure gauge (Fig. 8) operates the main switch to stop the driving motor in a manner which will be more fully described in connection with the electric circuit. The pressure will remain at this value during the curing time pre-set by the timer. If for some reason the pressure should be decreased before the timer releases the system, the pump motor will be started again automatically.

When the membrane re-setter tilted the lever 1000 to close the pilot valve 45 the spindle was turned anti-clockwise (see Figures 10 and 11), whereby the laterally extending arm 1004 was raised to prevent immediate re-opening of the pilot valve 45.

Hereby the projection 982 on the arm 980 is allowed to move under the detent 1006 to immobilise the spindle 1002 and the lever 1000 while the lever 976 moves upwards to enable energisation of the timer motor by pressing the button 986.

At the end of the pre-set curing time the timer, as hereinafter described, releases the arm 1000 extending from the spindle 1002. Since the low pressure was previously released through the bypass valve 44, the membrane re-setter 46 is no longer subject to pressure. The high pressure that acts on the pilot valve 45 through the pipe K will therefore immediately shift this valve to allow free passage of the high pressure fluid through the pipe $K^1$ to the bypass valve 44 where it enters the intermediate chamber 1233 of this valve and is allowed to return through the return pipe $B_3$.

This means that there is a direct passageway for the high pressure fluid from the rear chamber 1170 of the release valve 41, through the pipe K, pilot valve 45, pipe $K^1$ and bypass valve 44 to oil tank through pipe $B^3$. Moreover, the pump motor has previously been stopped and no more fluid is supplied from the high pressure pump.

There is now a difference in pressure between the fluid in the two chambers 1180 and 1170 on either side of the flange 1179 in the valve 41. Before the high pressure was relieved through the pipe K the pressure would be nearly the same in these two chambers, because as mentioned the spring 1174 is relatively weak. Now the ball valve 1165 assumes the function of releasing the pressure from the pipe D. Because the high pressure in the rear chamber 1170 is released through the pipe K, the fluid from the pipe line D will then flow through the valve 1165 to the rear chamber and return to the oil container through the pipe K. Theoretically the valve closure member will remain closed until the rear chamber 1170 has been totally relieved, viz. until the pressure difference between the front and rear chambers corresponds to the spring. The valve closure member 1156 is then opened due to the fact that residual pressure acts on the right hand side of the flange. The purpose of the valve 1165 is, as will be understood, gradually to reduce the pressure difference between the front chamber 1180 and the rear chamber 1170, so as to prevent the main valve closure member from being opened suddenly as soon as the pressure in the rear chamber 1170 is relieved. If the high pressure in the pressure system C, D was allowed to act upon the main valve closure member 1156 to open the same before the pressure difference in the two systems described had been sufficiently reduced, the opening of the valve 41 would be effected by so high a pressure that the valve closure member 1156 would strike hard against the rear wall of the release valve 41 with the liability to cause damage or fracture.

It will be understood that in the main pressure system there is, after opening of the valve 41, also a release for the pressure from the pressure system C, D directly through the guide valve 41 via its outlet 1154 to the return pipe E. The weight of the movable press platen will hereafter be sufficient to press the fluid out of the system so that the press platen will be lowered.

The operations here described have, as will be understood, re-set the valves 41, 44 and 45 to their initial positions, with the release valve 41 open, pilot valve 45 open and bypass valve 44 closed, so that the operations just described will be repeated in the same sequence when a new load has been arranged on the movable press table and the press restarted by pressing the starter button.

*Operation of timer*

In the position of rest, the lever 978 is in its exterior anti-clockwise position with the projection 982 held to the left of detent 1006 on the arm 1004. Both pawls 960 and 966 are disengaged and the spring 928 has turned the ratchet wheel 926 so as to abut the projection 930 against the arm 918. By adjusting the hand wheel $Ha_3$ and setting the indicator $Ga_4$ to the necessary curing time the tilting of the lever 904, 905 rotates the spindle 916 and thereby fixes the radial position of the arm 918.

When the membrane re-setter 46 tilts the two-armed lever 1000 to close the pilot valve 45, the arm 1004 is lifted so that the projection 982 on the lever 978 is released from the detent 1006. Hereby the spring 984 is allowed to tilt the lever 978 in anti-clockwise direction bringing it into a position as shown in Figure 10 where it prevents the arm 1004 from moving in clockwise direction and thereby prevents reopening of the pilot valve 45. By this movement also the arm 976 is turned clockwise to release the timer motor push button 986 with the result that the timer motor starts. Hereby the lever 952 is rocked and by means of the pawl 960 the ratchet wheel 926 is turned clockwise, until the projection 930 abuts against the lever 978. The angle of rotation and hence the timing has, as mentioned, been pre-set by the initial adjustment of the radial arm 918.

When the projection 930 abuts against the lever 978 this is tilted in anti-clockwise direction against the action of the spring 984. Hereby the timer motor is stopped, because the arm 976 presses the timer motor switch push button 986. Simultaneously the blocking of the detent 1006 on the arm 1004 is relieved, and the pressure, which now (see the description of the main hydraulic system) acts through the pipe K on the pilot valve 45, tilts the lever 1000 in clockwise direction to turn the spindle 1002, whereby the arm 970 thereon is turned to engage the projection 969 on the holding pawl 966, swinging the latter anti-clockwise so much that it also abuts against the arm 961 on the actuating pawl 960. This brings both pawls away from the ratchet wheel, which due to the action of the spring 928 immediately returns to its initial position making the timer ready for repeated operation.

*B.—Side pressure valve system*

Reference is now made to the flow diagram of Figure 13 in which the main hydraulic system described hereinbefore is completed with a hydraulic system adapted to operate the side pressure cylinders.

As shown in the diagram of Figure 13 a main valve **472*a* is inserted in the pipe B, that extends to the inlet side of the low pressure check valve 43**.

This valve **472*a*, Fig. 26 comprises a valve housing 1400 having two communications 1401 and 1402 in axial alignment to enable connection with the main pipe B. The valve further comprises a valve chamber 1403 in form of a central interior bore, which is closed by a closure member 1404 bolted or in any other convenient manner (not shown) secured to the main valve housing. In the valve chamber there is arranged a slidable member having a cylindrical piston portion 1405 of sufficient length to enable this piston portion in its left hand position to close both communications 1401 and 1402 and thereby close the pipe line B. The valve member furthermore comprises a portion of reduced diameter 1406 and a piston disc 1407 spaced from the piston portion 1405 by said reduced diameter portion 1406. An extension 1408 of reduced diameter is arranged on the left hand end of the disc portion 1407**.

The ends of the valve chamber is provided with ports, a left hand port 1410 opening into a pipe $O^2$ which is in another pipe $O^1$, which in its turn communicates with the left hand port in a side pressure valve **472*b*. In a similar manner the right hand port 1411 of the valve 472*a* opens into a pipe $P^2$ which is branched in a pipe $P^1$, which in its turn communicates with the right hand port in the side pressure valve 472*b***.

This side pressure valve **472*b*, which in detail is shown in Figure 27, is practically identical with the main valve 472*a***.

The valve **472*b* has an exterior valve chamber 1420 forming in its interior a valve chamber 1421 in which is provided a slidable member having a cylindrical piston portion 1422 and a piston disc 1423 spaced from the piston portion by a rod 1424** of reduced diameter.

The valve **472*b* is further provided with oppositely arranged inlet and outlet 1425 and 1426 respectively. These inlet and outlet communicate with a pipe M. Furthermore, the ends of the valve chamber are provided with ports, one designed 1427 communicating with the pipe $P_1$ and another designed 1428** communicating with the pipe $O_1$.

The pilot valve 45 has its spindle 1259 extending through the valve housing and adapted to be displaced by the pivoting timer lever 1000 (Figure 10) to close the pilot valve as already described.

Furthermore, the pipe $B_2$ from the bypass valve 44 extends into the inlet of the membrane re-setter 46 the chamber of which is closed by the elastic membrane, upon which the spring-loaded piston rests. The piston has its spindle extending through the valve housing and adapted to co-operate with the other end of the timer lever 1000.

In the side pressure hydraulic system the low pressure supply pipe M extends through the side pressure valve **472*b***.

It will be understood that the piston members in the two valves can be simultaneously moved in opposite directions by pressure applied to either of the two pipes $P^1$ and $O^1$. Since the cylinder and disc portions of the pistons in the valves **472*a* and 472*b* are oppositely disposed, as shown, the one valve will be open and the other closed at any time. In the same way as the main valve 472*a* is inserted in the low pressure supply pipe B, the side pressure valve 472*b* is inserted in a side pressure supply pipe M that is branched from the pipe $B^1$, so as either to close the pipe M or allow it to be opened and thereby enables free passage of the pressure fluid to the side pressure cylinders 137**.

From the supply pipe M there is branched a pipe N extending into an inlet in the side pressure guide valve 471, which in more detail is shown in Figure 25. This valve is provided with an exterior housing 1450 having an longitudinal bore forming a valve chamber 1451 closed at the open end by a cover 1452, which is bolted or in any other convenient manner (not shown) secured to the main valve housing.

This valve is provided with a slidable member generally referred to as 1453 having two cylindrical piston portions 1454 and 1455 spaced by means of a portion 1456 of reduced diameter and forming between them a valve chamber 1457.

The main valve chamber 1451 is provided with an inlet 1458 connected with the pipe N. Said inlet is so arranged that it always communicates with the pressure chamber 1457 between the two pistons 1454 and 1455. The valve is furthermore provided with two outlets 1459 and 1460 communicating with the main valve chamber 1451 at such locations that the chamber 1457 between the two pistons in either of the exterior limit positions of the double piston member will always communicate with one or the other of these two outlets. These two outlets are connected with the two pipes $P^1$ and $O^1$ respectively. The interior of the valve 471 is provided with two further oulets 1461 and 1462, each located beyond one of the piston limit positions of the slidable double piston member, so as to connect that of the two outlets 1461 or 1462 to the pipes $P_1$ and $O_1$, which is not for the time being connected with the pressure chamber with an outlet 1463 that in its turn is connected to a return pipe R. The pipe R is branched in the main return pipe $B_3$, which is thus common to as well the main hydraulic system as the side pressure hydraulic system.

The double piston member of the valve 471 is provided with a spindle 560, see also Figures 14 through 18, which extends outside the valve housing and is influenced by the spring 728 already described in connection with the construction of the side pressure switch system. This spring is interposed between a collar or the like 702 fixed on the spindle 560 and a bracket 704 secured to the plate 706 which carries the valve 471 and its opening mechanism.

The exterior limit positions of the slidable double piston member are controlled by a projection of reduced diameter 1464 adapted to abut against the closed end of the valve bore and a shoulder 1465 between the piston member and the spindle 560, adapted to abut against a member 1466 at the top end of the valve bore. A suitable packing 1467 serves to keep the spindle passage fluid tight.

From the outlet 1426 of the side pressure valve **472*b* the main supply pipe M extends to the side pressure cylinders 140 through a plurality of branch pipes. Each of the side pressure cylinders comprises an interior piston 1500 from which a spindle 1501 is extending through the end cover. In the cylinder there is furthermore provided an interior spring 1502** acting to retract the piston and the spindle.

From the main supply pipe M there is branched a pipe $M^1$, Figure 13, extending into the inlet 1550 of the side pressure control valve 475. This valve, Fig. 28, comprises an exterior valve housing 1551 having a central bore 1552 forming the valve chamber and closed by a cover 1553 which is bolted or in any other convenient manner (not shown) secured to the valve housing. In the valve there is provided a valve seat 1554 adapted to be closed by a valve closure member 1555 formed as a conical head at one end of a spindle 1556 which extends through the cover 1553, the spindle passage is tightened by a packing or the like 1557. The extending end 226 of the spindle 1556 is that shown in Figure 7 co-operating with the lever 220 influenced by the spring 225.

The valve 475 is provided with further outlet 1558 which connects the valve chamber 1552 with a pipe Q which in its turn opens into the main return pipe E.

A branch pipe $Q_1$ extends from the pipe Q into an inlet 1560 of a side pressure re-setter generally referred to as 476 and shown in more detail in Figure 30. The construction of the side pressure re-setter is similar to that of the membrane re-setter 46. The side pressure re-setter comprises a housing of two half parts 1561 and 1562 between which there is clamped an elastic membrane 1563 dividing the interior in two chambers 1564 and 1565. In the chamber portion 1565 there is slidable a piston 1566 which in Fig. 30 is shown in its projected position. To the piston there is secured a spindle 854 which is the same as that shown in Figures 17 and 18. This spindle serves to re-set the side pressure guide valve by influencing the side pressure system in the manner which will more fully be described in connection with the operation of the parts. Normally the spindle 854 is retracted by means of a spring 1567 which acts on the piston 1566 and keeps it in its left hand position (shown in dotted lines), where it deforms the membrane. When the pressure is applied through the pipe $Q_1$ it moves the pistons towards the right side.

A further pipe T is branched from the main supply pipe M between the side pressure valve **472*b* and the side pressure cylinders 140. This pipe extends into an inlet 1600 of a side pressure release valve 474**, see Figure 29.

This valve comprises an exterior valve housing 1601 having an interior bore 1602. The bore is closed by a closure member 1603, which is bolted or in any other convenient manner (ont shown) secured to the valve housing. The bore is divided into two chambers 1604 and 1605 by means of a slidable piston 1606. The piston is provided with a valve closure member 1607 adapted to close on a valve seat 1608 so as to thereby close the inlet from the pipe T.

On the other side of the piston the valve chamber 1605 communicates through an inlet 1610 with a pipe S branched from the supply pipe M on the other side of the pressure valve **472*b***.

From the chamber portion 1604 an outlet 1611 communicates with a pipe $T^1$, which is branched into the return pipe E.

The mode of operation is as follows:

As in connection with the adjustments necessary before the operation of the main hydraulic system also the main pressure adjustment handle $Ha_2$ and the curing time control handle $Ha_3$ will be operated as an initial step to pre-set the main face pressure and the curing time.

Moreover the side pressure control handle $Ha_1$ will be turned until the pointer 213 showing the necessary side pressure on the scale $Ga_1$. This will as explained with reference to Figure 7 adjust the tension of the spring 225 and thereby adjust the pressure for which the side pressure control valve 475 will open.

Moreover the panel thickness control handle $Ha_4$ will be turned so as to adjust the position of the end of the lever 740 and thereby the vertical point of that path of the projection 750 at which the latter will abut against the end of the lever 740 to switch over the side pressure switch mechanism in the manner to be more fully described in the following.

The adjustment of the panel thickness control should be so that the side pressure switch mechanism is operated when the press platens are brought so much together that daylight is left, which is something like ¼ inch more than the thickness of the panel plate to be pressed. This means that the gauge $Ga_5$ conveniently may be calibrated so as to correspond to a daylight of panel thickness plus round ¼ inch so that simply by setting the pointer 260 corresponding to panel thickness the switch mechanism will operate for that panel thickness plus the space of round ¼ inch.

In the initial position and during the initial operation of the main hydraulic system in the manner already described the main valve **472*a* is open with its valve element in right hand position as shown in Figure 13 so as to allow free passage of low pressure fluid through the main low pressure pipe B. This position of the main valve 472*a* is controlled by the position of the side pressure guide valve 471. This valve is normally influenced by its spring 560 which holds the valve member in the lower position, until it is shifted in a manner to be described later to start the operation of the side pressure system. With this position there is a passageway through that part of the branch pipe M which adjoins the supply pipe B, the branch pipe N, and side pressure guide valve 471 to the pipes $O_1$ and $O_2$, whereby the main valve 472*a* is maintained in open position and the side pressure valve 472*b*** in closed position.

As long as the main valve **472*a*** is open the main hydraulic system will be operated as described hereabove.

From the diagram Figure 13, it will also be seen that the pressure in the pipe $O_1$ is simultaneously applied to close the side pressure valve **472*b*, which is inserted in the pipe line M. Since these two valves 472*a* and 472*b*** as mentioned are of the same construction, but disposed oppositely in the system, one of them will be open while the other is closed, and vice versa.

Furthermore, the pressure fluid from the pipe M acts through the branch pipe S on the piston in the chamber of the side pressure release valve 474 so that the latter is closed and closes the pipe line T, $T^1$.

When the movable press platen has been raised to a position in which its level corresponds to the panel thickness adjustment, the abutment 752 will swing the lever 740, and thereby longitudinally displace the arm 736. The arm 736 also swings the lever 710 about its pivot 714 by means of the hook 737, so that the spring 734 is compressed. When the spring 734 has been sufficiently compressed, the abutment 735 at the top of the arm 736 disengages the hook 724 to allow the lever 708 to swing about the pin 712, urged by the spring 734 which is stronger than the spring 728, so as to raise the valve spindle 560 and thereby displace the valve member 1453 to its top position. The valve will remain in this position, until at a later stage it is operated by the side pressure re-setter 476.

By this movement of the valve member 1453 in the guide valve 471, the valve chamber 1451 will be disconnected from the pipe line $O_1$, which instead of will be connected with the outlet pipe R. The chamber 1457 between the two pistons is now disposed so that the pressure supplied through the pipe N is branched into the pipe system $P_1$, $P_2$ that leads to the right hand ends of the main valve *472a* and side pressure valve **472*b*** respectively.

These valves are hereby immediately reversed. The main valve *472a* immediately closes the pressure pipe B and thereby stops the vertical movement of the movable press platen. Simultaneously the side pressure valve *472b* opens the pipe M and allows the pressure fluid to enter the side pressure system to the side pressure cylinders, the pistons of which will start to move inwardly, allowing the pressure shoes mounted thereon to press laterally against the work piece which at the other edge of the press platen abuts against the longitudinal rail 172.

The magnitude of the side pressure is controlled by the spring of the side pressure control valve 475, which has been pre-set to the desired side pressure by means of the control handle $Ha_1$.

When the desired side pressure has been reached the valve 475 will open under influence of the pressure. Part of the pressure fluid will thus leak through the return pipes Q and E back to the oil tank. There is, however, in this system a slight over-pressure, which through the branch pipe $Q_1$ is applied to the chamber 1564 of the side pressure resetter 476 (Figure 30), the membrane 1553 of which presses the piston 1566 to project the pin 854. This pin 854 engages the abutment 754 on the arm 736 and causes the latter to be swung anti-clockwise from the position shown in Figure 18 about the fixed pin 748. This brings the hook 737 out of engagement with the lever 710 to release the same and relieve the spring 734, so that the spring 728 re-sets the valve member 1453 of the guide valve 471 to its lower position and simultaneously lowers the lever 708 to be engaged by the hook 722 as in the initial position.

Hereby the valves **472*a* and 472*b* are again reversed because now the pressure pipe N is as initially through the interior chamber of valve 471, connected to the pipe lines $O_1$, $O_2$ and simultaneously the pipes $P_1$ and $P_2$ are through the valve 471 connected with the return pipe. Hence, the main pressure pipe is again open allowing the movable press platen to be urged upwardly. The operations previously described with reference to the main system are now repeated. During these operations the side pressure will retain the predetermined value since now the side pressure valve 472*b*** is closed.

During the remaining part of the operation pressure is still applied to the valve chamber 1605 of the side pressure release valve 474 (Figure 29).

When the high pressure is hereafter applied to the main hydraulic system the press platens will close on the work piece and the pressure will raise until the pressure gauge (Figure 8) pushes the push button 326 to stop the pump motor.

As long as the pump motor is running there is still supplied pressure through the pipe S to the lower valve chamber 1605 of the side pressure release valve. When, however, the pump motor is stopped this pressure is released. Hereby the side pressure release valve is allowed to open under influence of the pressure in the side pressure system applied through the pipe T. Hereby open communication is provided through the side pressure release valve to the side pressure return pipe $T_1$ and the side pressure system will empty itself, partly due to the overpressure in the side pressure system under influence of the springs in the side pressure cylinders.

If for some reason the pressure in the main hydraulic system should decrease with the result that the push button 336 is released to restart the pump motor this will reclose the side pressure release valve, but this will not result in refilling the side pressure hydraulic system, because the side pressure valve **472*b*** is closed to block the main side pressure pipe.

It will therefore be understood that this specific system provides an emptying of the side pressure system before the main hydraulic system is emptied. This is a refinement which contributes to increasing the operation speed.

*End pressure cylinders*

In connection with pressing of certain work pieces, such as panel plates to be used as doors or the like, it may be advantageous not only to supply side pressure but also to supply end pressure.

A modification of the press in which also end pressure cylinders are arranged is shown in Figure 31, and the arrangement of an end pressure cylinder is shown in more detail in enlarged scale in Figure 37. Here the different parts of the press are referred to by same reference numerals as in Figures 1 through 3, and the general construction of the press will therefore not be repeated here.

According to a feature of this embodiment there is mounted at least at one of the end walls of the top press platen 115 end pressure cylinders **1800*a* and 1800*b* having pressure shoes 1801*a* and 1801*b* parallel with the bottom surface of the stationary press platen 115** and spaced a distance from said surface in the same manner as the pressure shoes of the side pressure cylinders.

In the embodiment shown in Figs. 31 and 37 the end pressure cylinders are mounted in a manner which is similar to that of the side pressure cylinders and this mounting will therefore only be very briefly described here.

On the end wall 1810 of the stationary press platen 115 there is secured brackets 1811 and 1812 having downwardly extending edges 1813 and 1814. On these edges there is supported a U-formed rail 1815, for instance secured to the brackets by welding or in other convenient manner. This U-formed rail 1815 has its body portion extending downwardly to form a supporting surface for brackets 1816 and 1817 having triangular side walls 1818 and 1819. To these brackets the end pressure cylinders **1800*a* and 1800*b* are secured by means of end cover plates 1820 and 1821 connected to the brackets 1816 and 1817** by bolts in the manner described in connection with the mounting of the side pressure cylinders.

It will be understood that such end pressure cylinders may be arranged at both ends of the press or if convenient an abutment rail (not shown) may be attached to the end wall of the stationary press platen remote from the end pressure cylinders.

It is preferred, however, to use end pressure cylinders with pressure shoes at both ends of the press. The reason is that end pressure is most advantageously applied in connection with the manufacture of doors f. inst. in one single operation. As will be described in the following the end pressure is applied in the sequence of operations after the side pressure has been applied. Thus the core stock of the work piece will first be joined in lateral direction and therefore individual end pressure at either end is preferred in order to join a core stock cross strip at opposite ends of the panel plate.

*End pressure hydraulic system*

In the event that the press is also provided with hydraulically operated end pressure cylinders there will be added to the hydraulic system shown in Figure 13 a plurality of further pipe lines and valves as shown in the flow diagram of Figure 32.

From the main side pressure supply pipe M there is between the side pressure valve **472*b* and the side pressure release valve 474 branched a main end pressure supply pipe $M_2$ which extends into an inlet of an end pressure valve 472*c*. This valve, which is more specifically shown in Figure 33, is of the same construction as the main valve 472*a* and the side pressure valve 472*b*. The valve comprises an exterior valve housing 1900 having a central bore 1901 forming a valve chamber and closed at the open end by means of a cover 1902 which by bolts, screws or in any other convenient manner is secured to the valve housing 1900. The valve has two oppositely arranged central ports of which one 1903 is the inlet connecting the valve with the pipe $M_2$, while the other 1904 is the outlet connecting the valve with the extension of the main end pressure supply pipe $M_2$. In the valve chamber there is provided a valve member comprising a cylinder portion 1905 of sufficient axial extension to enable it to block both ports 1903 and 1904. The valve member further comprises a disc portion 1906 spaced from the cylinder member by a rod 1907** of reduced diameter.

A rod-like extension 1908 at the side of the disc member 1906 remote from the cylinder portion 1905 provides in the valve one end chamber 1910 communicating with an inlet 1911. On the other side of the piston portion 1905 the other end valve chamber 1912 communicates with an inlet 1913. This inlet is connected with a pipe $Q_3$ which is branched into the pipes $O_1$ and $O_2$, for instance at the intersection point between these two pipes, as indicated.

In the pipe line $Q_1$ of the side pressure system there is inserted a two-way cock EC which is shown in more detail in Figure 38. This two-way cock is of the traditional construction of the kind which can be obtained from any hardware supplyer. It comprises an exterior housing 1920 having two oppositely arranged ports 1921 and 1922 both communicating with the pipe $Q_1$. Furthermore, the two-way cock is provided with an outlet 1923 perpendicular to the two ports 1921 and 1922. This outlet 1923 communicates with a pipe $P_3$ which is connected with the inlet 1911 of the valve 472*c*. The cock is provided with a normal cock plug 1924 having a transverse bore 1925 and furthermore a bore 1926 perpendicular thereto, the latter bore extending only from the surface of the plug into the transverse bore 1925. This two-way cock is adapted for manual control by means of a normal cock spanner and may be arranged at any convenient place where it is accessible so as to enable switching on and off the end pressure valve system at will.

From the outlet 1904 of the end pressure valve 472*c* the main supply pipe $M_2$ is branched into a main distribution pipe $M_3$ from which branch pipes $M_4$ extend to the end pressure cylinders. The pipe $M_3$ further extends into an inlet of an end pressure control valve 475E which is more fully shown in Figure 35. This valve is of the same construction as the valve 475 and comprises an exterior valve housing 1935 having a cover 1936 secured by bolts, screws or in any other convenient way on the valve housing. An inlet 1937 communicates with the pipe $M_3$. A valve seating 1938 is normally closed by a valve closure member 1939 having a conical head 1940 and a valve spindle 1941 which extends through a bore 1942 in the cover 1936. The interior valve chamber 1943 further has an outlet 1944 communicating with a pipe $Q_3$ which is branched into a pipe $T_3$.

On the valve housing 1936 there is eccentrically arranged a bracket 1945 having a pivot pin 1946 on which is pivoted a lever 1947 extending across the top of the valve 475E and cooperating with the extending end of the valve spindle 1941. The lever 1947 is loaded by a spring 1948 surrounding a rod 1949, which for instance as shown at its lower end is secured to a bracket 1950 extending from the valve housing. An adjustable nut or a similar member 1951 enables the spring pressure against the lever to be pre-set so as to thereby control the pressure for which the valve 475E will open.

Eventually the valve 475E may be arranged adjacent the valve 475 and the lever 1947 of the valve 475E. In such event an individual spring load for the valve 475E can be omitted. It will be understood that hereby the control and arrangement of both valves 475 and 475E is common and can be effected by means of the operation handle $Ha_1$.

The pipe $T_3$ is at one end branched in the pipe Q between the two-way cock EC just described and the inlet of the side pressure resetter. The other end of the pipe $T_3$ is branched into the return system, for instance as shown at the intersection point between the side pressure release pipe Q and the main return pipe E.

Furthermore, the end pressure valve system comprises an end pressure release valve 474E (Figure 34). This valve, which is of the same construction as the side pressure release valve 474, comprises a valve housing 1975 defining a valve chamber 1976. This housing is at one end closed by a cover 1977 which is bolted or in any other convenient manner secured on the valve housing. The valve 474E has an inlet 1978 communicating with a pipe $S_3$, which is branched into the pipe S, that in its turn communicates with the inlet of the side pressure release valve 474. In the valve 474E there is arranged a piston 1979 dividing the valve chamber 1976 in one compartment 1980 that communicates with the inlet 1978 and another compartment 1981. The compartment 1981 is provided with a central inlet 1982 that communicates with a pipe $T_4$ which is branched into the pipe $T_3$. This inlet 1982 is provided with a valve seat 1983 adapted to be closed by a valve closure member 1984 formed as an integral part of the piston 1979. The valve chamber compartment 1981 further has an outlet 1985 communicating with the pipe $T_5$, which is branched into the pipe $M_3$ In the end pressure system there is finally in the pipe M between the branch point to pipe $M_2$ and the branch point to pipe T inserted a counter valve CV of a traditional type, which can be obtained from any machine supplyer. This counter valve is shown more specifically in Figure 36 and comprises a valve housing 1990 defining a chamber 1991, the end of which is closed by a cover 1992. The valve is at one end provided with an inlet 1993 and at the opposite end with an outlet 1994. The inlet is adapted to be closed by a valve closure member 1994 which is loaded by a spring 1995.

When the press is to be operated with end pressure the two-way cock EC is manually operated so that the cock plug assumes the position shown in Figure 38 in which it closes the direct passage through the side pressure resetter pipe to the side pressure resetter 476 and instead provides a communication from the side pressure resetter pipe to the pipe $P_3$ of the end pressure pipe system.

It will be understood that the neutral position of the two-way cock will be that in which the bore 1925 of the cock plug provides direct communication through the side pressure resetter pipe $Q_1$ to the side pressure resetter valve 476 without allowing the transverse bore 1926 to communicate with the pipe $P_3$ but ending blind at the cock casing. In such position of the two-way cock the press operates with the side pressure system in the manner already described hereinbefore.

The mode of operation now is as follows:

Now assuming the position of the two-way cock EC as shown in Figure 38 the sequence of the different operations will be exactly as described in connection with the operation of the system shown in Figure 13.

The main valve 472*a* will be open and the side pressure valve 472*b* will be closed because the piston member of the side pressure valve 471 is initially in its top position allowing pressure to be applied through the pipes $O_1$ and $O_2$. Now in the end pressure system the pressure is further applied through the pipe $O_1$, which means that also the end pressure valve 472*c* is closed having its valve member in the position with the piston portion 1905 closing the ports 1903 and 1904.

The movable press platen will accordingly be raised in the manner which is described in detail in connection with the operation of the main hydraulic system.

When the movable press platen arrives at the predetermined horizontal level, the side pressure switch system is operated by means of the abutment 752 in the manner already described in connection with the side pressure system. This switches over the valve member in the side pressure guide valve 471 with the result that the main valve 472*a* is closed and the side pressure valve 472*b* is opened instantaneously. This, however, does not open the end pressure valve 472*c*, because the supply pipe $P_3$, through which opening pressure has to be supplied to open this valve, does not communicate with the pipe $P_1$ through which opening pressure is supplied to the side pressure valve 472*b*.

The side pressure will therefore be supplied in the manner described in detail in connection with the mode of operation of the side pressure system, until the sequence of operations arrives at the stage where the side pressure control valve opens. It will be remembered that this opening takes place at a pressure in the side pressure system corresponding to that pre-set by the left hand control handle $Ha_1$.

The effect of opening of the side pressure control valve 475 in the side pressure system was that the side pressure resetter was operated to switch over again the side pressure control valve. Now, however, the two-way cock EC blocks the direct communication through the side pressure resetter pipe $Q_1$ to the side pressure resetter 476. Now when the end pressure is used the pressure is applied through the side pressure resetter pipe $Q_1$, the two-way cock EC and the end pressure guide pipe $P_3$ into the chamber 1910 of the end pressure valve 472E. This displaces the valve member in the end pressure valve 472E so as to open this valve.

Hereby the way is open to supply of pressure the whole way through pipe $M_2$ to pipe line $M_3$ and the end pressure cylinders will then move their pistons to press with their pressure shoes against the end of the work piece.

During the application of pressure to the end pressure system, the end pressure counter valve has the effect of maintaining the value of pressure in the side pressure system. If the counter valve CV was not inserted in the side pressure main supply pipe M beyond the point from which the end pressure supply pipe $M_2$ is branched off, the opening of the end pressure main valve **472*c*** would provide open communication between the side pressure system and the end pressure system with the result that a part of the fluid in the side pressure system would be distributed in the end pressure system, so that the side pressure would be reduced until the pump had been able to re-establish said pressure again.

Now, however, the counter valve CV prevents the pressure fluid in the side pressure system from escaping into the end pressure system and this will therefore only be supplied with fluid through the main supply pipe $M_2$.

In the end pressure system furthermore the pressure applied to the chamber 1605 of the side pressure release valve 474 will also be applied through the pipe $S_3$ to the chamber 1980 of the end pressure release valve 474E so as to thereby close this valve.

When now the pressure in the end pressure system $M_3$ has reached the predetermined value for which the end pressure control valve 475E will open against the load of the spring 1948 there will be communication from the pipe $M_3$ through the valve 475E and the pipe $Q_3$ to the pipe $T_3$. Part of the fluid will flow through the pipe $T_3$ back to the return pipe E. There will, however, now in the system be a slight over-pressure which through that end of the pipe $T_3$ which is branched into the side pressure resetter pipe $Q_1$ between the two-way cock EC and the side pressure resetter 476 will be applied to the side pressure resetter 476, which now will operate as a combined side- and end-pressure resetter and switch over the mechanical system in the manner described in detail in connection with the operation of the side pressure system.

Hereby the valve member of the valve 471 is again shifted with the result that as well the side pressure valve **472*b* as the end pressure valve 472*c* are closed instantaneously and the main valve 472*a*** is opened.

Hereby the movable press platen is again operated and raised to engage the work piece and effect the pressing in the manner described in detail in connection with the main hydraulic system.

During this part of the operation as well as the side pressure as the end pressure will retain the pressure value adjusted by the side pressure control valve 475 and the end pressure control valve 475E respectively.

The end pressure be released in a corresponding manner as the switch pressure system. Just as the chamber 1605 of the side pressure release valve is in communication with the pipe S, the chamber 1980 of the end pressure release valve is through the pipe $S_3$ in communication with the main pressure supply pipe. This means that when the main pump is stopped also the chamber 1980 of the end pressure release valve 474E is released and the valve will open to provide communication through the pipe $T_5$, the end pressure release valve 474E and the end pressure return pipe $T_3$, which in the same manner as the side pressure return pipe is branched into the main return pipe E.

As previously described with reference to the side pressure system the end pressure system will also empty itself.

*The work piece*

It will be understood that the hereinbefore described fully automatic hydraulic system enables finishing of a panel plate, such for instance as to be used as a door, in one operation.

An example of a suitable work piece to be treated in the press during the subsequence of operations described, is shown in perspective view in Figure 39. The panel plate here comprises a top face 2100, for instance in form of a thin veneer; then comes cross band 2101. While the face veneer preferably will have its veins in the longitudinal direction of the panel plate the veins of the cross band 2101 will be perpendicular to the longitudinal direction or at least form an angle therewith. On the bottom side there is provided a similar face veneer 2102 on the top of which there is provided a further cross band 2103. Between the two cross bands there is provided a loose core stock 2104, comprising a plurality of wooden strips or stocks arranged side-by-side. In the case of the production of a door a cross stock 2105 may as shown be provided at each end of the longitudinal core stock 2104.

Before the work piece is pushed in between the press platens, the glue lines are provided with a layer of a suitable adhesive. This layer will be provided as well on the opposite veneer surfaces as on that veneer surface abutting against the core stock, also the lines between the single core stock may be provided with adhesive.

As an exemplification of a convenient adhesive for use in connection with the press, a fast setting catalyst in an urea resin adhesive should be mentioned.

As already explained all operations are taking place under heat and pressure. It will therefore be understood that no pregluing of the core strips is necessary, all glue joints, edge and surface being cured under heat. This wholly eliminates clamping of cores, their redrying and final surfacing.

*Duplex opening press*

While in the foregoing the invention has been described with reference to a press having only one fixed press platen and one movable press platen providing between them one daylight, it will be understood that the invention is also applicable in connection with presses having two or more openings.

As an example reference is now made to Figures 40 and 41 showing a two-opening press.

The construction of the press in general is the same as the mechanical construction already described hereinbefore, and to facilitate the survey and comparison with the other figures described, the different parts including the frames, top press platen and movable lower press platen are referred to by same reference numerals as in the foregoing description.

In order to facilitate the survey the side pressure cylinders and the end pressure cylinders, if the latter are provided, have been omitted in the perspective view of Figure 40. The side pressure cylinders, however, are shown in the sectional view of Figure 41.

Between the stationary press platen 115 and the lower movable press platen 116, which is operated by the hydraulic pistons **120*a*, 120*b*, etc., there is provided an intermediate press platen 2200. This press platen is of a similar construction as the two other press platens 115 and 116 with the difference only that as well the top as the bottom of the intermediate press platen 2200 are in form of plane surfaced press plates 2201 and 2202 respectively. The intermediate press platen is also as in the case of the two other press platens preferably made in form of a welded box having interior partitions 2215*a*** welded to the top and bottom walls respectively forming therebetween a zig-zag channel for the passage of steam to be applied through flexible pipe lines communicating with in- and outlets respectively (not shown).

In Figure 40 the three press platens 115, 116 and 2200 are shown in mutually inoperative position with the lower press platen 116 in its lowest position.

In that position the intermediate press platen 2200 must be kept in an intermediate or middle position providing substantially the same vertical space or daylight in the two press openings. In order to accomplish this there is as shown in connection with the vertical column 105*b* provided a stop for limiting the downward movement of the intermediate press platen 2200. Similar stops are provided at the other corners, viz. in connection with the columns 103*b* and 103*a* and 105*a*. Only the stop in the front corner is shown, but it will be understood from the following description that similar stops are to be provided at the other corners.

To the side wall 2203 of the vertical column 105*b* there is secured a projection 2204 for instance in form of a block welded, bolted, or in other convenient manner firmly secured to the column 105*b*. On the side wall 205 of the intermediate press platen 2200 there is secured a bracket 2206 having an extension 2207 perpendicular to said side wall 2205. This bracket may be secured to the press platen by welding, bolting or in other convenient manner. The extension 2207 extends at such a distance from the side wall 2205 that it will be able to rest on the projection 2204 as shown. It will be understood that the vertical location of the abutment 2204 and the bracket projection 2207 is so adapted that the bracket projections will rest on the fixed abutments, when the intermediate press platen 2200 assumes a position substantially in the middle between the two press platens 115 and 116, when the movable press platen 116 is in its lowest position. In the abutment 2204 there may be provided vertical holes opening upwardly in which are inserted strong springs (not shown) extending with their top ends slightly above the top surface of the abutment 2204, so as to take up the shock and provide a silent and soft stopping of the intermediate press platen on its way down.

From the description of the operation of the single opening press, it will be remembered that the side pressure was applied in a vertical position of the movable press platen before the vertical main pressure on the work piece was effected.

Now in the two-opening press there is provided side pressure cylinders as well on the lower press platen 116 as on the intermediate press platen 2200 as shown in Figure 41. The lower side pressure cylinders are referred to by 2210 and are mounted on the side of the press platen 116 exactly in the same manner as described hereinbefore. Therefore, the way of mounting will not be repeated here.

The upper side pressure cylinder is referred to as 2211 and is secured to the side wall of the intermediate press platen 2200 also in the manner described hereinbefore.

In the two-opening press, it is the vertical space in the top opening 2212 which will have to control when the side pressure is to be applied, viz. when the side pressure guide valve 471 is operated by means of the side pressure switch mechanism in the manner shown and described with reference to Figures 14 through 18.

Therefore, in the two-opening press the control rod 750*a*, which by means of its extension or nose 752*a* acts on the side pressure switch mechanism is as shown secured—not to the side wall of the press platen 116 opposite the side pressure cylinder 2210—but to the side wall of the intermediate press platen 2200 opposite the side pressure cylinder 2211.

From the previous description and the view shown in Figure 3, it will be understood by those skilled in the art how the rod should be arranged and it is therefore not described here in more detail.

It will be understood, however, that means must be provided to secure as well that the lower press opening 2213 is not closed on the work piece 2250 arranged in this lower opening until the side pressure is applied in both press openings, and that means must be provided to enable a vertical space between the top surface of the press platen 116 and the bottom surface of the intermediate press platen 2200, which is substantially equal to the vertical space between the top surface of platen 2200 and bottom surface of platen 115 at the time, when the side pressure is applied in both press openings, so that the side pressure can be applied simultaneously in both press openings 2212 and 2213.

To this purpose there is provided between the lower movable press platen 116 and the intermediate press platen 2200 resilient members adapted to carry the intermediate press platen 2200 vertically spaced above the lower press platen 116, when the latter is shifted to be raised.

More specifically there is as shown in Figure 40 adjacent the corner of the lower press platen 116 arranged cylinders, generally referred to as 2220, of which three 2221, 2222 and 2223 are shown in the perspective view of Figure 40. These cylinders are firmly secured to the press platen 116 and are provided with an upwardly open bore in which springs 2224, 2225 and 2226 are arranged.

In vertical alignment with said bores there are secured to the corner of the intermediate press platen 2200 brackets 2227, 2228 and 2229. Said brackets are provided with projections 2230, 2231 and 2232 forming abutments for the top ends of the springs 2224, 2225 and 2226.

As more specifically shown in Figure 41, there is provided on the corner of the press platen 116 a cylinder 2220 having an exterior casing or housing 2221. In this cylinder there is provided a central bore 2240 in which is slidable a piston-like member 2241 adjustably in vertical direction by means of an adjusting screw 2242 passing through a screw threaded hole 2243 in the bottom 2244 of the cylinder 2220. In the cylinder there is inserted a spring 2224.

The rigidness of this spring is so adapted that the four springs, when abutting against the projection 2231 of the bracket 2228 secured to the corner of the intermediate press platen 2200, will carry this platen in a distance vertically spaced above the top surface of the lower press platen 116, which is substantially equal to the vertical space of the top opening 2212 assumed when the side pressure is applied.

This means that when the main hydraulic system is operated to shift the lower press platen 116 to be raised, the press platen 116 will during its first movement raise under influence of the hydraulic pistons; then the top ends of the springs 2224, 2225 and 2226 will abut against the projections 2230, 2231 and 2232 on the intermediate press platen. For a work piece 2250 arranged on the top surface of the press platen 116 a certain thickness, the springs 2224, 2225 and 2226 will in advance be so adjusted by means of the adjustment screw 2242 that the springs, when during the further movement carrying the intermediate press platen, will be compressed to such an extent that they will carry the intermediate press platen spaced such a distance above the top surface of the press platen 116 that no main vertical pressure is applied to the work piece 2250. On the other hand the space between the two press platens 116 and 2200 should be substantially greater than the thickness of the work piece 2250, preferably as mentioned about ¼ inch.

During the further movement both press platens are raised, and when the vertical daylight of the top opening 2212 assumes substantially the same space as that of the lower opening 2213, the side pressure switch operating rod projection 752*a* (which is carried on the platen 2200) shifts the switch mechanism and thereby the side pressure valve 471, so as to apply the side pressure simultaneously in both press openings.

During the further operation the hydraulic system is operated as already described hereinbefore shifting again the switch valve 471, when the side pressure has assumed the predetermined value and hereafter causing a further raising of the lower press platen 116 with the result that the two work pieces 2250 and 2251 will be subjected to the final main vertical pressure.

The springs 2224, 2225 and 2226 are so dimensioned as to be rigid enough to carry the weight of the press platen 2200 including the work piece spaced vertically above the lower press platen without, however, to be so rigid that they will form any substantial obstruction to closing the lower daylight 2213 on the work piece when the vertical high pressure is applied.

Though not shown in Figures 40 and 41 it will be understood that also end pressure cylinders may be mounted in a corresponding manner as shown and described with reference to Figure 31 and that a similar end pressure hydraulic system may be used as that shown and described with reference to Figure 32.

*Electric wiring of press*

As shown in Figure 1, there are two electric push buttons $Pu_1$ and $Pu_2$ for start and stop respectively.

As further described with reference to Figure 8 the pressure gauge operates the push button 326 of the pump motor switch 330. As described with reference to Figures 10 and 11, the timer mechanism is adapted to operate the switch push button 986 of the timer switch, shown on the front of the timer box in Figure 4, and now referred to by 2260.

These switches together with the timer motor 932 and the pump motor, which will now be referred to by 2261 are connected in accordance with the wiring diagram shown in Figure 42, in which also two relays are used, a pump motor relay RAP and a timer motor relay RAT.

Now with reference to Figure 42, $V_1$, $V_2$ and $V_3$ are the electric circuit main terminals connecting the circuit with a three-phase supply line.

The pump motor relay RAP is provided with four pairs of contacts designed by $P_1$—$P_2$, $P_3$—$P_4$, $P_5$—$P_6$, $P_7$—$P_8$. Correspondingly the timer motor relay RAT is provided with four pairs of contacts $T'_1$—$T'_2$, $T'_3$—$T'_4$, $T'_5$—$T'_6$, $T'_7$—$T'_8$ respectively. The pump motor relay coil is designated by CP and the timer motor relay coil is designated by CT.

From the three main terminals, the three-phase leads are connected as well with the three pump motor relay contacts $P_3$, $P_5$ and $P_7$. These leads are referred to by $L_1$, $L_2$ and $L_3$. Similar branch leads $L_4$, $L_5$ and $L_6$ are connecting the three terminals $V_1$, $V_2$ and $V_3$ with the contacts $T'_3$, $T'_5$ and $T'_7$ of the timer motor relay.

The corresponding pump motor relay contacts $P_4$, $P_6$ and $P_8$ are through further leads $L'_1$, $L'_2$ and $L'_3$ connected with the pump motor. The timer motor relay contacts $T'_4$, $T'_6$ and $T'_8$ are through further leads $L'_4$, $L'_5$ and $L'_6$ connected with the timer motor.

Furthermore, the right terminal 2260*a* of the timer motor switch is through a lead $L_7$ connected with the right terminal 330*a* of the pump motor switch. From this lead a branch lead $L_8$ is leading to the right terminal 2262*a* of the stop push button $Pu_2$. The left terminal 2262*b* of this push button is through a lead $L_9$ connected with the phase lead branch $L_6$.

The left terminal 2260*b* of the timer motor switch is through a lead $L_{10}$ connected through the timer motor relay coil CT to the timer motor relay contact $T'_2$. The left contact 330*b* of the timer motor switch is through a lead $L_{11}$ over the pump motor relay CP connected with the pump motor relay contact $P_2$. This contact $P_2$ is through a lead $L_{12}$ connected with the contact $T'_2$. Furthermore, the pump motor relay contact $P_1$ is through a lead $L_{13}$ connected with the timer motor relay contact $T'_1$.

The left contact 2263*b* of the start push button PV is through a lead $L_{14}$ branched into the phase lead $L_5$. A further lead $L_{15}$ branches this phase lead $L_5$ in the lead $L_{13}$. Finally the right contact 2263*a* of the start push button $Pu_1$ is through a lead $L_{16}$ branched into the lead $L_{12}$.

The normal position of all switches are as follows:

The start switch is open, the stop switch is closed. The pump motor switch is closed and the timer motor switch is open.

The mode of operation is as follows:

It will be understood that when either of the relay coils CP and CT are supplied with current, they attract their anchor with the result that the corresponding four pairs of appertaining relay contacts are bridged. Such a way of operating a relay is common knowledge and does not need to be described in more detail.

When pressing the start push button $Pu_1$ a circuit is formed from the terminal $V_3$ through the lead $L_6$, the branch lead $L_9$, stop push button contacts lead $L_8$ to the branch point into lead $L_7$. Hereafter via lead $L_7$ over pump motor switch contact lead $L_{11}$, coil CP, lead $L_{12}$, branch lead $L_{16}$, start push button contact, lead $L_{14}$ and lead $L_5$ back to terminal $V_2$.

Hereby the relay RAP is operated and will close its four relay contacts. This gives direct connection through the three-phase lead to the pump motor, which is then started.

By closing the relay contacts $P_1$ and $P_2$ there is furthermore provided a circuit from $P_2$ over $P_1$, $L_{13}$, $L_{15}$ and back through $L_5$ to terminal $V_2$. This latter circuit shunts the start circuit just described through $L_{12}$, $L_{16}$, $Pu_1$ contacts and $L_{14}$. Thus when the start push button is released this latter circuit will form a holding circuit for the relay RAP, so that this will remain attracting its anchor and the pump motor will run continuously.

As explained in connection with the operation of the hydraulic system with reference to Figure 12, one of the first operations effected, when pressure is delivered from the pump, is that the membrane re-setter 46 operates the timer lever 1000 which as explained in connection with the operation of the timer (Figures 10 and 11) causes closing of the timer switch 2260.

Hereby the following circuit is formed:

From terminal $V_3$ via lead $L_6$, lead $L_9$, stop push button contacts, lead $L_8$, lead $L_7$, timer switch contacts, lead $L_{10}$, timer relay CT, lead $L_{12}$, pump relay contacts $P_1$ and $P_2$, lead $L_{13}$, lead $L_{15}$ and back through lead $L_5$ to terminal $V_2$.

Hereby the timer motor relay RAT attracts its anchor and closes the four pairs of contacts. This provides a driving circuit for the timer motor which is then started.

By closing the timer motor relay contacts $T'_1$—$T'_2$, that part of the circuit just described, which comprises the lead $L_{12}$, the pump motor relay contacts $P_1$ and $P_2$ and the lead $L_{13}$ to that point *x* where the branch goes off to lead $L_{15}$ is shunted by the remaining part of lead $L_{13}$ in series with timer relay contacts $T'_1$ and $T'_2$, which then forms a holding circuit for the timer motor relay, so that the latter will not fall out even when the pump motor relay contacts $P_1$ and $P_2$ are opened.

As described and shown in connection with the hydraulic system of Figures 12 and 13, and in connection with the pressure gauge (Figure 8) the abutment 322 in the pressure gauge will, responsive to arrival of the pre-set pressure push the pump motor switch push button 326. This will open the pump motor switch 330 and break the circuit first described through the pump motor relay coil. Accordingly the pump motor relay RAP will fall out and break the four pairs of pump motor relay contacts with the result that the pump motor is stopped.

It will be appreciated that the holding circuit for the timer motor relay CT also provides a shunting of the start push button contacts. This holding circuit provides a connection from the point $x$ via lead $L_{13}$, contacts $T'_1$, $T'_2$ and Lead $L_{12}$ to point $y$.

Therefore, if the pressure should decrease during the time interval in which the timer motor is running, which will result in a reclosing of the pump motor switch 330, because the abutment 322 in the pressure gauge (Fig. 8) will release the push button 326, the pump motor will be started again. The starting circuit will be the same as described initially in connection with the start with the exception that from point $y$ the starter circuit follows lead $L_{12}$, further pass over $T'_1$, $T'_2$, goes through lead $L_{13}$ to point $x$, and hereafter follows lead $L_{15}$ going back through lead $L_5$ to terminal $V_2$.

When after the predetermined curing time, controlled by the timer mechanism (Figures 10 and 11), the timer switch is opened, all circuits are broken due to the fact that both $T'_1$ and $T'_2$ are comprised as well in the holding circuit for the timer relay RAT as in the circuit for the pump relay RAP, when the timer relay has attracted its anchor. Hereafter both relays will fall out and as well pump motor as timer motor will stop with the result that the whole hydraulic system is relieved in the manner already detailed described with reference to Figures 12 and 13.

*Alternative embodiment of the main hydraulic system*

Instead of as shown in Figures 12 and 13 to apply the high pressure and the low pressure to the hydraulic system by means of two different pumps, one single pressure supply pump may be used as shown in the alternative embodiment schematically outlined in connection with Figure 43, which is a diagrammatic view in similarity with that shown in Figure 12.

In order to simplify the explanation, those parts of the embodiment according to Figure 43, which are the same as in the system of Figure 12, will be referred to by the same reference numerals as in Figure 12.

The hydraulic system of Figure 43 generally comprises a main low pressure supply pipe B extending into the low pressure check valve 43 from the outlet of which is extending the main pressure pipe C, branched through pipes C into the main pressure cylinders. From the top of the low pressure check valve 43, the pipe D extends to the main guide valve 3041, which is of a construction similar to the construction of the main guide valve shown in Figure 19, but with the difference, which will appear from the description of Figure 49, which shows the modified construction of the main guide valve 3041. From the rear end of this valve the return pipe E extends into the oil tank 80. The high pressure chamber 1177 of the main guide valve is through the pipe K connected with the inlet 1250 of the pilot valve 45. The outlet 1257 of this valve is instead of being connected with the bypass valve as in Figure 12 in the embodiment of Figure 43 branched directly into the return pipe E through the pipe $K_{43}$.

The bypass valve 44 is omitted in the embodiment of Figure 43. Furthermore, a branch pipe $L_{43}$ from the low pressure pipe B communicates through a closure control valve 3044 with an inlet of the main guide valve 3041.

The modified embodiment of the high pressure check valve, which in Figure 43 is referred to by 3043, has its outlet communicating through a pipe $J_{43}$ with an inlet of the main guide valve 3041.

Furthermore, the hydraulic system comprises a branch pipe $H_{43}$, extending from the main supply pipe B into a booster pump 3100. This booster pump is through pipes $H_{43}$ and $H_{44}$ connected with the inlet port of a booster 3110 from which outlets through high pressure pipes $H_{51}$ and $H_{52}$ are communicating with inlets of the high pressure check valve 3042.

The construction of the closure control valve is shown in Figure 48. The booster pump and booster are shown in Figure 45 and the booster pump is shown in alternative position in section in Figure 46; the booster pump itself is shown in perspective view in Figure 44.

Hereafter the further descrption of the system according to the embodiment of Figure 43 is made with respect to Figures 21, 23 and 24, what the low pressure check valve, pilot valve and membrane re-setter are concerned, and with reference to Figures 44 through 49, what the remaining valves are concerned.

Now with reference to Figure 49 the only difference between the main guide valve shown here and that shown in Figure 19 resides therein that the pipe $L_{43}$ in the system of Figure 43 communicates with the high pressure chamber 1170 instead of with the low pressure chamber as in the case of the valve in Figure 19. In order to simplify the description, therefore, all remaining parts of the valve in Figure 49 are referred to with the same reference numerals as in Figure 19 except that the inlet connecting the pipe $L_{43}$ with the chamber 1170 is referred to as 3182.

The closure control valve shown in Figure 47 is provided with an inlet 3200 communicating with the valve chamber 3201. The valve is further provided with an outlet 3202 communicating with the other end of the pipe $L_{43}$. At the inlet end, there is provided a valve seating 3202 normally closed by a valve closure member, which is loaded by a spring 3205. This spring is relatively weak, so as to enable opening of the valve immediately when pressure is applied through the branch pipe $L_{43}$. As already described, the pipe portion $L_{43}$ communicating with the outlet 3202 is leading to the inlet 3182 at the rear end of the main valve closure member 1156 in the main guide valve 3041, see Figure 49.

The inlet 1178 of the main guide valve communicates through the pipe $J_{43}$ with an outlet 3206 of the high pressure check valve shown in Figure 43. This valve comprises a main valve housing 3207 having a longitudinal bore 3208 forming a valve chamber and provided with a valve seat 3209. The portion of the bore or chamber 3208 below the valve seat 3209 communicates with a transverse bore 3210. The outlet 3206 is provided in a cover 3111. The transverse bore 3110 is at both ends provided with covers, 3212 and 3213 respectively, having inlets or ports, 3214 and 3215 respectively, communicating with the high pressure pipes $H_{51}$ and $H_{52}$. These inlets or ports at their interior edges valve seatings, 3216 and 3217 respectively, for valve closure members, 3218 and 3219 respectively, for instance in form of balls, which are loaded by means of a common spring 3220 guided within an open cage or the like 3221. The main valve seat 3209 is adapted to be closed by a valve closure member 3222 loaded by a spring 3223.

The booster pump, which in perspective view is shown in Figure 44 and together with the booster is shown in two alternative positions in Figures 45 and 46, is a pulsating pump, and comprises in general an exterior housing 3250, a slide member piston 3251, a spring loaded knee joint 3252, an exterior operating cylinder 3253 and an interior opeerating cylinder 3254.

As shown in the mechanical construction of Figure 44, the exterior cylinder is secured to a diagonally arranged bar or bridge 3255, which by bolts 3256, 3257 is rigidly secured to the casing 3250, in spaced relationship from the right hand end 3258 thereof.

Now with reference to Figure 45, the booster pump casing is in form of a cylinder 3260 having an inlet 3262 communicating with the branched supply pipe $H_{43}$. The cylinder is at its end closed by covers 3263 and 3264, in which are arranged outlets or ports 3265 and 3266. One or more such outlets may be provided at each of the end covers. The end cover 3263 is provided with inwardly directed cylindrical extension 3267 having a central bore forming a cylinder, in which a slidable piston 3268 having an exterior head 3269 is arranged.

The bore is of enlarged diameter at 3270 to form a chamber communicating with an inlet 3271.

In a similar manner the exterior cylinder 3253 is provided with a bore which guides a piston 3272 having a head 3273 of enlarged diameter to limit the inward movement of said piston. Also the bore of the cylinder 3253 is enlarged at 3274 to form a chamber communicating with an inlet 3275.

In the main cylinder 3260 there is arranged a slide member 3280 adapted to move between alternative exterior positions shown in Figures 45 and 46 respectively. This slide is provided with an interior cavity 3281 of such extension that in either of the interior positions this cavity will communicate with the main inlet 3262.

Outlet ports 3282 and 3283 are provided communicating with either of the connection pipes to the booster, $H_{43}$ and $H_{44}$ respectively. Further outlet ports 3284 and 3285 are provided communicating with either of the guide pipes, 3286 and 3287 respectively. As seen, the guide pipe 3286 connects the outlet 3285 with the inlet 3271 of the interior cylinder 3254, while the pipe 3287 connects outlet 3284 with the exterior cylinder 3253 at its inlet 3275. Both pairs of outlets, 3282, 3283 and 3284, 3285 respectively, are so located that in either of the exterior positions of the slide member 3280 the interior cavity thereof 3281 will bring one of the pairs of outlets in communication with the inlet 3262.

The slide member 3280 is provided with a cylindrical extension 3290 that extends outside the cylinder through a central aperture 3291 in the end cover 3264. In this cylindrical extension there is provided a central bore 3292 for the main piston of the spindle 3251.

At the protruding end of the cylindrical extension 3290 there is by means of a nut or the like 3293 arranged a transverse bar 3294, see also Figure 44. This bar is secured on the cylinder 3290 by abutting against the shoulder 3295.

This bar 3294 carries the knee joint system generally referred to as 3252. At opposite ends of the bar or arm 3294 there are provided pivots 3300 and 3301 by means of which pairs of pivotable arms 3302 and 3303 are connected with the arm or bar 3294. At the ends of these pairs of arms there are provided further pivots 3304 and 3305 at which further pivotable arms 3306 and 3307 are secured. At the ends of these latter arms there are provided further pivots 3308 and 3309 connecting the ends of the arms 3306 and 3307 with a cross rod or bar 3310 rigidly secured, for instance by means of a pin 3311, on that end of the piston 3251 which extends outside the cylinder.

The pivots 3304 and 3305 have extensions **3304*a* and 3304*b* respectively, between which are interposed springs 3312 and 3313**.

The dimensions of the knee joint here described are so that the dead center position of the arms 3306 and 3307 in the position of the parts shown in Figure 45 will be adjacent the end of the head 3273. This is the same as saying that this dead center position will correspond to bringing the right hand end of the main piston 3251 adjacent the surface of the head 3273.

Correspondingly the dead center position of the arms 3306 and 3307 with the parts in the position shown in Figure 45 will correspond to the left hand end of the main piston 3251 being adjacent the end surface of the other piston head 3269.

An important feature of the booster pump is that the slide member 3280 does not need to be sliding fit in the cylinder. On the contrary a certain play between the parts is advantageous, so as to allow that a certain excess of the pressure fluid, which is supplied by the pump will be allowed to escape through the outlets 3265 and 3266. It will be remembered that in the embodiment of Figure 12, the bypass valve was provided and operated to be opened when the high pressure was applied to the hydraulic system, so as to allow the excess of pressure fluid, which is supplied by the low pressure system at a ratio of for instance 15:1 compared with the fluid supplied by the high pressure system, could escape through the return pipe $B_3$.

Now in the present embodiment any excess of pressure fluid is avoided by allowing the fluid to escape from the booster pump to the oil tank through the two outlets 3265 and 3266.

The booster, which is also shown in Figures 45 and 46, comprises an exterior casing 3320 in form of a cylinder having a slidable piston 3321. The cylinder is closed by end covers 3322 and 3323 respectively. To the slidable piston there is secured a cylinder 3324 having one extension 3325 at the left hand side of the piston 3321 and another extension 3326 at the right hand side of said piston. The extension 3325 is provided with a longitudinal bore 3340, the interior end of which is of reduced diameter at 3341 and connected with a transverse bore 3342 that connects the bore 3341 with the left hand interior booster chamber 3350. At the junction between the reduced bore section 3341 there is provided a valve seat 3343 for a valve closure member 3344 loaded by a spring 3345.

In a similar manner the extension 3326 is provided with a central bore 3330 having a reduced diameter section 3331 that communicates through a transverse bore 3332 with the right hand booster chamber 3351. The cylinder 3326 further has a valve seat 3333 closed by a valve closure member 3334 loaded by a spring 3335.

The valve closure springs 3335 and 3345 are strong enough to prevent opening of these valves for the pressure supplied directly from the booster pump. The end cover 3322 has an interior sleeve 3360 and an exterior cylindrical extension 3361. The cylinder 3325 is tightened against the sleeve 3360 by means of a packing 3362. In the cylindrical extension 3361 and the sleeve 3360 there is formed a cylindrical chamber 3363 of larger diameter than the exterior diameter of the cylinder 3325. An outlet 3364 in said cylinder 3363 communicates with the pipe $H_{51}$.

In a similar manner the end cover 3323 has a sleeve 3370 tightened against the cylinder 3326 by means of a packing 3372. A cylindrical extension 3371 provides an interior cylindrical chamber 3373 having an outlet 3374 communicating with the high pressure supply pipe $H_{52}$.

The mode of operation is as follows:

Assume that the booster pump is in the position shown in Figure 45. The main guide valve 3041 is opened having after the sequence of operation been opened by means of the pressure applied through the pipe D in the same manner as described with reference to the mode of operation in Figure 12.

When the pump motor 84 is started, the pump immediately commences to deliver pressure fluid through the pipe B. As explained, the spring 3205 of the closure control valve is a relatively weak spring and therefore the pressure branched through the pipe $L_{43}$ will immediately open this valve so as to apply pressure in the chamber 1170 of the main guide valve 3041 thereby closing the same.

When thus the outlet 1154 of the main guide valve has been closed, the pressure will act on the valve closure member in the low pressure valve 43, thereby opening this valve and supplying fluid to the main pressure cylinders.

Furthermore, as in the case of Figure 12, the pressure is immediately through the branch pipe $B_2$ supplied to the membrane re-setter, whereby the spindle of this is raised causing the timer lever 1000 to be tilted to press down the spindle of the pilot valve 45 to close the latter. As described in connection with the operation of the timer (Figs. 10 and 11) the timer lever is blocked and will not be relieved until after the end of the preset curing time.

Simultaneously pressure fluid is supplied through the pipe $H_{43}$ to the cavity of the slide member 3280 in the booster pump. Hereby the pressure is also slightly increased in the interior cylinder 3270 of the booster pump and in the right hand booster chamber 3351.

When the press platens are brought together upon the work piece there is an increase of resistance and the relatively large amount of pressure fluid supplied by the pump 84, which cannot escape, will give rise to a still increased pressure in the system comprising the cavity 3281 of the slide member 3280, pipe 3286, cylinder chamber 3270 and pipe $H_{44}$ together with the right hand booster chamber 3351. This will move the booster piston in direction against the left hand cylinder end. The pressure fluid which may be found in advance in the left hand booster chamber 3350 will therefore be exhausted through the interior valve 3344 thereof at a pressure which is a function of the ratio between the area of the booster piston 3321 and the valve member 3344. This gives rise to an impulse of high pressure fluid supplied through the pipe $H_{51}$ which lifts the valve member 3218 in the high pressure check valve 3042.

With still increasing pressure in the cylinder chamber 3270, the piston 3268 will be moved towards the right side against the tension of the booster pump springs 3312 and 3313. When, however, the knee link system arms 3306 and 3307 are passing the dead center, the springs 3312 and 3313 will feel no resistance against shortening themselves again with the result that the left hand end of the piston 3251 will abut against the piston head 3273. The springs 3312 and 3313 still acting on the knee link system will then switch the knee link system over so as to effect a relative displacement between the piston 3251 and the slide member 3280 with the result that the parts immediately will assume the position shown in Figure 46.

Hereafter the main inlet of the booster pump is in communication with the system comprising the pipe 3287, exterior cylinder chamber 3274 and left hand booster chamber.

This latter chamber 3274 will now receive supply of pressure fluid displacing the booster piston in right hand direction exhausting the contents of the right hand booster chamber 3351 at increased pressure through the valve 3334 which opens the valve 3219 in the high pressure check valve 3042. When the pressure in the exterior cylinder chamber 3254 has reached a certain value, the piston 3272 will start moving pushing on the right hand end of the piston or spindle 3251 and thereby again bringing the knee link system to pass the dead center, and thereby by snap action bring the system back to the position shown in Figure 45.

It will be understood that the booster pump and booster are acting as a pulsating pressure exchanger receiving a supply of pressure fluid at a relatively large amount of quantity, but at low pressure, delivering pulsating amounts of pressure fluid in small quantities by weight but at high pressure.

The high pressure check valve having two inlet valve members 3218 and 3219 respectively, but only a single outlet valve member 3209 will through its outlet supply to the pipe $J_{43}$ a relatively uniform amount of pressure fluid entering the high pressure chamber 1170 of the main guide valve 3041.

Hereby the interior valve 1173 of the main guide valve 3041 is opened and the high pressure is via the pipe D supplied to the valve chamber 1112 of the low pressure check valve, see Figure 21, so as to raise the pressure in the whole hydraulic system in the manner already described in connection with the operation of the main hydraulic system of Figure 12.

When the curing time is passed, the timer relieves in the way already described the lever 1000. Since the high pressure is supplied through the outlet 1177 of the main guide valve 3041 to the pipe K, this will as also described hereinbefore immediately open the pilot valve and bring the high pressure chamber 1170 of the main guide valve in communication with the return pipe E through the pilot valve 45 and the pipe $K_{43}$.

Hereafter the difference in pressure in the two chambers 1151 and 1152 of the main guide valve will open the main valve closure member 1156 thereof in the manner also described in connection with the operation of the system in Figure 12 by initially lifting the valve closure member 1165 and as a final step moving the valve closure member 1156 to its open position.

Hereafter all valves are re-set to their original initial position.

It will be understood that the embodiment shown and described with reference to Figure 43 only comprises the main hydraulic system and may be completed with side pressure system and end pressure system, if wanted, along the principles explained with reference to Figure 13 and/or Figure 32.

*Alternative embodiment of side pressure cylinder mounting*

Instead of arranging the side pressure cylinders rigidly on brackets secured to one side wall of the movable press platen, as shown in Figure 6, an alternative embodiment may be used as shown in vertical section in Figure 50 and plane view in Figure 51.

In this embodiment 116 is the movable press platen as in the case of Figure 1. To the side wall of this press platen there are secured strips or the like 3400 and 3401. These strips are provided with screw threaded bolting holes 3402 and 3403. To either of these strips there is by pairs of bolts 3404 and 3405 secured a bracket which seen from the top end as in Figure 51 is L-shaped and has vertical extending bracket arms 3407 and 3408. Adjacent the top and bottom these brackets are provided with horizontal screw threaded bolt holes, 3410 and 3411 respectively, for receiving a pair of bolts 3412 and 3413. These bolts are passing through holes 3414 and 3415 in a strip or plate 3416 which between itself and the bracket 3407 clamps an I-profiled rail generally referred to as 3417, having in its body portion 3418 cylindrical apertures for receiving the side pressure cylinders 3420.

Either cylinder is provided with an exterior flange 3421 firmly secured to the cylinder to form an abutment against the body portion 3418 of the I-iron rail. Between the left hand end cover 3422 of the side pressure cylinder and the I-rail body portion there is inserted a tubular distance member 3423. The rear end of the cylinder is closed by another cover 3424. The two end covers are connected by longitudinal bolts 3425 and 3426 in a similar manner as shown in Figure 6.

As shown in section in Figure 50 the side pressure cylinder comprises a piston member 3427 loaded by a spring 3428 which abuts against the left hand end cover at one end and against a flange 3429 of the piston member at the other end. At the rear end of the piston there is provided a pressure chamber 3430 provided with an inlet 3431 for the supply of pressure fluid.

The piston member extends through the left hand end cover and is here provided with a flattened portion 3432 having a hole 3433 for the passage of a bolt 3434. A pressure shoe 3435 which is of T-form as shown in Figure 6 is connected with said flattened piston and loaded by a spring 3436.

Below the I-rail 3417 there extends from the bracket 3407 a rigid arm 3437 which is provided with a screw threaded bolting hole 3438 in which is arranged a bolt 3439 adjustable to abut the underside of the I-rail.

It will be understood that the arrangement here described is repeated for each of the plurality of side pressure cylinders arranged along the side edge of the movable press platen.

By slightly loosing the bolts 3412 and 3413 vertical adjustment of the whole I-rail can be easily effected simply by turning the adjustment bolt 3439.

*Alternative arrangement of the end pressure*

While in the embodiment of Figure 37 the mounting of the end pressure cylinders was supposed to be made in a similar manner as the mounting of the side pressure cylinders, a modification is shown in Figures 52 and 53.

In some instances the mounting of the end pressure cylinder extending from the end of the fixed press platen is not too convenient, because the end pressure cylinders themselves are extending with substantially half of their diameter below the appertaining pressure shoes. This provides the necessity of having a relatively large pressure opening or daylight in order to push in the work piece and this again is a disadvantage in as far as this requires a relatively large movement of the movable press platen and thereby more fluid supply, and increases the time necessary for bringing the press platens together, etc.

The embodiment shown in Figures 52 and 53 in general provides the end pressure cylinder at the top of the fixed press platen with only the pressure shoe or shoes extending below the lower surface thereof.

More specifically the end pressure cylinder of which only one is necessary is arranged on the upper transverse beam 108 of the press. The end pressure cylinder 3500 is of a similar construction as the side pressure cylinders, for instance as shown in section in Figure 50. The end pressure cylinder is provided with an inlet 3501 and has an extending piston end 3502 adapted to engage a frame structure generally referred to as 3503 and shown more specifically in the perspective view of Figure 53. This frame structure comprises a downwardly open U-formed frame having a body portion 3504 and side portions 3505 and 3506. To the side portions there are connected brackets 3507 and 3508 having apertures for the passage of a spindle 3509. This spindle is carried in brackets 3510 and 3511 secured to the top surface of the press platen 115, so as to allow the frame 3503 to be tilted in direction of the double arrow shown in Figure 52. To the lower end of the frame legs 3505 and 3506 there are secured pivot pins 3512 and 3513 to which are secured arms 3514 and 3515 forming an integral part of one single pressure shoe 3516 which extends substantially across the entire end edge of the press platen 115. At the middle of the pressure shoe there is provided an extension 3517 having a hole 3518, through which extends a guiding rod 3519 having underneath the extension 3517 a head 3520. This pin 3519 extends through a hole in a transverse bridge 3521 between the two brackets 3510 and 3511 and is on the other side of said hole provided with another preferably adjustable head 3522.

As it will be seen from the side view of Figure 52, the frame 3503 and the rod 3519 are together with the brackets 3510 and 3511 and the pressure shoe arms 3514 and 3515 forming a sort of parallelogram, so as to guide the pressure shoe in a horizontal plane in a predetermined distance below the bottom surface of the press platen 115, when the piston extension 3502 pushes on the top portion 3504 of the frame.

In order to retract the pressure shoe from operative pressing position, one or more springs 3525 may be provided for instance between the frame 3503 and the brackets 3510 and 3511.

While in the foregoing specification this invention has been described in considerable detail for the purpose of illustrating embodiments thereof it will be apparent that many of these details can be varied widely without departing from the spirit of the invention.

It will further be apparent, for instance, that the embodiment of the invention described in connection with the duplex-opening press of Figures 40 and 41 can be incorporated also in a triplex- or quadruplex-opening press or a press having any plurality of openings or daylights. Such embodiments will not be described in detail, however, because those skilled in the art will, from the description of the hydraulic system and the description of the press, be able to design any kind of such press in accordance with my invention.

Though with reference to Figure 43 I have only described an alternative embodiment of the main hydraulic system it will be apparent that in the same manner as the system of Figure 12 can be completed with side and end pressure also the alternative embodiment of Figure 43 can be completed with such side and end pressure systems by providing in the main supply pipe to the low pressure check valve the main valve **472*a*** of the side pressure system of Figure 13 plus branching off from the main system of Figure 43 the necessary further pipes to the side and/or end pressure system.

From description of the construction and operation of the timer it will be understood that this is simply a timing device operable to be preset to run for a predetermined time interval when started and then after the expiration of said time interval adapted to operate a member to be shifted to terminate the closing of the return passageway for the high pressure fluid, and that therefore any suitable form of timing device can be used.

While in the description of the mode of operation the term Stop of the movement of the movable press platen has been used, it will be apparent that this term does not necessarily mean full stop. As mentioned, the ratio of amount of pressure fluid delivered by the high pressure pump and the low pressure pump is something like 1:15. When the low pressure fluid supply pipe is closed during the application of the side pressure there is still supplied fluid to the pressure cylinders through the high pressure supply pipe, but only at an amount of 1:15. This means that the speed at which the movable press platen will raise as long as the low pressure supply system is closed will only be 1:15 of the normal raising speed, which in practice is substantially the same as to stop the pressure platen movement during the application of the side pressure.

As mentioned my press is preferably of the hot press type. Preferably the press platens are heated by steam supplied through steam pipes connected to inlets and outlets of the press platens. Such steam pipes and inlets and outlets have purposely not been shown in the views. It is common knowledge, however, to provide steam inlets and outlets to hot press platens and those skilled in the art will easily be able to arrange such inlets and outlets and connect them with proper steam pipes in the most convenient manner in accordance with the present steam installation in the factory where the press is to be used.

It should now be apparent from the foregoing that an arrangement similar to the arrangement shown with respect to the end pressure cylinders mounted on the fixed press platen and with the pressure members extending below the pressure surface of the fixed press platen is entirely possible with respect to the side pressure cylinders and their pressure members.

From the foregoing specification it will appear that I have provided a fully-automatically-operated hydraulic press especially for wood-working purposes such as a veneering press that is capable to press a panel plate in one operation.

The operation of the press starts with a movable press platen lowered. The parts of the panel plate are loaded on the movable press platen. The panel thickness control is set to respond to the thickness of the panel plate. The main pressure control as well as the side pressure control are also preset together with the curing time. Thereafter the press is started. Hereby the lower press platen will be raised. Just before the press platens start to press on the work piece the movement of the movable press platen will be stopped and the side pressure will be applied. When the side pressure has reached a predetermined value, the movable press platen starts to move again and presses the work piece against the stationary press platen with the preset main pressure and during a curing time that has been preset by means of the timer.

When the timer runs out the pressure in the hydraulic system is relieved and the movable press platen is lowered. Simultaneously the side pressure shoes are retracted. The panel plate is then finished.

I claim:

1. In a hydraulic press for adhering veneer laminations to a multiple-piece core compressed in the plane of the core pieces, the press comprising, a pair of opposed relatively-movable platens dimensioned and mounted to contact the opposite veneer laminations and press them against the core pieces, opposed and relatively movable clamping elements dimensioned and mounted to contact opposite edges of the core pieces and compress them in the plane thereof, separate hydraulically-actuated means for effecting the relative movement of the platens and the clamping elements, a hydraulic pressure source for the operation of the hydraulically-actuated means, and manually-settable automatic-acting pressure-control mechanisms interposed between the hydraulic pressure source and the respective hydraulically-actuated means for successively initiating the relative movement of the platens toward the interposed veneer-laminated core pieces and arresting such movement upon the platens reaching a predetermined relative contiguity to the veneer-laminated core pieces, then initiating a relative movement of the clamping elements against the core pieces and arresting such movement at a predetermined pressure, and subsequently continuing the relative movement of the platens to apply and maintain a predetermined pressure of the veneer laminations against the core pieces.

2. In a hydraulic press for adhering veneer laminations to a multiple-piece core compressed in the plane of the core pieces, the press comprising, a pair of opposed relatively-movable platens dimensioned and mounted to contact the opposite veneer laminations and press them against the core pieces, opposed and relatively movable clamping elements dimensioned and mounted to contact opposite edges of the core pieces and compress them in the plane thereof, separate valve-controlled hydraulically-actuated means for effecting the relative movement of the platens and the clamping elements, a hydraulic pressure source for the operation of the hydraulically-actuated means, separate mechanisms connected to automatically actuate the valves controlling the respective hydraulically-actuated means, and manually-settable devices connected to the respective mechanisms to predetermine their sequential operation for successively initiating the relative movement of the platens toward the interposed veneer-laminated core pieces and arresting such movement upon the platens reaching a predetermined relative contiguity to the veneer-laminated core pieces, then initiating a relative movement of the clamping elements against the core pieces and arresting such movement at a predetermined pressure, and subsequently continuing the relative movement of the platens to apply and maintain a predetermined pressure of the veneer laminations against the core pieces.

3. In a hydraulic press for adhering veneer laminations to a multiple-piece core compressed in the plane of the core pieces, the press comprising, a pair of opposed relatively-movable platens dimensioned and mounted to contact the opposite veneer-laminations and press them against the core pieces, opposed and relatively movable clamping elements dimensioned and mounted to contact opposite edges of the core pieces and compress them in the plane thereof, separate hydraulically-actuated means for effecting the relative movement of the platens and the clamping elements, a hydraulic pressure source for the operation of the hydraulically-actuated means, valve means for alternately connecting the respective hydraulically-actuated means to the source of hydraulic pressure, mechanisms automatically actuating the valve means, and manually-settable devices for regulating the sequential operation of the valve means for successively initiating the relative movement of the platens toward the interposed veneer-laminated core pieces and arresting such movement upon the platens reaching a predetermined relative contiguity to the veneer-laminated core pieces, then initiating a relative movement of the clamping elements against the core pieces and arresting such movement at a predetermined pressure, and subsequently continuing the relative movement of the platens to apply and maintain a predetermined pressure of the veneer laminations against the core pieces.

4. In a hydraulic press for adhering veneer laminations to a mutiple-piece core compressed in the plane of the core pieces, the press comprising, a pair of opposed relatively-movable platens dimensioned and mounted to contact the opposite veneer-laminations and press them against the core pieces, opposed and relatively-movable clamping elements dimensioned and mounted to contact opposite edges of the core pieces and compress them in the plane thereof, separate hydraulically-actuated means for effecting the relative movement of the platens and the clamping elements, a hydraulic pressure source for the operation of the hydraulically-actuated means, valve means for alternately connecting the respective hydraulically-actuated means to the source of hydraulic pressure, mechanisms automatically actuating the valve means, manually-settable devices for regulating the sequential operation of the valve means for successively initiating the relative movement of the platens toward the interposed veneer-laminated core pieces and arresting such movement upon the platens reaching a predetermined relative contiguity to the veneer-laminated core pieces, then initiating a relative movement of the clamping elements against the core pieces and arresting such movement at a predetermined pressure, and subsequently continuing the relative movement of the platens to apply and maintain a predetermined pressure of the veneer laminations against the core pieces, and an additional manually-settable device for predetermining the release of pressure to the valve means.

5. In a hydraulic press for adhering veneer laminations to a clamped multiple-piece core, the press comprising, a hydraulically-actuated platen for compressing the veneer laminations against the core pieces, relatively-movable hydraulically-actuated elements for clamping the core pieces between them in a direction normal to the movement of the platen, a source of hydraulic pressure, valve means alternately connecting the source of pressure to the hydraulically-actuated veneer laminating platen and to the core-clamping elements, hydraulically-controlled mechanisms for automatically actuating the valve means, and manually-settable devices for adjusting the respective mechanisms for altering their automatic actions to successively initiate the movement of the platen toward the veneer-laminated core and arrest such movement upon the platen reaching a predetermined approach to compression action, then initiate the movement of the core-clamping elements and arrest such core-clamping movement at a predetermined pressure on the core pieces, and subsequently continue the movement of the platen to apply pressure to the veneer-laminated core for a predetermined period of time.

6. In a hydraulic press for adhering veneer laminations to a clamped multi-piece core, the press comprising, a hydraulically-actuated platen for compressing veneer laminations against the core pieces, relatively-movable hydraulically-actuated elements for clamping the core pieces between them in a plane normal to the movement of the platen, a source of hydraulic pressure, a primary hydraulically-actuated valve means for alternately connecting the source of pressure with the hydraulically-actuated platen and the core-clamping elements, secondary hydraulically-actuated valve means for controlling the synchronized action of the primary valve means, spring-actuated mechanisms for controlling the action of the respective secondary valve means, and manually-settable devices for adjusting the spring-actuated mechanisms to alter the timed action of the secondary valve means so as to successively initiate the movement of the platen toward a compression of the veneer-laminated core pieces and arrest such movement upon the platen reaching a predetermined approach to compression action, then initiate the relative movement of the clamping elements against the core pieces and arrest their movement upon attaining a predetermined pressure, and subsequently continue the movement of the platen to apply and maintain a predetermined pressure of the veneer laminations against the core pieces.

7. In a hydraulic press for adhering veneer laminations to a clamped multi-piece core, the press comprising, a platen for compressing the veener laminations against the core pieces, elements for clamping the core pieces between them in a plane normal to the direction of movement of the platen, hydraulically-actuated means for operating the platen and the clamping elements, a hydraulic-pressure-creating source for the operating means, a first hydraulically-actuated main valve interposed between the pressure source and the platen operating means, a second hydraulically-actuated main valve interposed between the pressure source and the clamping-elements operating means, a first spring-controlled hydraulically-actuated auxiliary valve interposed between the pressure source and the first and second main valves to control the coordinated opposite shifting of the main valves to alternate pressures to the hydraulically-actuated means for the platen and the clamp-operating elements, hydraulically-actuated means for resetting the spring-controlled auxiliary valve, a second spring-controlled hydraulically-actuated auxiliary valve interposed between the second main valve and the resetting means whereby the release of the second spring-controlled auxiliary valve effects the actuation of the resetting means for the first spring-controlled auxiliary valve and reversing the main valves to restore pressure to the platen-actuating means, and manually-settable devices for initially setting the respective spring-controlled auxiliary valves so that the pressure-creating source successively initiates the movement of the platen to a predetermined approach to the veneer-laminated core pieces, then initiates the movement of the core-clamping elements to a predetermined pressure on the core pieces, and subsequently continues the movement of the platen to apply pressure to the veneer-laminated core pieces.

8. In a hydraulic press for adhering veener laminations to a clamped multi-piece core, the press comprising, a platen for compressing the veneer laminations against the core pieces, elements for clamping the core pieces between them in a plane normal to the direction of movement of the platen, hydraulically-actuated means for operating the platen and the clamping elements, a hydraulic-pressure-creating source for the operating means, a first hydraulically-actuated main valve interposed between the pressure source and the platen operating means, a second hydraulically-actuated main valve interposed between the pressure source and the clamping-elements operating means, a first spring-controlled hydraulically-actuated auxiliary valve interposed between the pressure source and the first and second main valves to control the coordinated opposite shifting of the main valves to alternate pressures to the hydraulically-actuated means for the platen and the clamp-operating elements, hydraulically-actuated means for resetting the spring-controlled auxiliary valve, a second spring-controlled hydraulically-actuated auxiliary valve interposed between the second main valve and the resetting means whereby the release of the second spring-controlled auxiliary valve effects the actuation of the resetting means for the first spring-controlled auxiliary valve and reversing the main valves to restore pressure to the platen-actuating means, electrically-actuated timer for controlling the duration of restored pressure to the platen-actuating means, and manually-settable devices for initially setting the respective spring-controlled auxiliary valves and the electric timer so that the pressure-creating source successively initiates the movement of the platen to a predetermined approach to the veneer-laminated core pieces, then initiates the movement of the core-clamping elements to a predetermined pressure on the core pieces, and subsequently continues the movement of the platen to apply pressure to the veneer-laminated core pieces for a timed period.

9. In a hydraulic press for adhering veneer laminations to a clamped multi-piece core, the press comprising, a platen for compressing the veneer laminations against the core pieces, elements for clamping the core pieces between them in a plane normal to the direction of movement of the platen, hydraulically-actuated means for operating the platen and the clamping elements, a hydraulic-pressure-creating source for the operating means, a first hydraulically-actuated main valve interposed between the pressure source and the platen-operating means, a second hydraulically-actuated main valve interposed between the pressure source and the clamping elements operating means, a first spring-controlled hydraulically-actuated auxiliary valve interposed between the pressure source and the first and second main valves to control the coordinated opposite shifting of the main valves to alternate pressures to the hydraulically-actuated means for the platen and the clamp-operating elements, hydraulically-actuated means for resetting the spring-controlled auxiliary valve, a second spring-controlled hydraulically-actuated auxiliary valve interposed between the second main valve and the resetting means whereby the release of the second spring-controlled auxiliary valve effects the actuation of the resetting means for the first spring-controlled auxiliary valve and reversing the main valves to restore pressure to the platen-actuating means, hydraulically-actuated means for resetting the first main valve, an electrically-actuated timer for controlling the duration of restored pressure to the platen-actuating means, hydraulically-actuated platen-pressure control means interposed between the first main valve resetter means and the source of pressure, and manual-settable devices for initially setting the respective spring-controlled auxiliary valves, the electric timer, and the pressure-control means so that the pressure-creating source successively initiates the movement of the platen to a predetermined approach to the veneer-laminated core pieces, then initiates the movement of the core-clamping elements to a predetermined pressure on the core pieces, and subsequently continues the movement of the platen to a predetermined pressure on the veneer-laminated core pieces for a predetermined period of time.

10. In a hydraulic press for adhering veneer laminations to a multi-piece core, the press comprising, a platen for compressing the veneer laminations against the core pieces, hydraulic means for actuating the platen, clamping elements for compressing the core pieces in a plane transverse to the direction of movement of the platen, hydraulic means for actuating the clamping elements, hydraulic pressure-creating means for the respective hydraulic-actuating means, control means for alternating the pressures to the platen actuating-means and the clamping elements actuating-means respectively, a spring-trip-actuated pressure-responsive means for initially actuating the control means, pressure-actuated means responsive to the pressure to the clamping-elements actuating-means for resetting the spring-trip-actuated pressure-responsive means to reverse the control means so as to block further pressure to the clamping-elements actuating-means and restore pressure to the platen-actuating means, means on the platen for releasing the spring-trip-actuated means at a predetermined approach of the platen to the veneer-laminated core pieces, and pressure-responsive means sensitive to the restored pressure to the platen-actuating means for arresting the action of the pressure-creating means at a predetermined pressure of the platen-actuating means against the veneer-laminated core pieces.

11. In a hydraulic press for adhering veneer laminations to a multi-piece core, the press comprising, a platen for compressing the veneer laminations against the core pieces, hydraulic means for actuating the platen, clamping elements for compressing the core pieces in a plane transverse to the direction of movement of the platen, hydraulic means for actuating the clamping elements, hydraulic pressure-creating means for the respective hydraulic-actuating means, control means for alternating the pressures to the platen actuating-means and the clamping-elements actuating means respectively, spring-trip-actuated pressure-responsive means for initially actuating the control means, pressure-actuated means responsive to the pressure to the clamping elements actuating-means for resetting the spring-trip-actuated pressure-responsive means to reverse the control means so as to block further pressure to the clamping-elements actuating-means and restore pressure to the platen-actuating means, means on the platen for releasing the spring-trip-actuated means at a predetermined approach of the platen to the veneer-laminated core pieces, other spring-actuated means for altering the response of the clamping-elements pressure-actuated means, pressure-responsive means sensitive to the restored pressure to the platen-actuating means for arresting the action of the pressure-creating means at a predetermined pressure of the platen-actuating means against the veneer-laminated core pieces, and manually-settable devices for altering the tensions of the spring-trip-actuated means and on the spring-controlled clamping-elements pressure-release means and on the pressure-responsive means so that the pressure-creating source successively initiates the movement of the platen to a predetermined approach to the veneer laminated core pieces, then initiates the movement of the core clamping elements to a predetermined pressure on the core pieces, and subsequently continues the movement of the platen to apply a predetermined pressure on the veneer-laminated core pieces.

12. In a hydraulic press for adhering veneer laminations to a multiple-piece core compressed in the plane of the core pieces, the press comprising, a pair of opposed relatively-movable platens dimensioned and mounted to contact the opposite veneer laminations and press them against the core pieces, opposed and relatively movable clamping elements dimensioned and mounted to contact opposite edges of the core pieces and compress them in the plane thereof, separate hydraulically-actuated means for effecting the relative movement of the platens and the clamping elements, a hydraulic pressure source for the operation of the hydraulically-actuated means, manually-settable automatic-acting pressure-control mechanisms interposed between the hydraulic pressure source and the respective hydraulically-actuated means for sucessively initiating the relative movement of the platens toward the interposed veneer-laminated core pieces and arresting such movement upon the platens reaching a predetermined relative contiguity to the veneer-laminated core pieces, then initiating a relative movement of the clamping elements against the core pieces and arresting such movement at a predetermined pressure, and subsequently continuing the relative movement of the platens to apply and maintain a predetermined pressure of the veneer laminations against the core pieces, and gage means arranged adjacent the mechanisms and connected for coordinated operation therewith to visually indicate the pressure conditions at which the mechanisms are to become operative.

13. In a hydraulic press for adhering veneer laminations to a clamped multiple-piece core, the press comprising, a hydraulically-actuated platen for compressing the veneer laminations against the core pieces, relatively-movable hydraulically-actuated elements for clamping the core pieces between them in a direction normal to the movement of the platen, a source of hydraulic pressure, valve means alternately connecting the source of pressure to the hydraulically-actuated veneer-laminating platen and to the core-clamping elements, hydraulically-controlled mechanisms for automatically actuating the valve means, manually-settable devices for adjusting the respective mechanisms for altering their automatic actions to successively initiate the movement of the platen toward the veneer-laminated core and arrest such movement upon the platen reaching a predetermined approach to compression action, then initiate the movement of the core-clamping elements and arrest such core-clamping movement at a predetermined pressure on the core pieces, and subsequently continue the movement of the platen to apply pressure to the veneer-laminated core for a predetermined period of time, and gage means arranged adjacent each device and connected for coordinated operation therewith to indicate the pressure conditions at which the mechanisms are to become automatically operative.

14. In a hydraulic press for adhering veneer laminations to a clamped multiple-piece core, the press comprising, a hydraulically-actuated platen for compressing the veneer laminations against the core pieces, relatively-movable hydraulically-actuated elements for clamping the core pieces between them in a direction normal to the movement of the platen, a source of hydraulic pressure, valve means alternately connecting the source of pressure to the hydraulically-actuated veneer-laminating platen and to the core-clamping elements, hydraulically-controlled mechanisms for automatically actuating the valve means, manually-operable members connected to each of the mechanisms to regulate the automatic action thereof to successively initiate the movement of the platen toward the veneer-laminated core and arrest such movement upon the platen reaching a predetermined approach to compression action, then initiate the movement of the core-clamping elements and arrest such core-clamping movement at a predetermined pressure on the core pieces, and subsequently continue the movement of the platen to apply pressure to the veneer-laminated core for a predetermined period of time, and a gage arranged adjacent each member and connected for coordinated operation therewith to visually indicate the pressure conditions at which the respective mechanisms are to become automatically operative.

15. In a hydraulic press for adhering veneer laminations to a clamped multi-piece core, the press comprising, a platen for compressing the veneer laminations against the core pieces, elements for clamping the core pieces between them in a plane normal to the direction of movement of the platen, hydraulically-actuated means for operating the platen and the clamping elements, a hydraulic-pressure-creating source for the operating means, a first hydraulically-actuated main valve interposed between the pressure source and the platen operating means, a second hydraulically-actuated main valve interposed between the pressure source and the clamping elements operating means, a first spring-controlled hydraulically-actuated auxiliary valve interposed between the pressure source and the first and second main valves to control the coordinated opposite shifting of the main valves to alternate pressures to the hydraulically-actuated means for the platen and the clamp-operating elements, hydraulically-actuated means for resetting the spring-controlled auxiliary valve, a second spring-controlled hydraulically-actuated auxiliary valve interposed between the second main valve and the resetting means whereby the release of the second spring-controlled auxiliary valve effects the actuation of the resetting means for the first spring-controlled auxiliary valve and reversing the main valves to restore pressure to the platen-actuating means, manually-operable members respectively connected to regulate the tensions of the respective springs of each of the auxiliary valves so that the pressure creating source successively initiates the movement of the platen to a predetermined approach to the veneer-laminated core pieces, then initiates the movement of the core-clamping elements to a predetermined pressure on the core pieces, and subsequently continues the movement of the platen to apply pressure to the veneer-laminated core pieces, and a gage arranged adjacent each member and connected for coordinated operation therewith to indicate the pressure conditions at which the respective valves are to become operative.

References Cited in the file of this patent

UNITED STATES PATENTS

| | | |
|---|---|---|
| 1,563,684 | Black | Dec. 1, 1925 |
| 1,772,599 | Dobson | Aug. 12, 1930 |
| 2,061,658 | Hubbert | Nov. 24, 1936 |
| 2,209,608 | Nye | July 30, 1940 |
| 2,247,988 | Carver | July 1, 1941 |
| 2,301,028 | Esch | Nov. 3, 1942 |
| 2,302,115 | Gazey | Nov. 17, 1942 |
| 2,390,159 | Laucks | Dec. 4, 1945 |
| 2,526,342 | Frisch | Oct. 17, 1950 |
| 2,558,796 | Tapper | July 3, 1951 |
| 2,593,691 | Onsrud | Apr. 22, 1952 |
| 2,618,302 | Rockola | Nov. 18, 1952 |